United States Patent
Miura et al.

(10) Patent No.: US 6,456,335 B1
(45) Date of Patent: Sep. 24, 2002

(54) MULTIPLE PICTURE COMPOSING METHOD AND MULTIPLE PICTURE COMPOSING APPARATUS

(75) Inventors: Tsuyoshi Miura; Yuichi Terui, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/167,432

(22) Filed: Oct. 6, 1998

(30) Foreign Application Priority Data

Feb. 19, 1998 (JP) .......................................... 10-037125

(51) Int. Cl.⁷ ................................................ H04N 7/18
(52) U.S. Cl. ................. 348/588; 348/385.1; 348/14.12; 348/159
(58) Field of Search .............................. 348/564, 588, 348/383, 839, 840, 159, 153, 143, 500, 512, 513, 15, 565, 567, 568, 385, 386, 584, 731, 732

(56) References Cited

U.S. PATENT DOCUMENTS

| | | | | |
|---|---|---|---|---|
| 4,970,588 A | * | 11/1990 | Kobayashi | 358/108 |
| 5,781,788 A | * | 7/1998 | Woo | 395/800.01 |
| 5,847,771 A | * | 12/1998 | Cloutier et al. | 348/564 |
| 5,953,050 A | * | 9/1999 | Kamata et al. | 348/15 |
| 5,969,769 A | * | 10/1999 | Hamadate | 348/568 |
| 5,982,415 A | * | 11/1999 | Sakata | 348/17 |
| 5,995,146 A | * | 11/1999 | Rasmussen | 348/385 |
| 6,011,901 A | * | 1/2000 | Kirsten | 386/123 |
| 6,069,653 A | * | 5/2000 | Hudson | 348/143 |
| 6,069,662 A | * | 5/2000 | Horiuchi et al. | 348/446 |
| 6,084,633 A | * | 7/2000 | Gouhara et al. | 348/231 |
| 6,124,881 A | * | 9/2000 | Terui et al. | 348/15 |

FOREIGN PATENT DOCUMENTS

| | | |
|---|---|---|
| JP | 54-148426 | 11/1979 |
| JP | 4-7991 | 1/1992 |

* cited by examiner

*Primary Examiner*—Victor R. Kostak
(74) *Attorney, Agent, or Firm*—Katten Muchin Zavis Rosenman

(57) ABSTRACT

A multiple picture composing method for composing video signals from a plurality of video signal sources which operate asynchronously to each other includes the steps of (a) successively selecting the video signals from the video signal sources, (b) reading the selected video signals in units of frames while maintaining horizontal and vertical synchronization of the selected video signals, (c) reducing the video signals in the units of frames in correspondence with areas allocated for each of pictures to be composed in a composed picture, (d) writing the reduced video signal in blocks of a picture composing memory corresponding to the areas allocated for each of the pictures to be composed, and (e) composing the video signals stored in the picture composing memory to obtain a composed video signal related to a composed picture and subjecting the composed video signal to at least one of an encoding process and a transmission process.

32 Claims, 43 Drawing Sheets

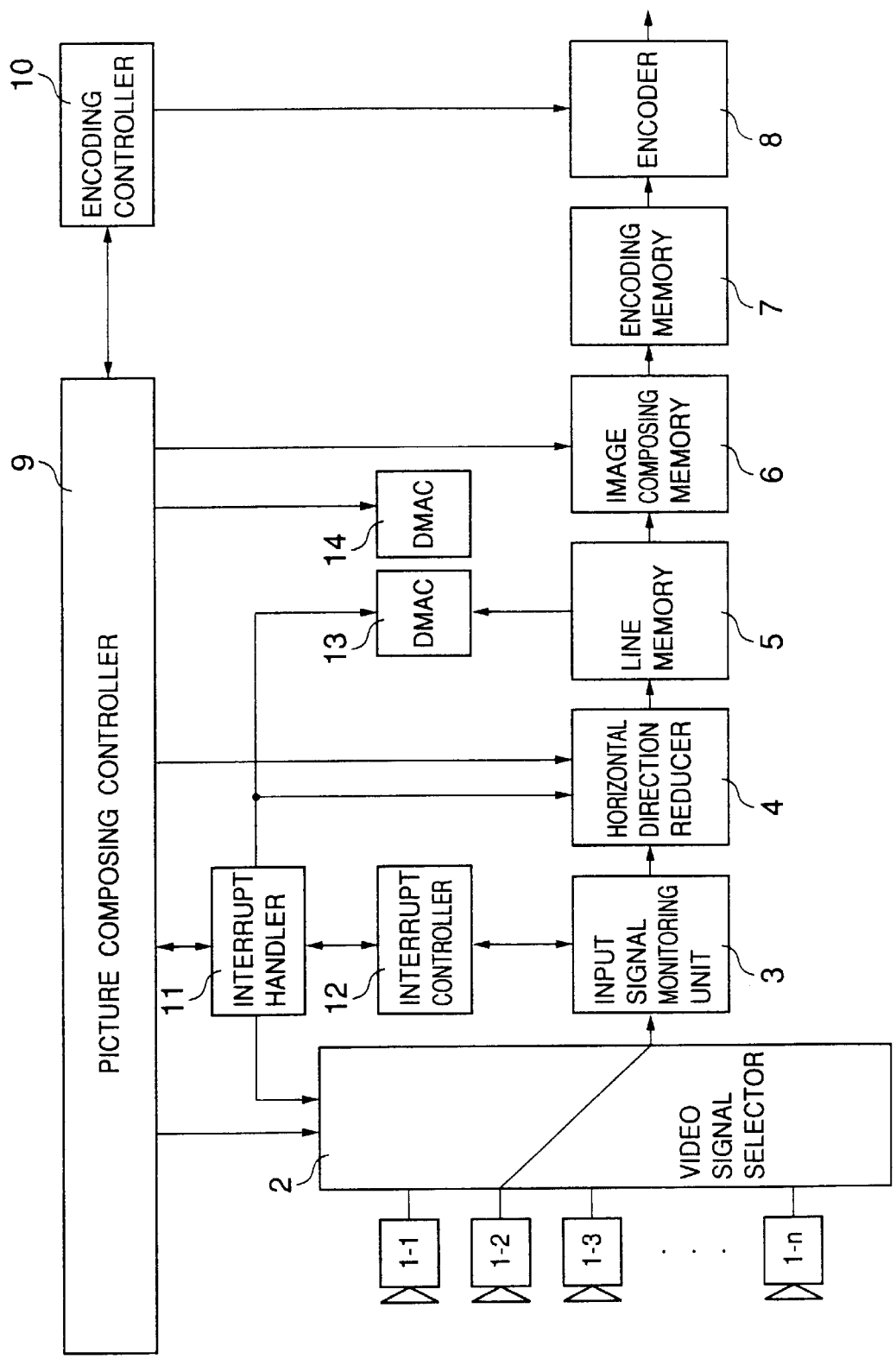

n=1 n=2 n=3 n=4

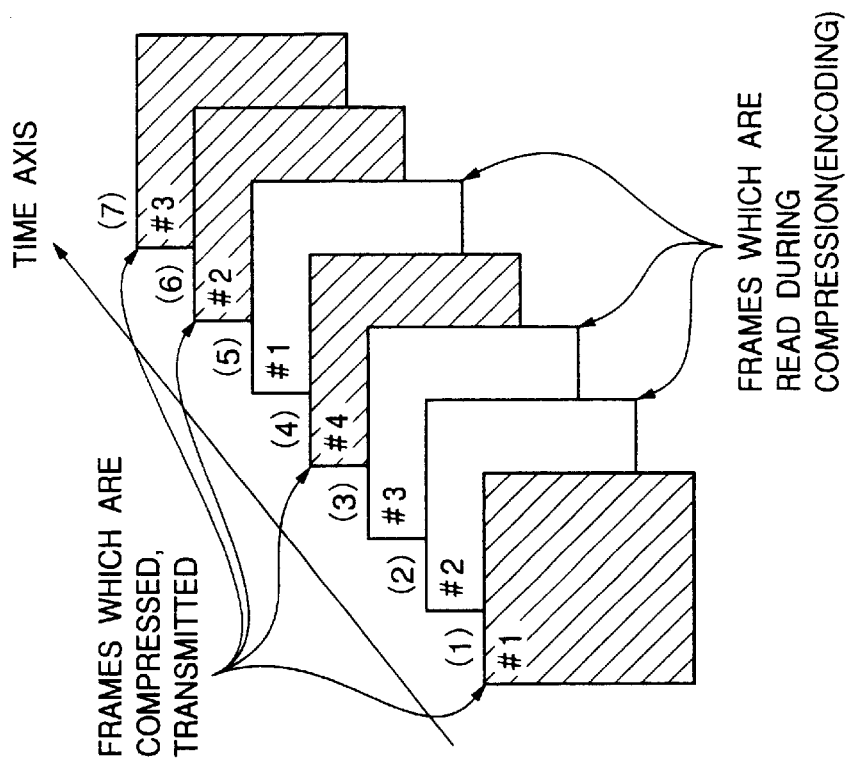
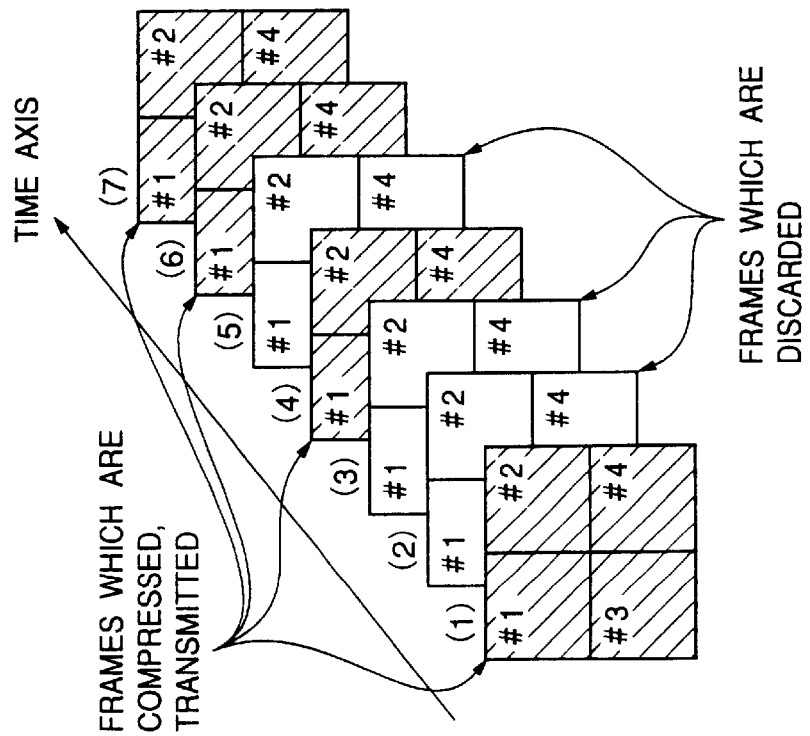

TIME AXIS

TIME AXIS n=2 n=3 n=5~9 n=9~16

FIG.36A
```
~~~ MENU(FOR REMOTE CONTROL) ~~~
1 POWER LINE MONITORING
2 FACTORY MONITORING
3 RIVER MONITORING
4 VOLCANO MONITORING
5 4 PICTURE COMPOSING
6 3+RECORDED PICTURE COMPOSING
7 3+ZOOM PICTURE COMPOSING
NOTE: ENTER → FOR SUB MENU
       FOR 6, 7
```
FIG.36B
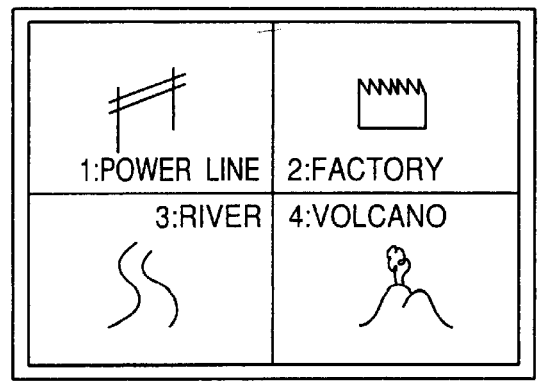
FIG.36C
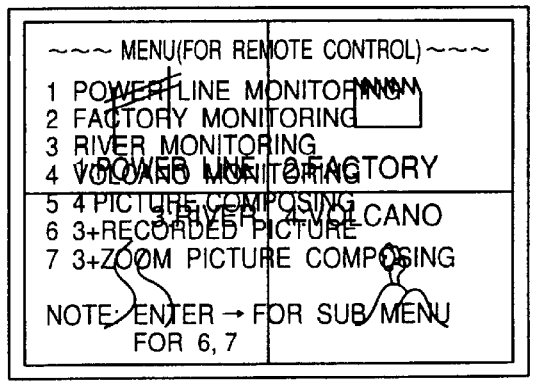

FIG.39

| CATEGORY | RSP | TYPE(DETAILS) | CONTENTS |
|---|---|---|---|
| COMMAND | YES | (1)SINGLE VIDEO SIGNAL SOURCE SELECTION COMMAND IDENTIFIER | SELECT ARBITRARY SINGLE VIDEO SIGNAL SOURCE |
| | | (2)MULTIPLE PICTURE COMPOSING SET COMMAND IDENTIFIER 02(hex) | SET MULTIPLE PICTURE COMPOSING PARAMETER GROUP. SET PICTURE COMPOSING MODE, LAYOUT INFORMATION |
| | | (3)MULTIPLE PICTURE COMPOSING INQUIRY COMMAND IDENTIFIER 03(hex) | SAVE MULTIPLE PICTURE COMPOSING PARAMETER GROUP IN REMOTE TERMINAL. SAVE NO. OF DIVISIONS, PICTURE COMPOSING MODE, LAYOUT INFORMATION |
| | | (4)VIDEO INPUT SOURCE STATE REQUEST COMMAND IDENTIFIER 04(hex) | SAVE STATE OF ALL VIDEO SOURCES |
| | | (5)REMOTE MENU SET/CANCEL COMMAND IDENTIFIER 05(hex) | SET ON/OFF OF MENU ADDED AT REMOTE TRANSMITTER |
| RESPONSE | NO | (1)SINGLE VIDEO SIGNAL SOURCE SELECTION RESPONSE IDENTIFIER 81(hex) | RESPONSE OF ARBITRARY SINGLE POINT SELECTION COMMAND |
| | | (2)MULTIPLE PICTURE COMPOSING SET RESPONSE IDENTIFIER 82(hex) | RESPONSE OF MULTIPLE PICTURE COMPOSING SET COMMAND |
| | | (3)MULTIPLE PICTURE COMPOSING INQUIRY RESPONSE IDENTIFIER 83(hex) | RESPONSE OF MULTIPLE PICTURE COMPOSING INQUIRY COMMAND |
| | | (4)VIDEO INPUT SOURCE STATE REQUEST RESPONSE IDENTIFIER 84(hex) | RESPONSE OF VIDEO INPUT SOURCE STATE REQUEST COMMAND |
| | | (5)REMOTE MENU SET/CANCEL RESPONSE IDENTIFIER 85(hex) | RESPONSE OF REMOTE MENU SET/CANCEL COMMAND |
| NOTIFICATION | NO | (1)VIDEO SIGNAL ABNORMALITY INDICATION INDENTIFIER f1(hex) | ABNORMAL VIDEO SIGNAL SOURCE NO. |
| | | (2)MULTIPLE PICTURE COMPOSING MODIFICATON INDICATION INDENTIFIER f2(hex) | NOTIFY PICTURE COMPOSING PARAMETER GROUP OF REMOTE TERMINAL THAT CHANGE OCCURRED DUE TO LOCAL SETTING OF TERMINAL |

FIG.40A

SINGLE VIDEO SIGNAL SOURCE SELECTION COMMAND 101

| IDENTIFIER | (1byte) | 01 | 1byte |
|---|---|---|---|
| PARAMETER LENGTH | (1byte) | 02 | 1byte |
| PARAMETERS | TOTAL NO. OF VIDEO SIGNAL SOURCE CHANNELS (1byte) | N | N:SUM TOTAL OF VIDEO SIGNAL SOURCES |
| | CHANNEL NO. OF SPECIFIED VIDEO SIGNAL SOURCE (1byte) | ARBITRARY CHANNEL FROM 1 TO N | |

FIG.40B

SINGLE VIDEO SIGNAL SOURCE SELECTION RESPONSE 102

| IDENTIFIER | (1byte) | 81 | 1byte |
|---|---|---|---|
| PARAMETER LENGTH | (1byte) | 01 | 1byte |
| PARAMETERS | SELECTED CHANNEL NO. (1byte) | 1 TO N ff | NORMAL END ABNORMAL END |

FIG.41A

MULTIPLE IMAGE COMPOSING SET COMMAND 103

| IDENTIFIER | (1byte) | 02 | |
|---|---|---|---|
| PARAMETER LENGTH | (1byte) | 15 | |
| PARAMETERS | NUMBER N OF PICTUERS TO BE COMPOSED (1byte) | ARBITRARY NO. SPECIFIED BY USER | |
| | NUMBER n OF PARTS INTO WHICH DISPLAY PICTURE IS DIVIDED (1byte) | 00:NO DIVISION 01 TO 09:PICTURE DIVISION NO. | |
| | INTERVAL TIME (1byte) | ARBITRARY NO.(UNITS SEC.) SPECIFIED BY USER NOTE:ONLY VALID WHEN N>n | |
| | PICTURE COMPOSING MODE | 01:COMPOSE ONLY LIVE PICTURES 02:COMPOSE DECODED PICTURE INCLUSIVE 03:COMPOSE DECODED PICTURE INCLUSIVE 03:COMPOSE ZOOM-UP PICTURES INCLUSIVE NOTE:ONLY VALID WHEN N<n | |
| | SPECIFIED PRIORITY CHANNEL FOR PICTURE COMPOSING MODE | 00:INVALID 01 TO 9:PRIORITY CHANNEL NOTE:VALID WHEN PICTURE COMPOSING MODE IS NOT 01 | |

FIG.41B

MULTIPLE PICTURE COMPOSING SET COMMAND
        103

| | | | |
|---|---|---|---|
| PARAMETERS | ENCODING MODE (1byte) | 00:STANDARD<br>01:FULLY AUTOMATIC<br>02:PRIORITY ON MOTION<br>03:PRIORITY ON PICTURE QUALITY | |
| | SPECIFIED PRIORITY (1byte)<br>CHANNEL FOR ENCODING MODE | 00:INVALID<br>01:PRIORITY VIDEO CHANNEL EXISTS<br>NOTE:VALID WHEN ENCODING MODE<br>IS NOT 00 STANDARD | |
| | COORDINATE INFORMATION (1byte)<br>RELATED TO COORDINATE 1 | 0:INVALID | 1 TO 9:VIDEO CHANNEL<br>NO. OF COORDINATE 1 |
| | COORDINATE INFORMATION (1byte)<br>RELATED TO COORDINATE 2 | 0:INVALID | 1 TO 9:VIDEO CHANNEL<br>NO. OF COORDINATE 2 |
| | COORDINATE INFORMATION (1byte)<br>RELATED TO COORDINATE 3 | 0:INVALID | 1 TO 9:VIDEO CHANNEL<br>NO. OF COORDINATE 3 |
| | COORDINATE INFORMATION (1byte)<br>RELATED TO COORDINATE 4 | 0:INVALID | 1 TO 9:VIDEO CHANNEL<br>NO. OF COORDINATE 4 |
| | COORDINATE INFORMATION (1byte)<br>RELATED TO COORDINATE 5 | 0:INVALID | 1 TO 9:VIDEO CHANNEL<br>NO. OF COORDINATE 5 |
| | COORDINATE INFORMATION (1byte)<br>RELATED TO COORDINATE 6 | 0:INVALID | 1 TO 9:VIDEO CHANNEL<br>NO. OF COORDINATE 6 |
| | COORDINATE INFORMATION (1byte)<br>RELATED TO COORDINATE 7 | 0:INVALID | 1 TO 9:VIDEO CHANNEL<br>NO. OF COORDINATE 7 |
| | COORDINATE INFORMATION (1byte)<br>RELATED TO COORDINATE 8 | 0:INVALID | 1 TO 9:VIDEO CHANNEL<br>NO. OF COORDINATE 8 |
| | COORDINATE INFORMATION (1byte)<br>RELATED TO COORDINATE 9 | 0:INVALID | 1 TO 9:VIDEO CHANNEL<br>NO. OF COORDINATE 9 |
| | ZOOM-UP COORDINATE X (2byte) | X-AXIS DIRECTION ADDRESS IN MEMORY<br>NOTE:VALID WHEN PICTURE COMPOSING<br>MODE IS "COMPOSING ZOOM-UP PICTURE<br>INCLUSIVE" | |
| | ZOOM-UP COORDINATE Y (2byte) | Y-AXIS DIRECTION ADDRESS IN MEMORY<br>NOTE:VALID WHEN PICTURE COMPOSING<br>MODE IS "COMPOSING ZOOM-UP PICTURE<br>INCLUSIVE" | |
| | ZOOM-UP RATIO (1byte) | 01:VERTICALX2, HORIZONALX2<br>02:VERTICALX4, HORIZONALX4<br>NOTE:VALID WHEN PICTURE COMPOSING<br>MODE IS "COMPOSING ZOOM-UP PICTURE<br>INCLUSIVE" | |

FIG.42A

MULTIPULE PICTURE COMPOSING RESPONSE — 104

| IDENTIFIER | (1byte) | 82 |
|---|---|---|
| PARAMETER LENGTH | (1byte) | 01 |
| PARAMETERS | RESPONSE (1byte) | 00:NORMAL END<br>f1:PARAMETER ABNORMAL<br>f2:SEQUENCE ABNORMAL<br>f3:INVALID SETTING |

FIG.42B

MULTIPULE PICTURE COMPOSING INQUIRY COMMAND — 105

| IDENTIFIER | (1byte) | 03 |
|---|---|---|
| PARAMETER LENGTH | (1byte) | 00 |

FIG.42C

MULTIPULE PICTURE COMPOSING INQUIRY RESPONSE — 106

| IDENTIFIER | (1byte) | 83 |
|---|---|---|
| PARAMETER LENGTH | (1byte) | 15 |
| PARAMETERS | (1byte) | |

FIG.42D

VIDEO INPUT SOURCE STATE REQUEST COMMAND — 107

| IDENTIFIER | (1byte) | 04 |
|---|---|---|
| PARAMETER LENGTH | (1byte) | 00 |

FIG.42E

VIDEO INPUT SOURCE STATE REQUEST RESPONSE — 108

| IDENTIFIER | (1byte) | 84 | |
|---|---|---|---|
| PARAMETER LENGTH | (1byte) | 09 | |
| PARAMETERS | INFORMATION OF VIDEO SIGNAL SOURCE 1 | (1byte) | 00:NORMAL ff:ABNORMAL |
| | INFORMATION OF VIDEO SIGNAL SOURCE 2 | (1byte) | 00:NORMAL ff:ABNORMAL |
| | INFORMATION OF VIDEO SIGNAL SOURCE 3 | (1byte) | 00:NORMAL ff:ABNORMAL |
| | INFORMATION OF VIDEO SIGNAL SOURCE 4 | (1byte) | 00:NORMAL ff:ABNORMAL |
| | INFORMATION OF VIDEO SIGNAL SOURCE 5 | (1byte) | 00:NORMAL ff:ABNORMAL |
| | INFORMATION OF VIDEO SIGNAL SOURCE 6 | (1byte) | 00:NORMAL ff:ABNORMAL |
| | INFORMATION OF VIDEO SIGNAL SOURCE 7 | (1byte) | 00:NORMAL ff:ABNORMAL |
| | INFORMATION OF VIDEO SIGNAL SOURCE 8 | (1byte) | 00:NORMAL ff:ABNORMAL |
| | INFORMATION OF VIDEO SIGNAL SOURCE 9 | (1byte) | 00:NORMAL ff:ABNORMAL |

FIG.43A

REMOTE GUIDANCE SET/CHANCEL COMMAND                109

| IDENTIFIER | (1byte) | 05 |
|---|---|---|
| PARAMETER LENGTH | (1byte) | 02 |
| PARAMETERS | REMOTE GUIDANCE SWITCH (1byte) | 00:OFF<br>01:ON |
| | SELECTION VALUE (1byte) | VALUE SELECTED BY GUIDANCE |

FIG.43B

REMOTE GUIDANCE SET/CHANCEL RESPONSE          110

| IDENTIFIER | (1byte) | 85 |
|---|---|---|
| PARAMETER LENGTH | (1byte) | 01 |
| PARAMETERS | RESPONSE | 00:NORMAL<br>f1:PARAMETER ABNORMAL<br>f2:SEQUENCE ABNORMAL<br>f3:INVALID SETTING<br>f4:NO SUB GUIDANCE EXISTS |

FIG.43C

VIDEO SIGNAL ABNORMALITY INDICATION          111

| IDENTIFIER | (1byte) | f1 |
|---|---|---|
| PARAMETER LENGTH | (1byte) | 02 |
| PARAMETERS | ABNORMAL GENERATING VIDEO SIGNAL SOURCE (1byte) | I TO N<br>VIDEO SIGNAL SOURCE CHANNEL NO. IN WHICH ABNORMALITY IS GENERATED |

FIG.43D

MULTIPLE PICTURE COMPOSING MODIFICATION INDICATION   112

| IDENTIFIER | (1byte) | f2 |
|---|---|---|
| PARAMETER LENGTH | (1byte) | 15 |
| PARAMETERS | SAME AS PARAMETERS OF MULTIPLE PICTURE COMPOSING SET COMMAND (21bytes) | |

US 6,456,335 B1

MULTIPLE PICTURE COMPOSING METHOD AND MULTIPLE PICTURE COMPOSING APPARATUS

BACKGROUND OF THE INVENTION

The present invention generally relates to multiple picture composing methods and multiple picture composing apparatuses, and more particularly to a multiple picture composing method for composing a plurality of pictures and transmitting a composed picture and to a multiple picture composing apparatus which employs such a multiple picture composing method.

In video conference systems, remote monitoring systems and the like, it is known to transmit a plurality of pictures and to make a multiple picture display at a receiving end. In this case, video signals can be transmitted as they are if a high-speed transmission channel can be used as a transmission path. But normally, a low-speed transmission channel is generally used as the transmission path, and the video signals must be compressed, encoded and transmitted. The systems may be categorized into a type which synchronizes and processes the video signals from a plurality of picture pickup apparatuses, and a type which processes asynchronous video signals. The system of the latter type has a simpler and less expensive construction. Accordingly, there are demands to efficiently compose multiple pictures of asynchronous video signals.

FIG. 1 is a diagram for explaining a synchronous video signal composing remote monitoring system which includes television cameras 201, a multiple picture composing apparatus 202 having a synchronizing signal distributor 202a, a transmission unit 203 having an encoding function, a network 204 such as a radio satellite line, ISDN, ATM network and LAN, a transmission unit 205 having a decoding function, and a monitor 206.

The 4 television cameras 201 respectively pickup pictures of objects to be monitored, namely, a volcano, a river, a power line and a factory, by carrying out horizontal and vertical scans based on synchronizing signals from the synchronizing signal distributor 202a. Hence, video signals #1, #2, #3 and #4 which are output from the television cameras 201 by picking up the corresponding objects to be monitored are synchronized, and the multiple picture composing apparatus 202 composes the video signals #1 through #4 based on the synchronizing signals to input a composed video signal to the transmission unit 203.

The transmission unit 203 compresses, encodes and transmits the composed video signal depending on a transmission band and the like of the network 204. The transmission unit 205 receives the compressed and encoded composed video signal via the network 204, and restores the original composed video signal by carrying out a process complementary to that at the time of the compression and encoding. The restored original composed video signal is input to the monitor 206, and the monitor 206 displays a composed picture of the objects to the monitored, that is, the volcano, river, power line and factory.

The multiple picture composing apparatus 202 has a construction applied with a video editing function of a television broadcasting system, and includes the synchronizing signal distributor 202a. Although high-performance multiple picture composing apparatuses have been reduced to practice, such multiple picture composing apparatuses are expensive. In addition, the transmission units 203 and 205 respectively have a construction capable of compressing, encoding and decoding the video signal in accordance with the transmission band of the network 204, and applied with standardized means such as H.320 (H.261), MPEG1, 2, 4, MOTION-JPEG, H.324 (H.263).

In a case where each television camera is set up in a corresponding video conference room, the transmission units 203 and 205 are mutually coupled to a part of the network 204 via a multi-point connection unit. In this case, the video signal distribution is controlled so as to form a video conference system.

FIGS. 2A through 2D are diagrams for explaining the multiple picture composing, and show monitoring screens at receiving ends of a remote monitoring system. FIG. 2A shows a split monitoring screen which includes 4 split pictures and is identical to the display screen of the monitor 206 shown in FIG. 1. FIG. 2B shows a split monitoring screen which includes 3 split pictures, wherein the monitoring picture of the river shown in FIG. 2A is deleted and the monitoring picture of the factory is arranged at the position of the monitoring picture of the river. FIG. 2C shows a split monitoring screen which includes 4 split pictures and includes in addition to the monitoring pictures of the power line and the factory the monitoring pictures of the present volcano and the volcano which is picked up and recorded in the past, so as to facilitate comparison of the present volcano and the past volcano. Further, FIG. 2D shows a split monitoring screen which includes 4 split pictures and includes in addition to the monitoring pictures of the power line and the factory the monitoring pictures of the volcano and an enlarged part of the volcano such as a crater thereof.

In order to use a common picture transmission unit with respect to a plurality of terminal equipments, a system which transmits a composed multiple picture and separates the pictures at the receiving end to be transferred to corresponding terminal equipments is proposed in a Japanese Laid-Open Patent Application No.4-7990, for example. In addition, a system which writes asynchronous video signals in a common memory by carrying out an address control and composes the pictures which are divided along a vertical direction of the common memory is proposed in a Japanese Laid-Open Patent Application No.54-148426, for example.

The process of composing synchronized video signals is relatively easy since the video signals are synchronized. However, there is a problem in that the multiple picture composing apparatus which carries out such a composing process is expensive.

On the other hand, the process of composing asynchronized video signals can be realized by a less expensive multiple picture composing apparatus as compared to the case where the synchronized video signals are composed. However, it is difficult to control the composing process in such a multiple picture composing apparatus. Moreover, in the case of the proposed system which uses a common memory, the composed picture is divided along the vertical direction, and the application of the system is limited.

In addition, although the standardized means described above prescribed for the transmission system of the video signal related to the single picture is applicable to the encoding and decoding, there is a problem in that the standardized means cannot be applied automatically to the multiple picture composing process. In other words, in the case of the multiple picture composing process, the importance of the picture may differ among the pictures, and a sufficient monitoring cannot be realized by composing all of the pictures in the same manner.

SUMMARY OF THE INVENTION

Accordingly, it is a general object of the present invention to provide a novel and useful multiple picture composing method and multiple picture composing apparatus, in which the problems described above are eliminated.

Another and more specific object of the present invention is to provide a multiple picture composing method for composing video signals from a plurality of video signal sources which operate asynchronously to each other, comprising the steps of (a) successively selecting the video signals from the video signal sources, (b) reading the selected video signals in units of frames while maintaining horizontal and vertical synchronization of the selected video signals, (c) reducing the video signals in the units of frames in correspondence with areas allocated for each of pictures to be composed in a composed picture, (d) writing the reduced video signal in blocks of a picture composing memory corresponding to the areas allocated for each of the pictures to be composed, and (e) composing the video signals stored in the picture composing memory to obtain a composed video signal related to a composed picture and subjecting the composed video signal to at least one of an encoding process and a transmission process. According to the multiple picture composing method of the present invention, it is possible to reduce the cost of the system by using asynchronous video signal sources. In addition, it is possible to simplify control operations by relating the picture composing process and the encoding process or the transmission process.

Still another object of the present invention is to provide a multiple picture composing apparatus for composing video signals from a plurality of video signal sources which operate asynchronously to each other, comprising a video signal selector selecting the video signals from the video signal sources, an input signal monitoring unit reading the video signals selected by the video signal selector while maintaining horizontal and vertical synchronization of the selected video signals, a horizontal direction reducer reducing the video signals synchronized by the input signal monitoring unit in units of frames in correspondence with areas allocated for each of pictures to be composed in a composed picture, a picture composing memory storing the video signals reduced by the horizontal direction reducer in units of lines, a picture composing controller controlling reading of the video signals by the input signal monitoring unit via the video signal selector and a picture composing process with respect to the video signals stored in the picture composing memory, and an encoder carrying out the picture composing process with respect to the video signals stored in the picture composing memory. According to the multiple picture composing apparatus of the present invention, it is possible to reduce the cost of the system by using asynchronous video signal sources. In addition, it is possible to simplify control operations by relating the picture composing process and the encoding process or the transmission process.

Furthermore, if the setting of the quantization value, the number of times the video signals are read, the encoding process or the like are carried out with priority with respect to the video signal of a weighted channel, it is possible to improve the sharpness or clarity of an important part of the received and displayed composed picture, and the accuracy of a remote monitoring or the like can be improved. It is also possible to utilize an invalid area on the composed picture, so as to make an enlarged display, a zoom-up display, and returning of a specific pattern or received and decoded picture. Moreover, it is possible to carry out a remote control of the multiple picture composing process by exchanging information for the remote control operation between a monitoring end and a monitored end. Accordingly, the present invention can be applied to various systems to realize an economical and efficient multiple picture composing process.

Other objects and further features of the present invention will be apparent from the following detailed description when read in conjunction with the accompanying drawings.

BRIEF DESCRIPTION OF THE DRAWINGS

FIG. 5 is a system block diagram showing a first embodiment of a multiple picture composing apparatus according to the present invention;

FIGS. 17A and 17B respectively are diagrams for explaining reading frames;

FIGS. 36A, 36B and 36C respectively are diagrams for explaining a remote control guidance;

FIG. 39 is a diagram for explaining a remote control protocol;

FIGS. 40A and 40B respectively are diagrams for explaining a single video signal source selection command and a single video signal source selection response;

FIGS. 41A and 41B respectively are diagrams for explaining a multiple picture composing set command;

FIGS. 42A, 42B, 42C, 42D and 42E respectively are diagrams for explaining a multiple picture composing response, a multiple picture composing inquiry command, a multiple picture composing inquiry response, a video signal source state request command and a video input source state request response; and FIGS. 43A, 43B, 43C and 43D respectively are diagrams for explaining a remote guidance set/cancel command, a remote guidance set/cancel response, a video signal abnormality indication and a multiple picture composing modification indication.

DESCRIPTION OF THE PREFERRED EMBODIMENTS

Figure 3:
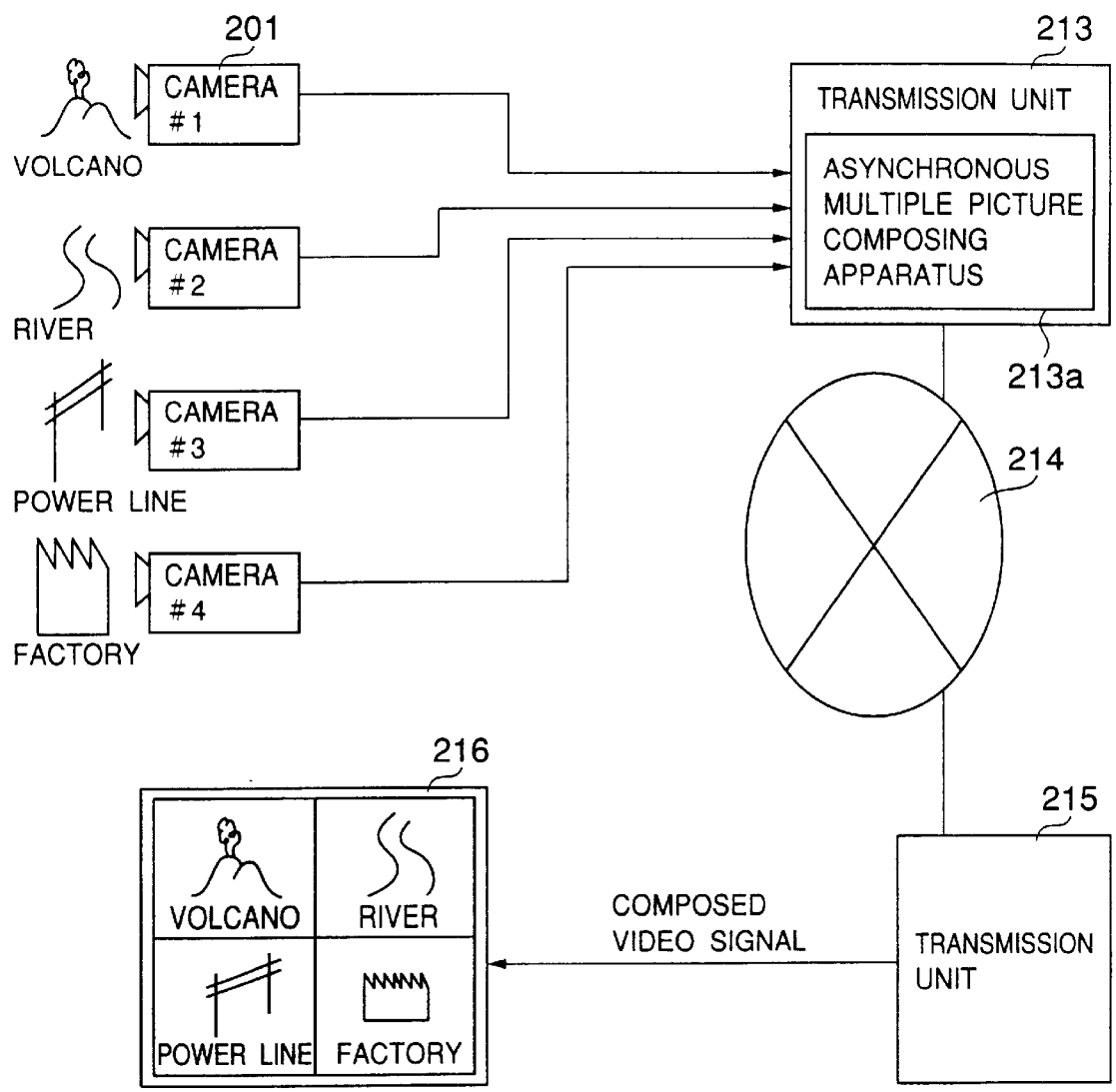
FIG. 3 is a diagram for explaining an asynchronous video signal composing remote monitoring system.
Figure 4:
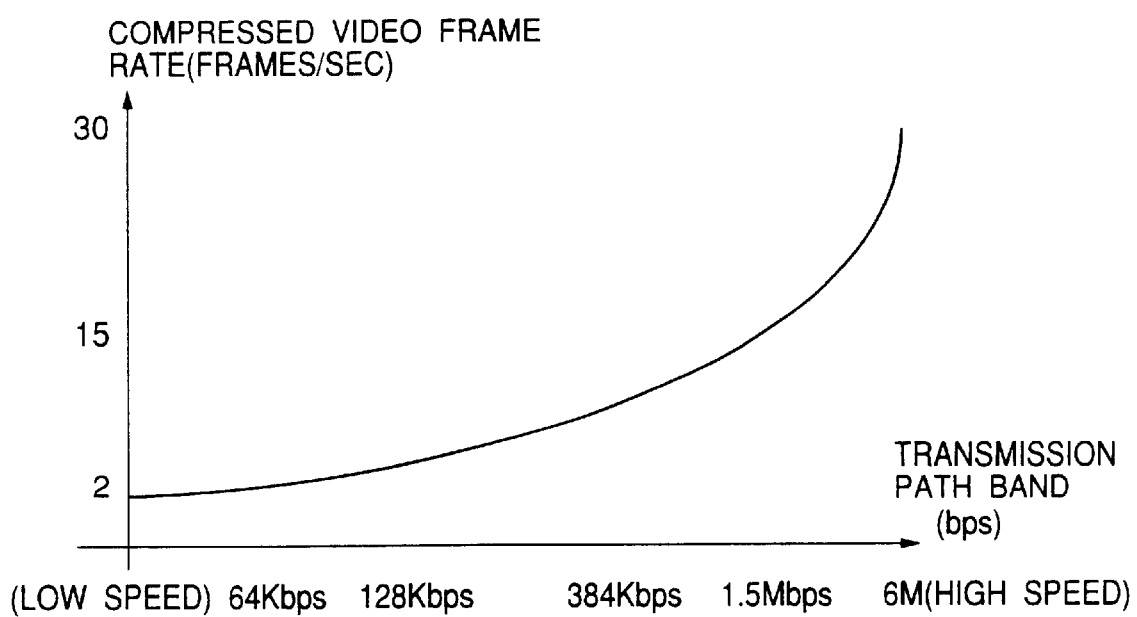
FIG. 4 is a diagram for explaining the relationship between a transmission band and a frame rate.

First, a description will be given of an asynchronous video signal composing remote monitoring system to which the present invention may be applied. FIG. 3 is a diagram for explaining the asynchronous video signal composing remote monitoring system, and FIG. 4 is a diagram for explaining the relationship between a transmission band and a frame rate.

The asynchronous video signal composing remote monitoring system shown in FIG. 3 includes television cameras 211, a transmission unit 213 having an asynchronous multiple picture composing apparatus 213a and an encoding function, a network 214 such as a radio satellite line, ISDN, ATM network and LAN, a transmission unit 215 having a decoding function, and a monitor 216.

The 4 television cameras 211 respectively pickup pictures of objects to be monitored, namely, a volcano, a river, a power line and a factory, independently. Hence, asynchronous video signals #1, #2, #3 and #4 which are output from the television cameras 211 by picking up the corresponding objects to be monitored are input to the asynchronous multiple picture composing apparatus 213a of the transmission unit 213, and the asynchronous multiple picture composing apparatus 213a composes the video signals #1 through #4. The transmission unit 213 compresses and encodes the composed video signal depending on a transmission band of the network 214, and transmits the compressed and encoded composed video signal to the network 214. The transmission unit 215 receives the compressed and encoded composed video signal via the network 214, and restores the original composed video signal by carrying out a process which includes decoding and is complementary to the process at the time of the compression and encoding. The restored original composed video signal is input to the monitor 216, and the monitor 216 displays a composed picture of the objects to the monitored, that is, the volcano, river, power line and factory as shown in FIG. 1 described above or as shown in any of FIGS. 2A through 2D.

Figure 1:
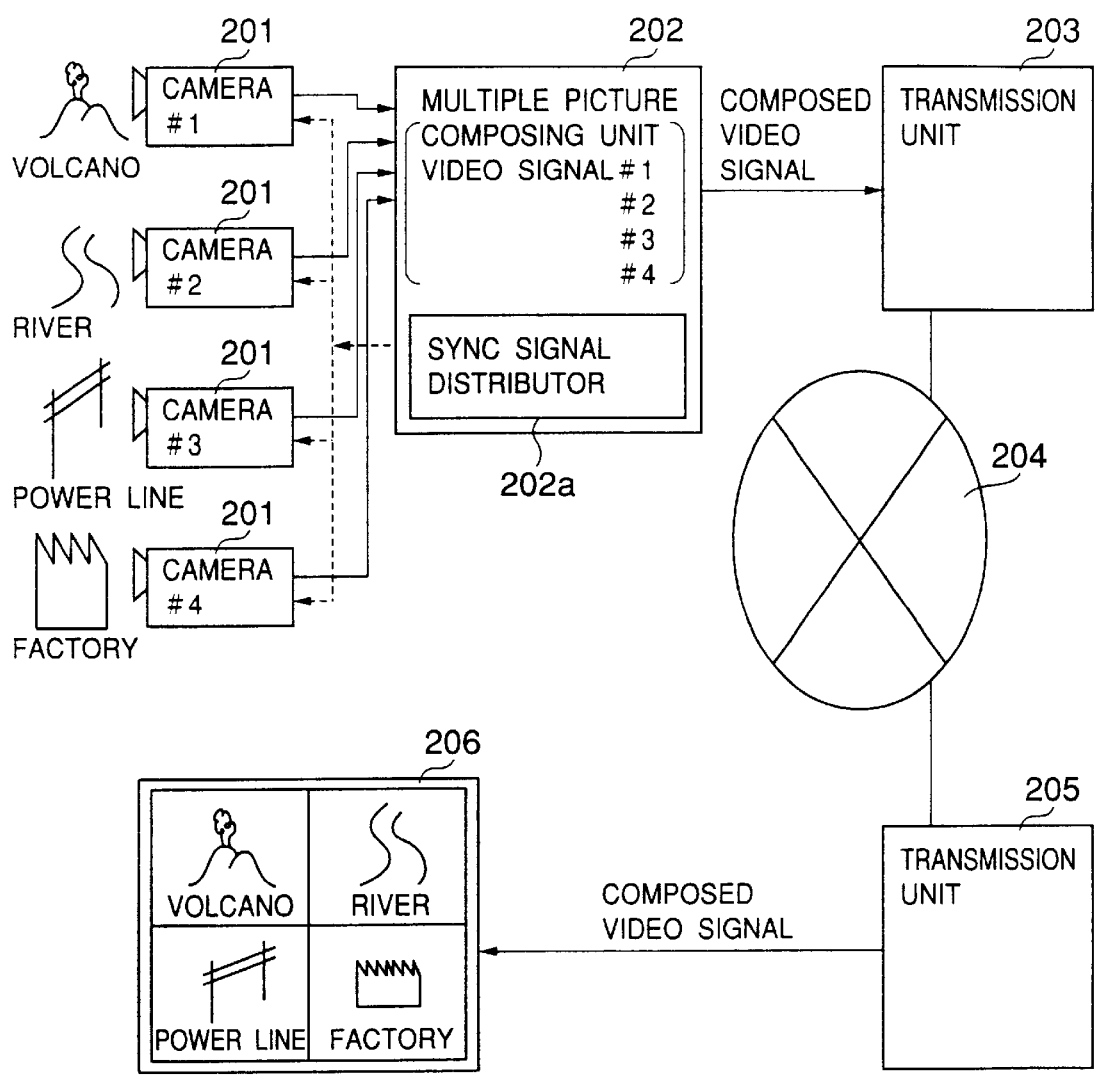
FIG. 1 is a diagram for explaining a synchronous video signal composing remote monitoring system.

If the transmission band of the network 214 is the same as that of the network 204 shown in FIG. 1, the compression, encoding and decoding functions of the transmission units 213 and 215 may be the same as those of the transmission units 203 and 205 shown in FIG. 1. Since the transmission unit 213 carries out an asynchronous composing process, the multiple picture composing apparatus 202 having the synchronizing signal distributor 202a shown in FIG. 1 may be omitted in FIG. 3. In addition, because the video signals from the television cameras 211 can be composed by the asynchronous multiple picture composing apparatus 213a which is within the transmission unit 213 and has a relatively simple construction, the system shown in FIG. 3 is less expensive compared to the system shown in FIG. 1.

FIG. 4 is a diagram for explaining the relationship between a transmission band and a frame rate. For example, if the frame rate of the video signal is 30 frames/sec, the transmission path requires a band of 6 Mbps. Hence, a frame rate of approximately 2 frames/sec is required in a case where the video signal subjected to various kinds of compression and encoding is transmitted via the transmission path having a band of 64 kbps such as a B-channel of the ISDN. In the remote monitoring system, video conference system or the like described above, the picture which is picked up includes relatively small movements. For this reason, even if the encoded video signal is transmitted at a low frame rate and is reproduced and displayed at the receiving end, the quality of the picture display is sufficient for the purposes of the monitoring the remote picture, the participants of the conference or the like.

FIG. 5 is a system block diagram showing a first embodiment of a multiple picture composing apparatus according to the present invention. More particularly, FIG. 5 shows an important part of the transmission unit 213 shown in FIG. 3 which composes and encodes the asynchronous video signals, together with television cameras. This embodiment of the multiple picture composing apparatus employs a first embodiment of a multiple picture composing method according to the present invention.

In FIG. 5, television cameras 1-1 through 1-n are made up of video signal sources including digital cameras, recording and/or reproducing apparatuses and the like. The transmission unit 213 includes a video signal selector 2, an input signal monitoring unit 3, a horizontal direction reducer 4, a line memory 5 which is made up of a first-in-first-out (FIFO), a picture composing memory 6, an encoding memory 7, an encoder 8, a picture composing controller 9, an encoding controller 10, an interrupt handler 11, an interrupt controller 12, a first direct memory access controller (DMAC) 13, and a second DMAC 14 which are coupled as shown in FIG. 5.

The television cameras 1-1 through 1-n are independently synchronized, and pickup pictures of objects to be monitored. The video signal selector 2 successively selects video signals from the television cameras 1-1 through 1-n under a control of the picture composing controller 9, and inputs the selected video signal to the input signal monitoring unit 3. The video signals from the television cameras 1-1 through 1-n may employ any of various kinds of systems such as the NTSC system, the PAL system and the SECAM system. In addition, the video signals may be made up of an analog composite signal, an analog component signal including luminance and color signals, a digital composite signal which is obtained by digitizing an analog video signal, a digital component signal including a luminance signal Y and color difference signals Cb and Cr, or the like.

FIG. 5 shows a state where the video signal from the television camera 1-2 is selected by the video signal selector 2. The input signal monitoring unit 3 monitors a vertical synchronizing signal V and a horizontal synchronizing signal H of the video signal which is input from the video signal selector 2, and achieves vertical synchronization and horizontal synchronization so as to input the video signal amounting to 1 frame. When a vertical position specified from the interrupt controller 12 is detected, the input signal monitoring unit 3 notifies this detection of the specified vertical position to the interrupt controller 12. The interrupt controller 12 calls the interrupt handler 11 which is registered in advance.

The first DMAC 13 transfers the data within the line memory 5 to a specified memory access in response to a request signal from the line memory 5, and in this case, the data is transferred to the picture composing memory 6. After the transfer of the data amounting to 1 line to the picture composing memory 6 ends, the memory address in the vertical direction is incremented by a specified number of lines. On the other hand, the second DMAC 14 transfers the data from the specified memory address to another specified memory address in response to an instruction from the picture composing controller 9.

The horizontal direction reducer 4 decimates or thins pixels on the line so as to reduce the picture in the horizontal direction, and the data related to 1 reduced line is written into the line memory 5. When the data amounting to 1 line which is reduced in the horizontal direction is written into the line memory 5, a DMA request is supplied to the first DMAC 13. The first DMAC 13 carries out a control to transfer the data from the line memory 5 to the picture composing memory 6.

The picture composing memory 6 is made up of blocks which divide the picture composing memory 6 depending on the number of pictures to be composed. The composed video signal related to the composed pictures is transferred to the encoding memory 7. The encoder 8 transmits the composed video signal stored in the encoding memory 7 after subjecting the composed video signal to compression and encoding such as intra-frame encoding and inter-frame encoding. In this case, the picture composing memory 6 and the encoding memory 7 may have a double buffer construction, so that the double buffer is switched to alternately realize the functions of the picture composing memory 5 and the encoding memory 7. In FIG. 5, the illustration of a transmitter which actually transmits the compressed and encoded video signal to the network 214 is omitted.

Figure 6A:
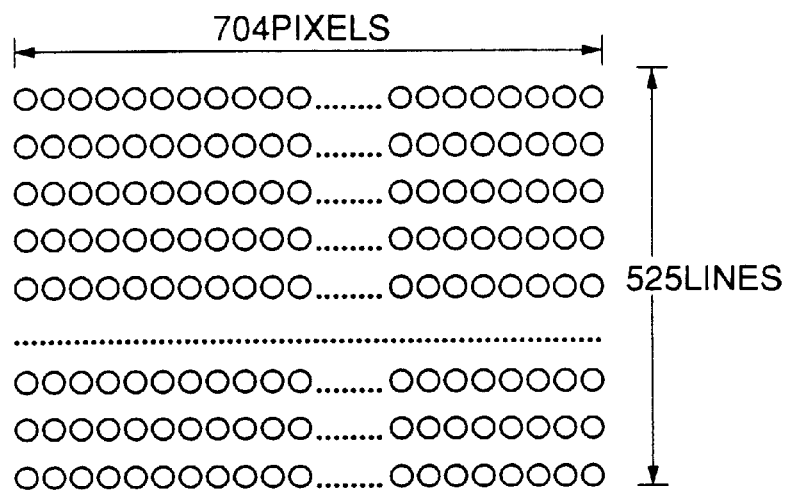
FIGS. 6A and 6B respectively are diagrams for explaining a reducing process.
Figure 6B:
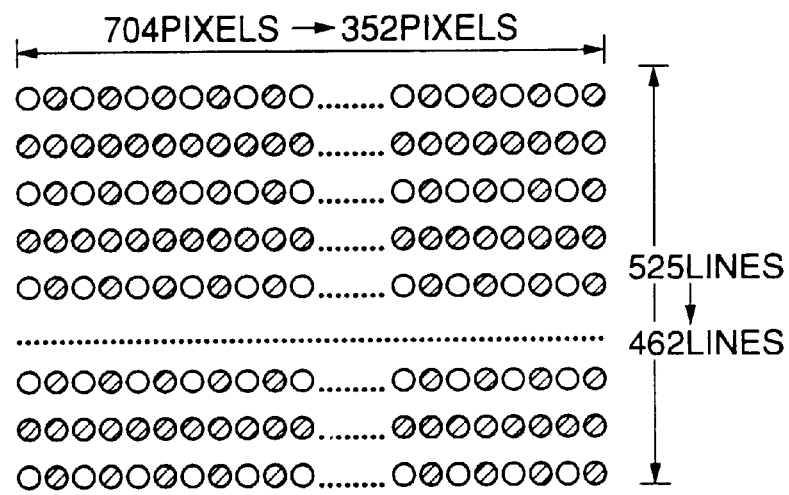

FIGS. 6A and 6B respectively are diagrams for explaining a reducing process. FIG. 6A shows 1 picture made up of 705 pixels×525 lines. By subjecting the picture shown in FIG. 6A to a simple thinning process by thinning pixels indicated by hatching in FIG. 6B, it is possible to reduce the picture shown in FIG. 6A by ½ in both the vertical and horizontal directions. Accordingly, in the case where an effective area of the CCIR601 is 704 pixels×480 lines, the picture is reduced to 352 pixels×240 lines by the simple thinning process described above. The reduction in the vertical direction can be made by reading only one of odd and even fields.

Figure 7:
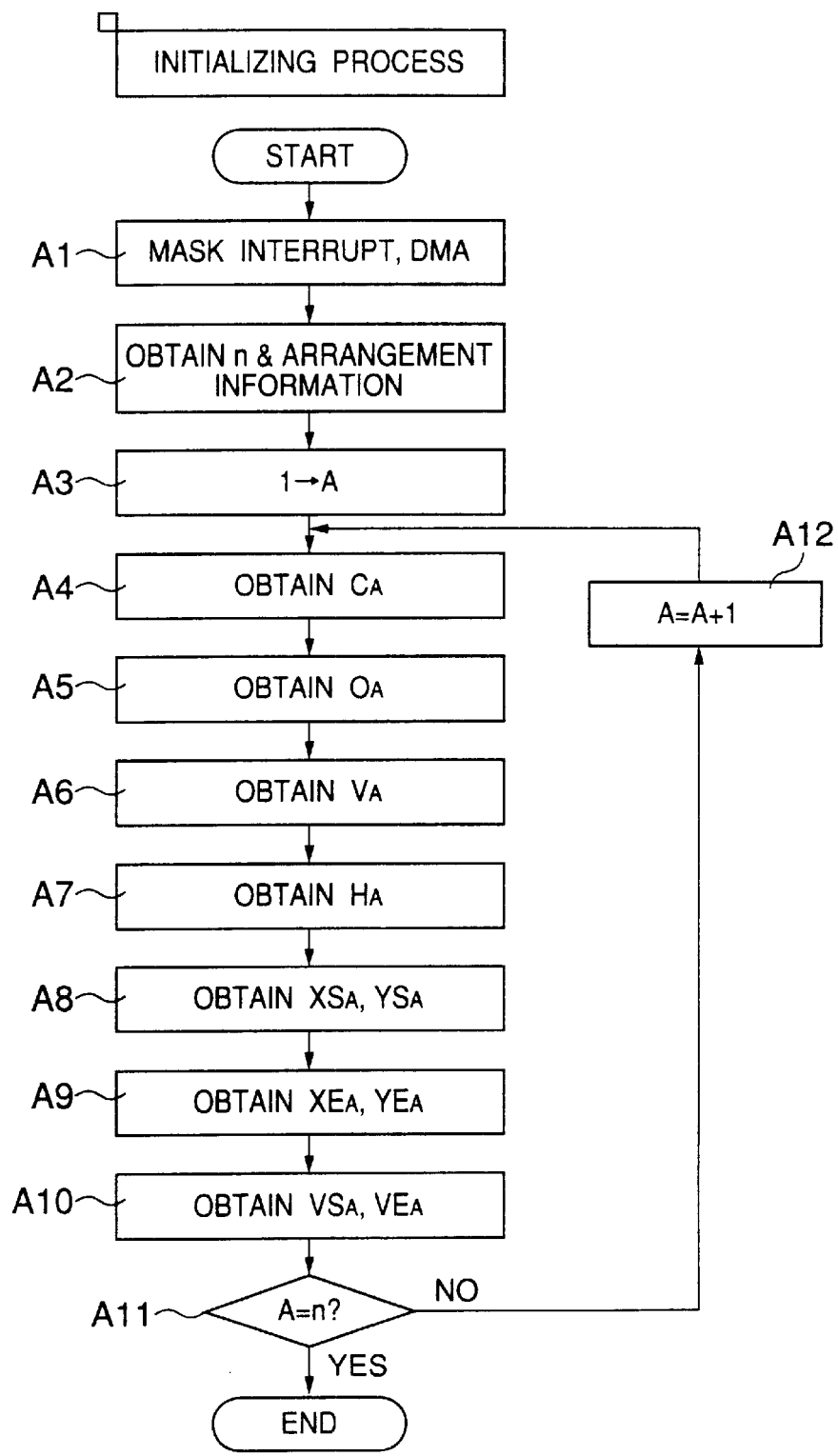
FIG. 7 is a flow chart for explaining an initializing process.

FIG. 7 is a flow chart for explaining an initializing process. The initializing process shown in FIG. 7 initializes various parts shown in FIG. 5. A step A1 masks the interrupt controller 12 and the DMACs 13 and 14 so as to disable the operations of the interrupt controller 12 and the DMACs 13 and 14. A step A2 obtains a number n of video signal sources, that is, the television cameras 1-1 through 1-n in this case, and arrangement information related to positions on a screen where the composed pictures are to be displayed for the n video signal sources. The information obtained in the step A2 may be specified by the user or, set in the system in advance.

A step A3 substitutes 1 into a block number A in the picture composing memory 6, where the block number A is an integer taking any value from 1 to n, and n=1 to 4 in the case where the composed picture is made up of 4 pictures. A step A4 obtains a video signal source channel number $C_A$, and a step A5 obtains an odd/even field read variable $O_A$. A step A6 obtains an increment value $V_A$ of the picture composing memory 6, and a step A7 obtains a horizontal direction reduction value $H_A$. A step A8 sets a picture composing start address $XS_A$, $YS_A$, that is, a horizontal direction read start position and a horizontal direction read end position within the picture composing memory 6. A step A9 sets a picture composing end address $XE_A$, $YE_A$, that is, a vertical direction read start position and a vertical direction read end position within the picture composing memory 6. In addition, a step A10 obtains interrupt generation conditions $VS_A$ and $VE_A$. A step A11 decides whether or not A=n. If the decision result in the step A11 is NO, a step A12 increments A by 1, and the process returns to the step A4. On the other hand, the process ends if the decision result in the step A11 is YES. Hence, the initial setting is carried out for A=1 to n.

The increment value $V_A$ obtained in the step A6 is a value by which the DMAC 13 automatically increments the address in the vertical direction after the DMA transfer amounting to 1 line is completed when transferring the data from the line memory 5 to the picture composing memory 6. The odd/even field read variable $O_A$ obtained in the step A5 indicates a condition used to judge whether only the even field or both the even and odd fields are to be read within the interrupt handler 11. The interrupt generation conditions $VS_A$ and $VE_A$ obtained in the step A10 are set as the conditions for generating the interrupt, and values of the interrupt generation conditions $VS_A$ and $VE_A$ may be set in advance depending on the system. Further, the video signal source channel $C_A$ obtained in the step A4 may be set by the user. For example, in a case where $C_4=2$, it is indicated that the video signal from the video signal source 2 is read into the 4th block within the picture composing memory 6.

In the initializing process described above, if the number n of video signal sources is obtained, the arrangement information depending on the number n is obtained simultaneously therewith. Next, the $XS_A$, $XE_A$, $YS_A$, $YE_A$, $H_A$, $V_A$, $O_A$, $VS_A$ and $VE_A$ are obtained from the arrangements which are successively obtained from A=1 to A=n. For example, the initial value of the video signal source channel number $C_A$ is set to $C_A$=A.

FIGS. 8A through 8D respectively are diagrams for explaining the arrangement of pictures in the composed picture. FIGS. 8A through 8D show the arrangement of the pictures for a case where n=1 to 4, and it is assumed for the sake of convenience that the areas of the composed picture correspond to the blocks of the picture composing memory 6 where the video signals are written. The initial values described above for n=1 shown in FIG. 8A, that is, in a case where no picture composing process is carried out, are as follows.

$XS_1$=XS
$XE_1$=XS+X
$YS_1$=YS
$YE_1$=YS+Y
$H_1$=1
$V_1$=2
$O_1$=1
$VS_1$=$V_{START}$
$VE_{1}$=$_{VEND}$

In addition, the initial values described above for n=2 to 4 shown in FIGS. 8B through 8D, are as follows, where VSTART indicates a start address of a video effective region of the video signal source, and VEND indicates an end address of the video effective region of the video signal source.

$XS_1$=$XS_2$=XS
$XS_3$=$XS_4$=XS+X/2
$XE_1$=$XE_2$=XE+X/2
$XE_3$=$XE_4$=XS+X
$YS_1$=$YS_3$=YS
$YS_2$=$YS_4$=YS+Y/2
$YE_1$=$YE_4$=YS+Y/2
$YE_2$=$YE_3$=YS+Y
$H_1$=$H_2$=$H_3$=$H_4$=1/2
$V_1$=$V_2$=$V_3$=$V_4$=1
$O_1$=$O_2$=$O_3$=$O_4$=0
$VS_1$=$VS_2$=$VS_3$=$VS_4$=$V_{START}$
$VE_1$=$VE_2$=$VE_3$=$VE_4$=$V_{END}$

Figure 8A:
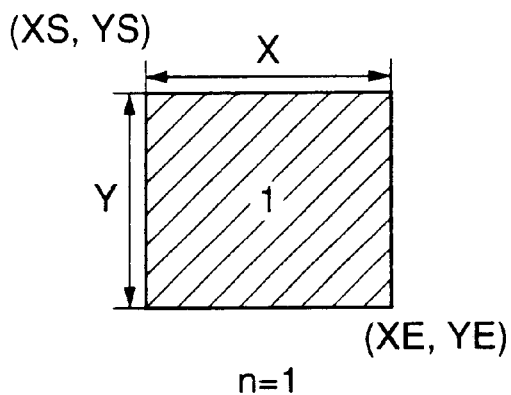
FIGS. 8A through 8D respectively are diagrams for explaining the arrangement of pictures in the composed picture.
Figure 8B:
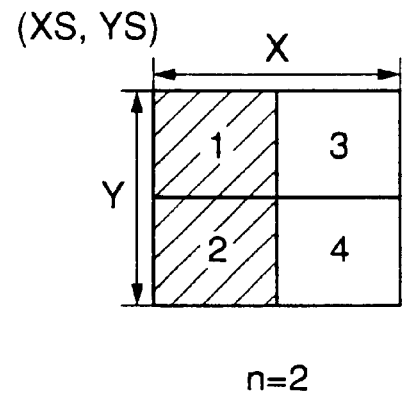
Figure 8C:
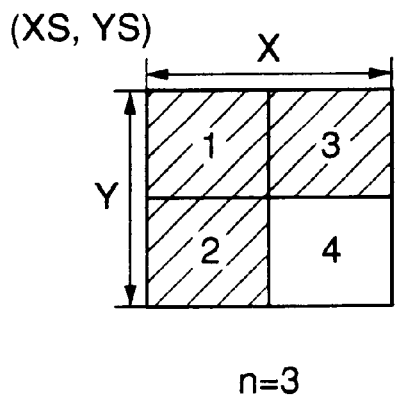
Figure 8D:
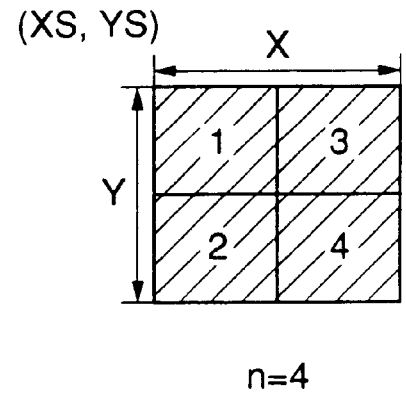

In the case shown in FIG. 8A where n=1, that is, when no picture composing process is carried out, both the odd field and the even field are read, and the odd and even fields are alternately stored in the picture composing memory 6. Hence, the increment value $V_A$ becomes 2, and the odd/even field read variable $O_A$ becomes 1. In addition, in the cases shown in FIGS. 8B through 8D where n=2 to 4, that is, when the picture composing process is carried out, only the even fields are read and consecutively stored in the picture composing memory 6. This, the increment value $V_A$ becomes 1, and the odd/even field read variable $O_A$ becomes 0. In the latter cases, the reduction in the horizontal direction is carried out by a hardware structure of the horizontal direction reducer 4. On the other hand, the reduction in the vertical direction is realized by reading only one of the odd and even fields.

After the initializing process is completed, a video signal read process is started to read the video signals from the video signal sources. First, A is set to A=1, and $C_1$ is set in the video signal selector 2. In this case, $C_1$ is set to $C_1$=1, and thus, the video signal from the video signal source 1-1 is selected by the video signal selector 2. In addition, the increment value $V_1$ of the picture composing memory 6 is set in the DMAC 13, and the horizontal direction reduction value $H_1$ is set in the horizontal direction reducer 4. At the same time, a read start position $XS_1$, $YS_1$ of the picture composing memory 6 is substituted into a transfer destination address XO, YO. The transfer destination address XO, YO is a variable which is used within the interrupt handler 11 when setting the transfer destination address in the DMAC 13. When the process described above is completed, 1 is substituted into a video signal read complete recognition variable FLAG, $VS_1$ is set as the interrupt generation condition, and the interrupt mask is cleared. In other words, the operation of the interrupt controller 12 is enabled.

The input signal monitoring unit 3 monitors the vertical synchronizing signal V of the video signal which is input from the video signal source, that is, the television camera, via the video signal selector 2. When the $VS_1$-th line is reached by starting the count from the vertical synchronizing signal V, the input signal monitoring unit 3 inputs an interrupt signal to the interrupt controller 12. The interrupt controller 12 calls the interrupt handler 11 in response to the interrupt signal.

Figure 9:
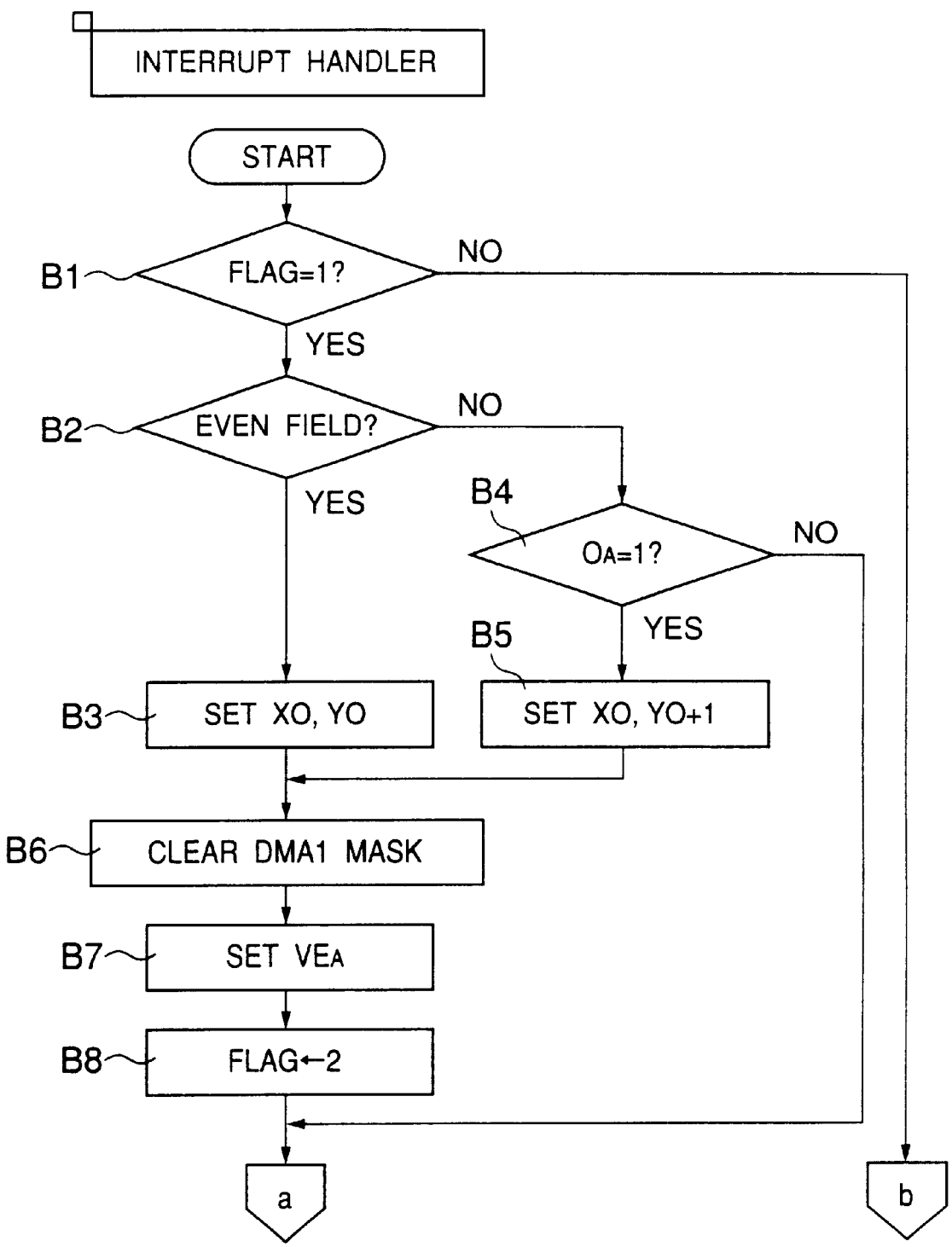
FIG. 9 is a flow chart for explaining an interrupt process.
Figure 10:
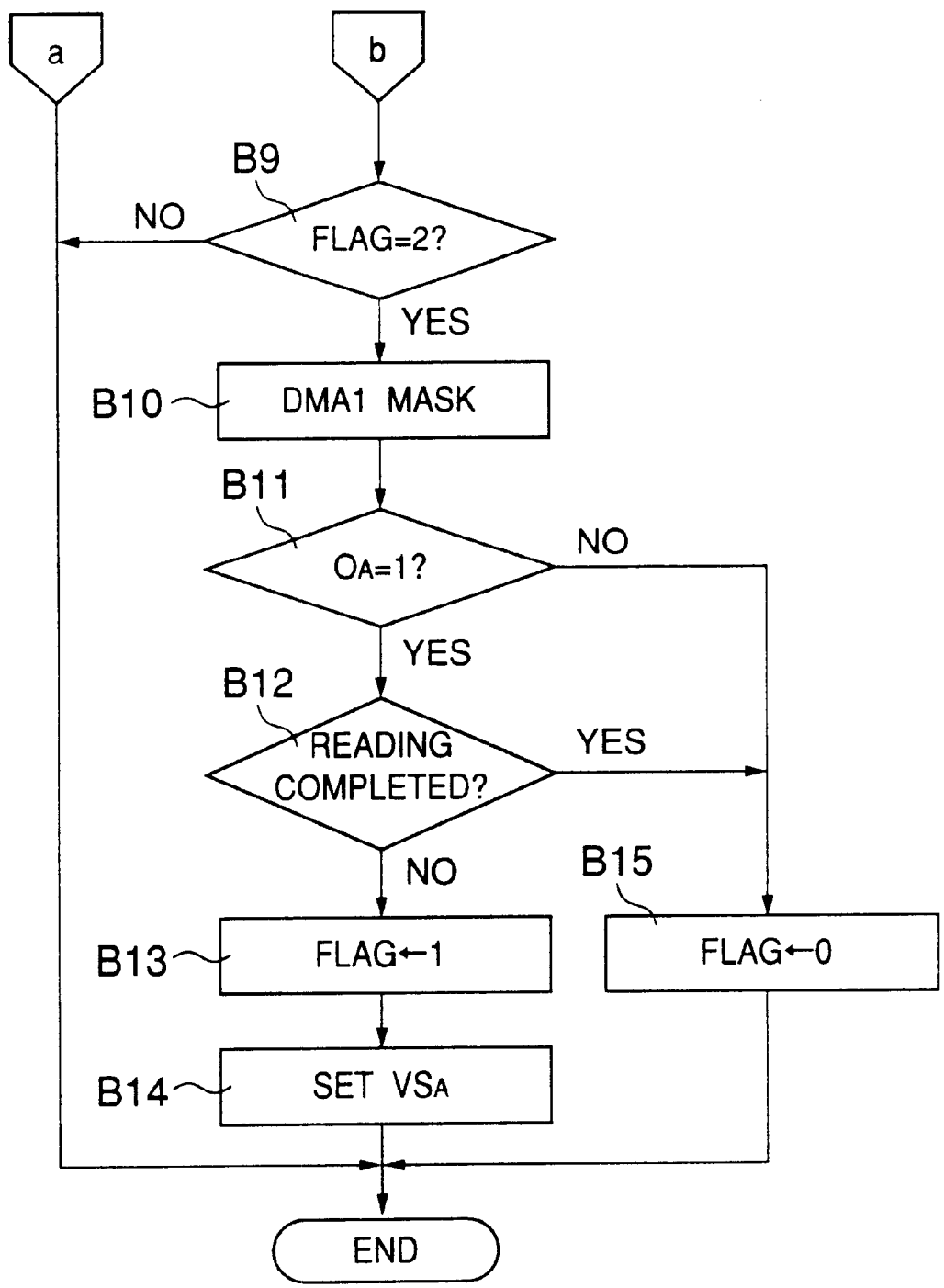
FIG. 10 is a flow chart for explaining the interrupt process.

FIGS. 9 and 10 are flow charts for explaining an interrupt process. The flow charts shown in FIGS. 9 and 10 correspond to the interrupt process of the interrupt handler 11. A description will hereinafter be given separately for the case where n=1 and for the case where n=2 to 4.

First, in the case where n=1, a step B1 shown in FIG. 9 decides whether or not the video signal read complete recognition variable FLAG is 1. If the decision result in the step B1 is YES, a step B2 decides whether or not the field is an even field. If the decision result in the step B2 is YES, a step B3 sets the transfer destination address XO, YO in the DMAC 13, and a step B6 clears the mask of a DMA1 of the DMAC 13. A step B7 sets $VE_1$ as the next interrupt generation condition, a step B8 substitutes 2 into the video signal read complete recognition variable FLAG, and the process ends.

On the other hand, if the decision result in the step B1 is NO, a step B9 shown in FIG. 10 decides whether not the video signal read complete recognition variable FLAG is 2. If the decision result in the step B9 is YES, a step B10 masks the DMA1 of the DMAC 13. A step B11 decides whether or not the odd/even field read variable $O_A$ is 1. If the decision result in the step B11 is NO, a step B15 substitutes 0 into the video signal read complete recognition variable FLAG, and the process ends. On the other hand, if the decision result in the step B11 is YES, a step B12 decides whether or not the reading of the odd and even fields is completed, and the process advances to the step B15 if the decision result in the step B12 is YES. If the decision result in the step B12 is NO, a step B13 substitutes 1 into the video signal read complete recognition variable FLAG. In addition, a step B14 sets the interrupt generation condition $VS_A$, and the process ends.

If the decision result in the step B2 shown in FIG. 9 is NO, a step B4 decides whether or not the odd/even field read variable $O_A$ is 1. If the decision result in the step B4 is YES, a step B5 sets the transfer destination address to XO, YO+1, and the process advances to the step B6. On the other hand, if the decision result in the step B4 is NO, the process ends.

More particularly, the video signal is input to the line memory 5 via the horizontal direction reducer 4. The reduction value of the horizontal direction reducer 4 is 1, and the reducing process is not carried out with respect to the video signal. When data amounting to 1 line is stored in the line memory 5, a DMA request signal is supplied to the DMAC 13. The DMAC 13 transfers the data amounting to 1 line and stored in the line memory 5 to the transfer destination address XO, YO, and YO of the transfer destination address is incremented by 2.

Next, when data amounting to 1 line is stored in the line memory 5, a DMA request signal is again supplied to the DMAC 13. Hence, the data amounting to 1 line and stored in the line memory 5 is transferred to the transfer destination address XO, YO+2, and YO of the transfer destination address is incremented by 2. Accordingly, the data amounting to 1 line is stored for every other vertical direction address YO of the picture composing memory 6. In addition, because the interrupt generation condition $VS_1$ indicates a starting line of the effective region of the video signal, the data transfer is started from the start of the video signal from the video signal source.

The input signal monitoring unit 3 receives the video signal from the video signal source via the video signal selector 2. When the $VE_1$-th line is reached by starting the count from the vertical synchronizing signal V of the video signal, the input signal monitoring unit 3 notifies an interrupt signal to the interrupt controller 12, and the interrupt controller 12 calls the interrupt handler 11 depending on the interrupt generation condition.

In this state, FLAG=2 since 2 is substituted into the video signal read complete recognition variable FLAG in the step B8 shown in FIG. 9. In addition, the decision result in the step B1 shown in FIG. 9 is NO. Hence, the process advances to the step B9 shown in FIG. 10 and the video signal read complete recognition variable FLAG becomes FLAG=2. As a result, the interrupt handler 11 masks the DMAC 13 and the operation of the DMAC 13 is ended. The odd/even field read variable $O_1$ is 1 and the even field is read, but the odd field is not read. Accordingly, 1 is again substituted into the video signal read complete recognition variable FLAG in the step B13 shown in FIG. 10, the interrupt generation condition $VE_1$ is set in the step B14, and the process ends. The interrupt generation condition $VE_1$ indicates the ending line of the effective region of the video signal, and thus indicates the completion of the data transfer amounting to 1 field of the video signal from the video signal source.

When the $VS_1$-th line is reached by starting the count from the vertical synchronizing signal V of the video signal from the video signal source, the interrupt handler 11 is called. In this state, FLAG=1 in the step B1 and the data of the off field is being input in the step B2. Hence, the transfer destination address XO, YO+1 is set in the DMAC 13 in the step B5, and the masking of the DMA1 of the DMAC 13 is cleared in the step B6. Then, the next interrupt generation condition $VE_1$ is set in the step B7, 2 is substituted into the video signal read complete recognition variable FLAG in the step B9, and the process ends.

When the DMAC 13 receives the DMA request signal, the DMAC 13 transfers the data amounting to 1 line and stored within the line memory 5 to the transfer destination address XO, YO+1, and increments the transfer destination vertical direction address YO by 2. In other words, the next data amounting to the 1 line is stored at the transfer destination address XO, YO+3. Hence, the data are successively stored at shifted locations in the picture composing memory 6 so as to form pairs with the data of the even fields.

Similarly as described above, when the $VE_1$-th line is reached by starting the count from the vertical synchronizing signal V of the video signal from the video signal source, the interrupt handler 11 is called. In this state, FLAG=2 and the DMA1 of the DMAC 13 is masked, so as to end the operation of the DMAC 13. In addition, since $O_1$=1 in the step B11 shown in FIG. 10 and only the odd field is read in the step B12, 0 is substituted into the video signal read complete recognition variable FLAG in the step B15, and the process ends. Further, because the interrupt generation condition $VE_1$ indicates the ending line of the effective region of the video signal, the completion of the data transfer amounting to 1 frame of the video signal from the video signal source is indicated.

On the other hand, in the case where n=2 to 4, when FLAG=1 in the step B1 and the data of the odd field is presently being input, the process of the interrupt handler 11 is ended immediately so as to wait for the input of the data of the even field. In addition, when the data of the even field is being input, the transfer destination address XO, YO is set in the DMAC 13 in the step B3, and the masking of the DMA1 of the DMAC 13 is cleared in the step B6. Then, the next interrupt generation condition $VE_1$ is set in the step B7, 2 is substituted in the video signal read complete recognition variable FLAG in the step B8, and the process ends.

In this state, if the reduction value is ½, the video signal which is thinned by ½ in the horizontal direction reducer 4 is input to the line memory 5. As soon as the data amounting to 1 line is stored in the line memory 5, the DMA request signal is supplied with respect to the DMAC 13. When the DMAC 13 receives the DMA request signal, the DMAC 13 transfers the data amounting to 1 line stored in the line memory 6 to the transfer destination address XO, YO, and increments the vertical direction address YO by 1.

When the next data amounting to 1 line is stored in the line memory 5, a DMA request signal is supplied again to the DMAC 13. As a result, the transfer destination address becomes XO, YO+1, and the data amounting to 1 line is transferred from the line memory 5. Then, the vertical direction address YO is incremented by 1. Further, because the interrupt generation condition $VS_1$ indicates the starting line of the effective region of the video signal, the start of the data transfer from the start of the video signal from the video signal source is indicated.

Similarly as described above, when the $VE_1$-th line is reached by starting the count from the vertical synchronizing signal V of the video signal from the video signal source, the interrupt handler 11 is called. In this state, FLAG=2 in the step B9 and the DMA1 of the DMAC 13 is masked in the step B10, so as to end the operation of the DMAC 13. In addition, since $O_1$=0, 0 is substituted in the video signal read complete recognition variable FLAG in the step B15, and the process ends. Further, when the interrupt generation condition $VE_1$ indicates the ending line of the effective region of the video signal, the horizontal direction of the video signal from the video signal source is reduced by ½, and the transfer of the data amounting to 1 field is completed.

While the above described process is being carried out by the interrupt handler 11, the picture composing controller 9 monitors the value of the video signal read complete recognition variable FLAG, and waits until the value becomes 0. When the value of the video signal read complete recognition variable FLAG becomes 0, the reading of the video signal amounting to 1 frame is completed. Hence, the interrupt is masked and A=1 is updated to A=2, so as to repeat the process described above.

Figure 2A:
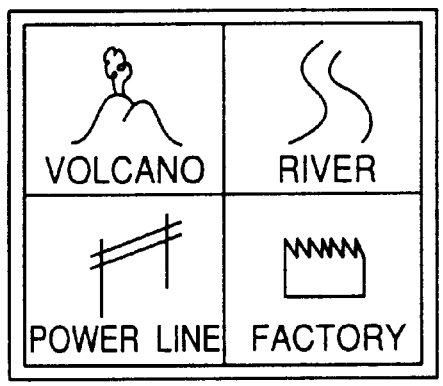
FIGS. 2A through 2D respectively are diagrams showing monitoring screens at receiving ends of a remote monitoring system for explaining a multiple picture composing.
Figure 2B:
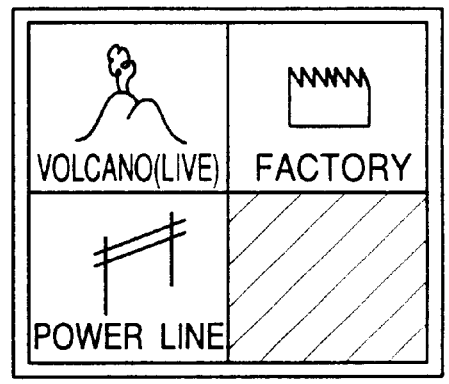
Figure 2C:
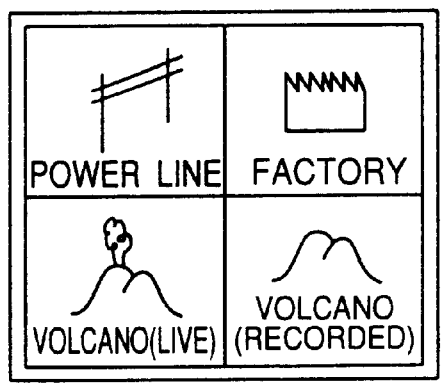
Figure 2D:
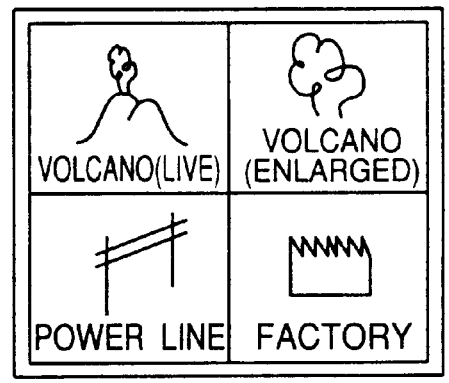

The above described process is carried out for A=1 to A=n, and upon completion of the process, the reading of the data amounting to 1 frame into the picture composing memory 6 is completed, With respect to the data from the picture composing memory 6, the encoding memory 7 and the encoder 8 carry out an encoding process under the control of the encoding controller 10, and a transmission process is carried out to transmit the encoded video signal to the network 214. The encoding process and/or the transmission process depend on the system, and for example, the encoding process may be the H.261, H.263, MPEG1, JPEG or the like, while the transmission process may be with respect to the low-speed LAN for the bit map data, low-speed point-to-point protocol (PPP) or the like. Upon completion of the encoding process and/or the transmission process, the video signal is read again for A=1 to A=n, so as to repeat the above described process. If the video signal is read for A=1 to A=4 as described above, the composed picture obtained as a result of the picture composing process becomes as shown in FIGS. 2A, 2C and 2D, for example.

Figure 11:
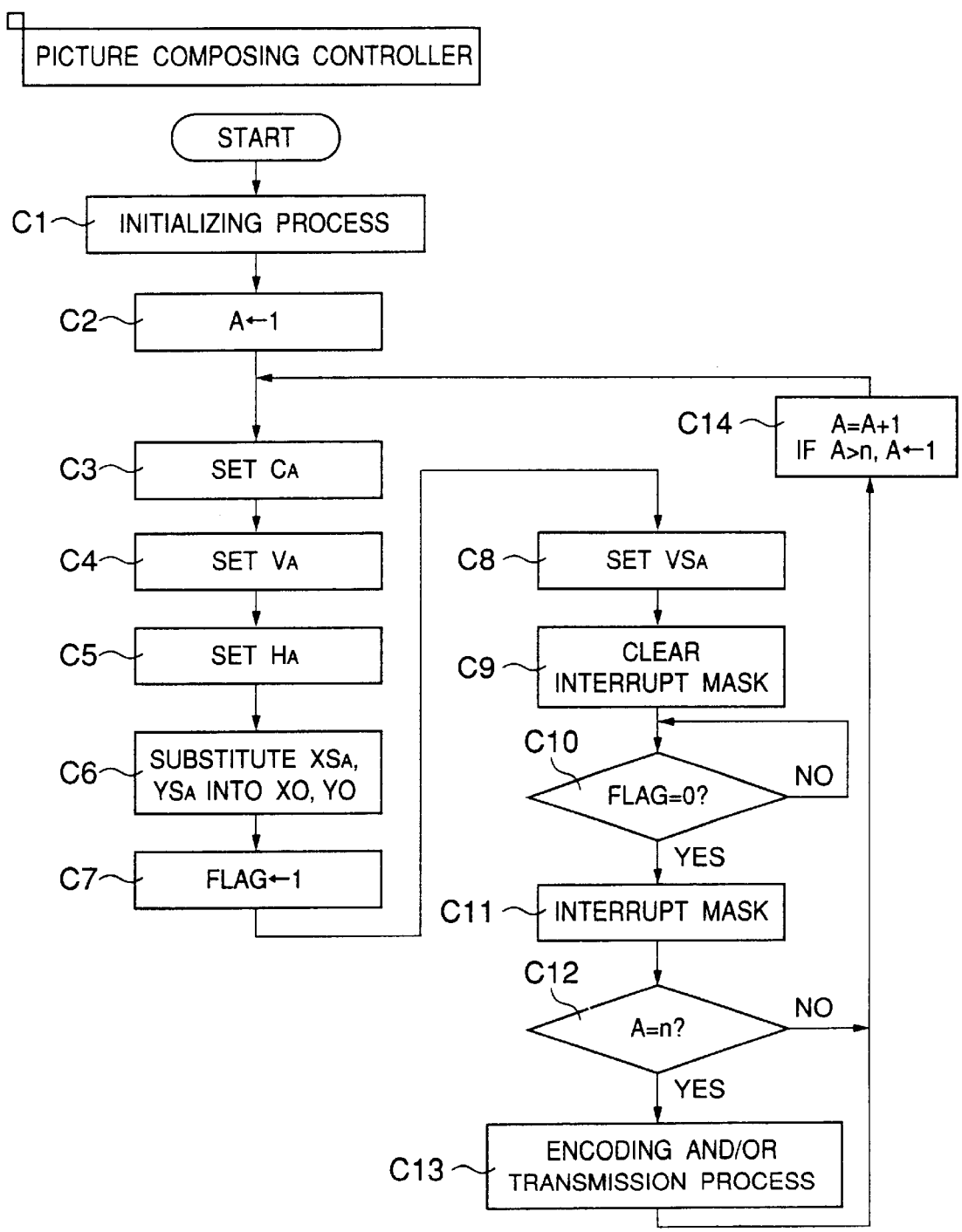
FIG. 11 is a flow chart for explaining a picture composing process of the first embodiment.

FIG. 11 is a flow chart for explaining a picture composing process of the first embodiment. First, a step C1 carries out the initializing process shown in FIG. 7. A step C2 substitutes 1 into A, and a step C3 sets $C_A$ to the video signal selector 2 shown in FIG. 5. A step C4 sets the increment value $V_A$ of the picture composing memory 6, and a step C5 sets the horizontal direction reduction value $H_A$ in the horizontal direction reducer 4. A step C6 substitutes $XS_A$, $YS_A$ into the picture transfer destination address XO, YO. A step C8 sets the interrupt generation condition $VS_A$, and a step C9 clears the interrupt mask.

A step C10 decides whether or not FLAG=0, and a step C11 carries out the interrupt mask if the decision result in the step C10 is YES. A step C12 decides whether or not A=n, and if the decision result in the step C12 is YES, the reading is completed and a step C13 carries out the encoding process and/or the transmission process. A step C14 increments A by 1, and if A>n, 1 is substituted into A and the process returns to the step C3. On the other hand, if the decision result in the step C12 is NO, the process advances to the step C14 described above. Accordingly, n asynchronous video signals are composed, encoded and transmitted to the receiving end.

Figure 12:
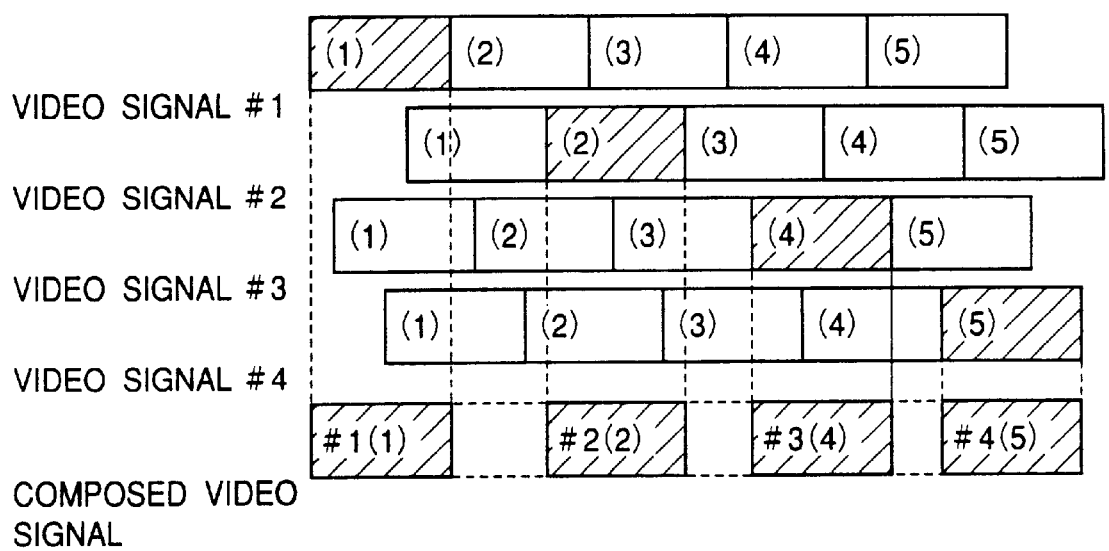
FIG. 12 is a diagram for explaining the composing of the asynchronous video signals.

FIG. 12 is a diagram for explaining the composing of the asynchronous video signals. In FIG. 12, video signals #1 through #4 are asynchronous, and (1), (2), (3), . . . indicate frame numbers. When composing the video signals #1 through #4 in this order, the composed video signal becomes #1(1), #2(2), #3(4) and #4(5), and although the illustration of the next video signal forming the composed video signal is omitted, the next video signal is #1(7). The frame rate of one video signal is 29.97 Hz, and the frame rate at which the reading is made as a whole in the case described above is inbetween 29.97 Hz and 14.985 Hz which is ½ of 29.97 Hz. In addition, in the case of the composed picture made up of 4 pictures, the frame rate at which the video signal #1 is read is between 7.4925 Hz which is ¼ the frame rate of 29.97 Hz and 3.74625 Hz which is ½ of 7.4925 Hz. The read time per frame is (1/29.97) sec to (2/29.97) sec.

Figure 13:
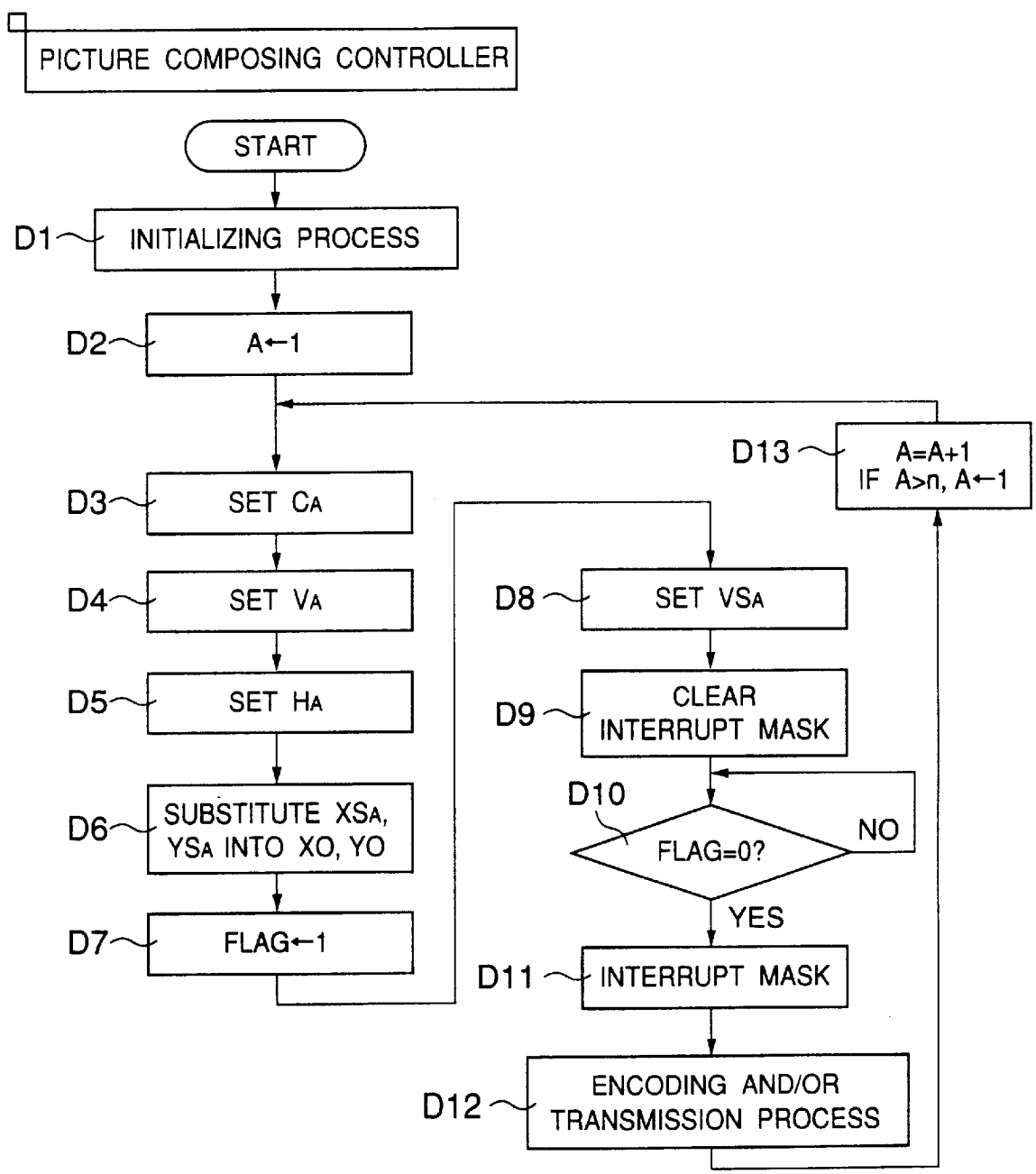
FIG. 13 is a flow chart for explaining the picture composing process of a second embodiment of the multiple picture composing apparatus according to the present invention.

It is necessary to wait for the start of the frame when composing such asynchronous video signals. For example, when composing 9 video signals to obtain a composed picture made up of 9 pictures, a wait time of approximately 300 msec to 600 msec is generated, and the encoding process and/or the transmission process cannot be carried out during this wait time. In the case of a still picture transmission which requires an extremely long time of 1 sec to several tens of sec to encode 1 frame or a transmission via a network having a narrow communication band of approximately 64 kbps or less, for example, it is possible to sufficiently apply the multiple picture composing means of the first embodiment shown in FIG. 5 to compose the asynchronous video signals. However, the wait time becomes a problem in the case of a transmission via a network having an intermediate transmission band of approximately 64 kbps to 1.5 Mbps which completes the encoding of 1 frame in several tens of msec to several hundreds of msec. b FIG. 13 is a flow chart for explaining the picture composing process of a second embodiment of the multiple picture composing apparatus according to the present invention. This embodiment of the multiple picture composing apparatus employs a second embodiment of a multiple picture composing method according to the present invention. Because the important part of the transmission unit 213 shown in FIG. 3 which composes and encodes the asynchronous video signals may have the same construction as that shown in FIG. 5, the illustration thereof will be omitted.

In FIG. 13, steps D1 through D10 respectively correspond to the steps C1 through C10 shown in FIG. 11, and a description thereof will be omitted. In the first embodiment shown in FIG. 11, after the reading of the video signal from the video signal source 1-1 is completed by setting A to A=1, A is successively set to A=2, 3, . . . , n, so as to read the video signals from the video signal sources 1-2 through 1-n. In addition, the encoding process and/or the transmission process are carried out after reading of 1 frame of the video signal from each of the video signal sources 1-1 through 1-n is completed.

On the other hand, in this second embodiment, steps D11 through D13 are carried out, and by completing the reading of the video signal from the video signal source 1-1 for A=1, for example, the step D12 carries out an encoding process and/or a transmission process. The step D11, prior to the step D12, carries out an interrupt, similarly to the step C11 shown in FIG. 11. Then, the step D13 increments A by 1, and 1 is substituted into A if A>n. Hence, the video signal from the video signal source 1-2 is read for A=2, and the encoding process and/or the transmission process are carried out upon completion of this reading of the video signal from the video signal source 1-2. The above described process is repeated until A becomes A=n, and when A becomes A>n, A is set to A=1 in the step D13 and the process returns to the step D3.

Accordingly, the initial values are stored in blocks of the picture composing memory 6 shown in FIG. 5 other than the block which stores the video signal from the video signal source 1-1 for A=1. After the encoding process and/or the transmission process are completed with respect to the video signal from the video signal source 1-1, A is set to A=2, and the reading of the video signal from the video signal source 1-2 for A=2 is started. Upon completion of this reading of the video signal from the video signal source 1-2, the data stored in the picture composing memory 6 is subjected to an encoding process and/or a transmission process.

At this point in time, the initial values are stored in the blocks of the picture composing memory 6 other than the blocks which store the video signals from the video signal sources 1-1 and 1-2. In addition, the block of the picture composing memory 6 storing the video signal from the video signal source 1-1 has the same content as that at the time of the previous encoding process and/or the transmission process. Hence, by repeating the process for A=1 to A=n, the contents of the picture composing memory 6 are successively updated for every 1 block. In this case, even if the number n of the video signal sources is set to a large value, the wait time of the picture composing process using the asynchronous video signals falls in a range of approximately 33 msec to 66 msec, and this embodiment is sufficiently applicable to a system which carries out the encoding process and/or the transmission process at a rate of 15 frames/sec.

Figure 14:
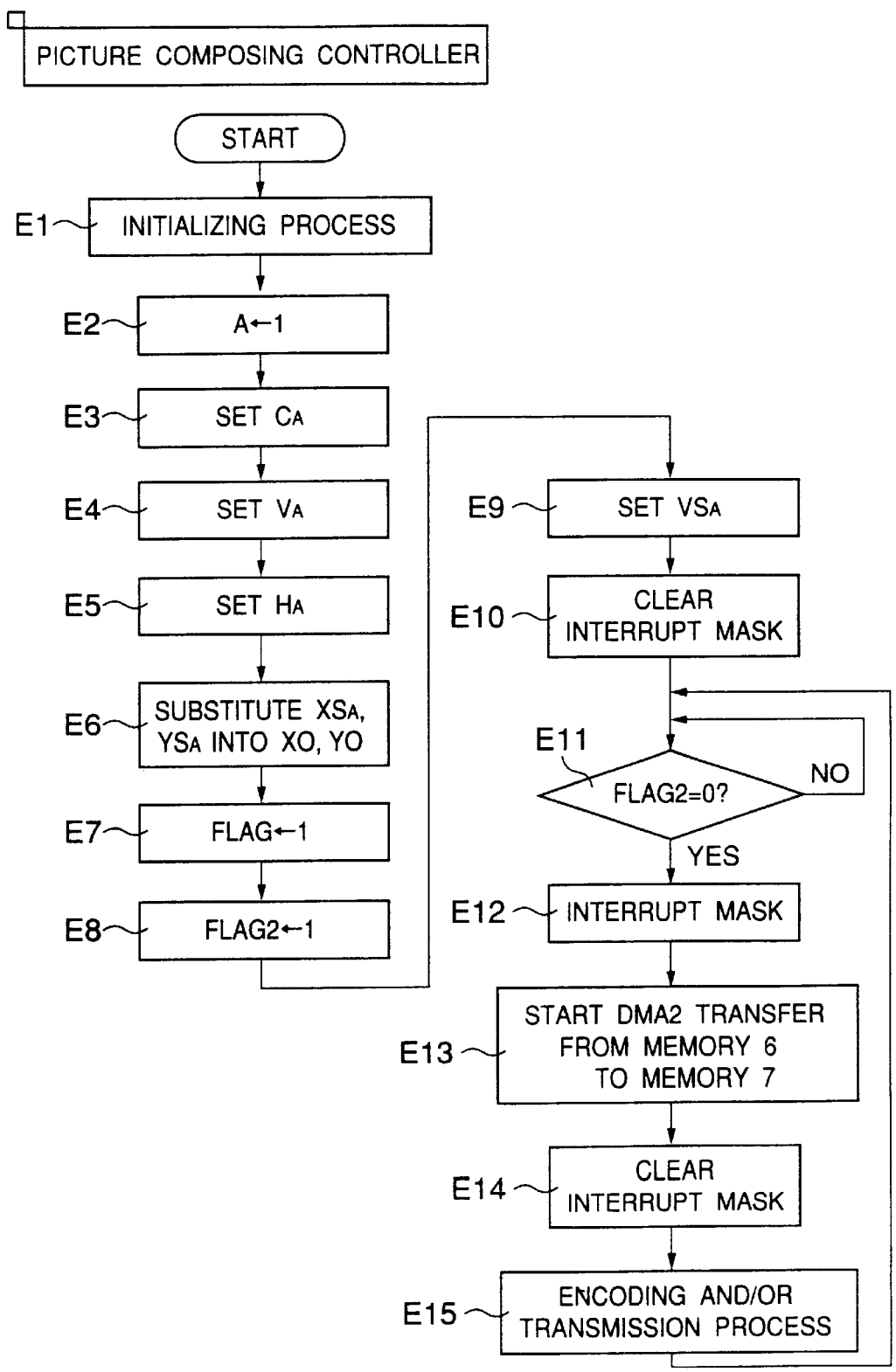
FIG. 14 is a flow chart for explaining the picture composing process of a third embodiment of the multiple picture composing apparatus according to the present invention.

FIG. 14 is a flow chart for explaining the picture composing process of a third embodiment of the multiple picture composing apparatus according to the present invention. This embodiment of the multiple picture composing apparatus employs a third embodiment of the multiple picture composing method according to the present invention. Because the important part of the transmission unit 213 shown in FIG. 3 which composes and encodes the asynchronous video signals may have the same construction as that shown in FIG. 5, the illustration thereof will be omitted.

In FIG. 14, steps E1 through E7 respectively correspond to the steps C1 through C7 shown in FIG. 11 and the steps D1 through D7 shown in FIG. 13, and a description thereof will be omitted. This third embodiment includes a process of transferring the data from the picture composing memory 6 to the encoding memory 7 by DMA, and additionally uses a video signal read complete recognition variable FLAG2.

In other words, the step E7 substitutes 1 into the video signal read complete recognition variable FLAG, and a step E8 substitutes 1 into the video signal read complete recognition variable FLAG2. A step E9 sets an interrupt generation condition $VS_A$, and a step E10 clears the interrupt mask. A step E11 decides whether or not FLAG2=0, and a step E12 carries out an interrupt mask if the decision result in the step E11 is YES. A step E13 starts a data transfer from the picture composing memory 6 to the encoding memory 7 by a DMA2 of the DMAC 14, and a step E14 clears the interrupt mask. A step E15 carries out an encoding process and/or a transmission process, and the process returns to the step E11.

Figure 15:
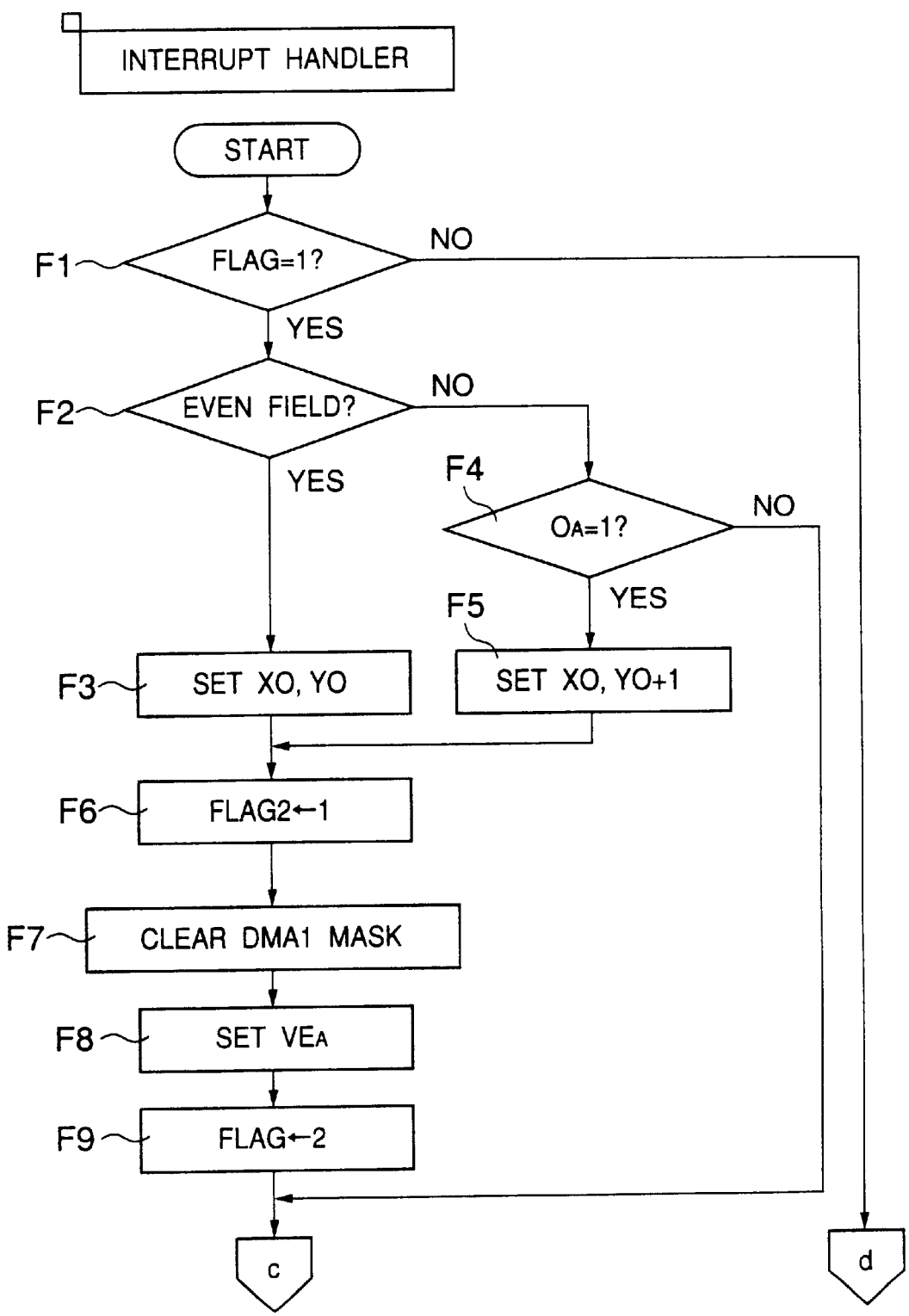
FIG. 15 is a flow chart for explaining an interrupt process of the third embodiment.
Figure 16:
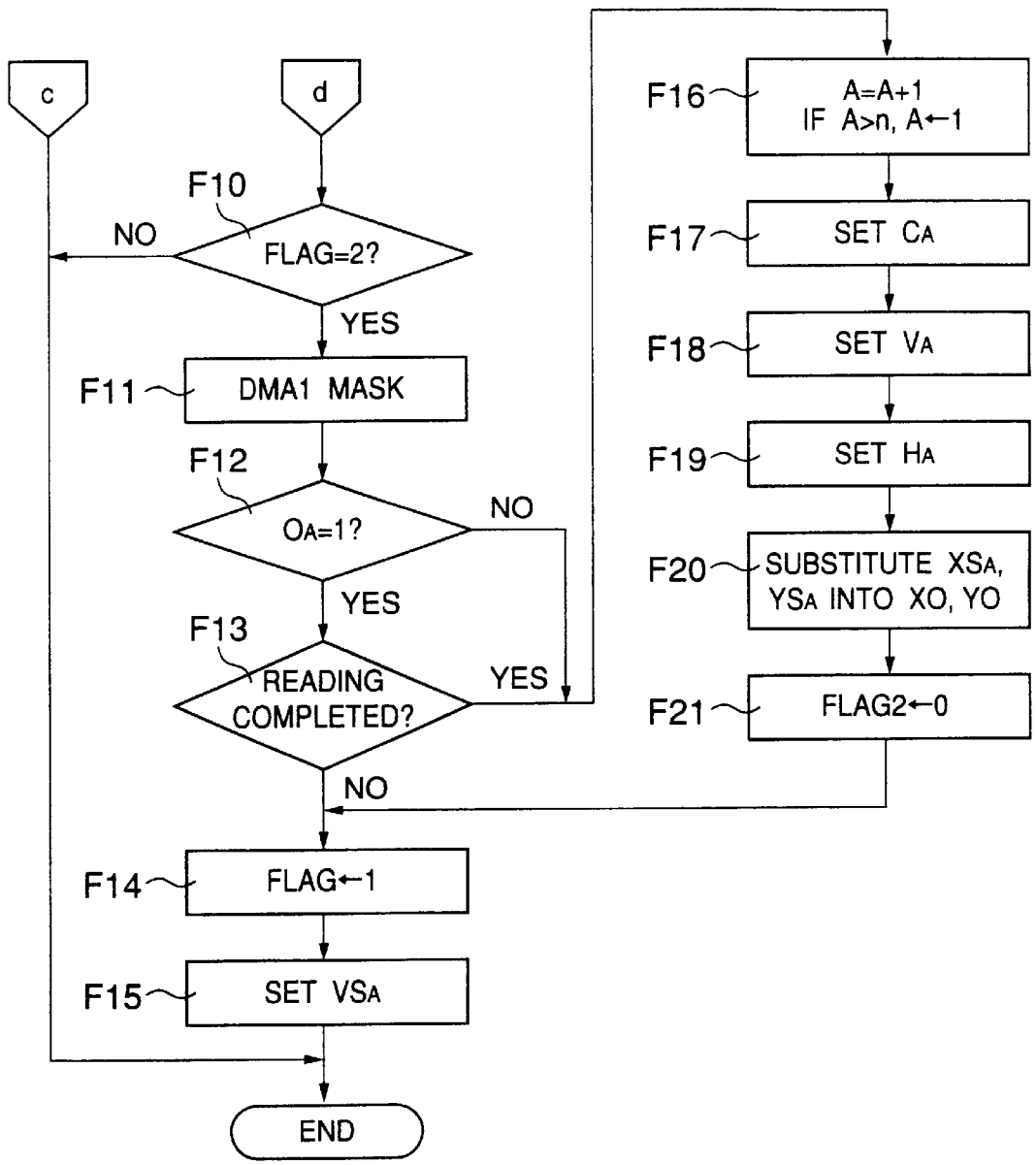
FIG. 16 is a flow chart for explaining the interrupt process of the third embodiment.

FIGS. 15 and 16 are flow charts for explaining an interrupt process of the third embodiment. In FIG. 15, steps F1 through F5 respectively correspond to the steps B1 through B5 shown in FIG. 9, and a description thereof will be omitted. In this embodiment, a step F6 substitutes 1 into the video signal read complete recognition variable FLAG2 after the step F3 or F5 and prior to a step F7 which clears the mask of the DMA1 of the DMAC 13. Then, the mask of the DMA1 is cleared in the step F7. A step F8 sets an interrupt generation condition $VE_A$, a step F9 substitutes 1 into the video signal read complete recognition variable FLAG, and the process ends.

If the decision result in the step F1 is NO, a step F10 shown in FIG. 16 decides whether or not FLAG=2. The process ends if the decision result in the step F10 is NO. On the other hand, if the decision result in the step F10 is YES, a step F11 masks the DMA1 of the DMAC 13, and a step F12 decides whether or not $O_A=1$. If the decision result in the step F12 is YES, a step F13 decides whether or not the reading is completed, and a step F14 substitutes 1 into the video signal read complete recognition variable FLAG if the decision result in the step F13 is NO. A step F15 sets an interrupt generation condition $VS_A$, and the process ends. These steps F10 through F15 respectively correspond to the steps B9 through B14 shown in FIG. 10.

On the other hand, if the decision result in the step F12 is NO or the decision result in the step F13 is YES, the process advances to a step F16. For example, if $O_1=1$ when A=1 and the reading of the video signal amounting to 1 frame is completed or, if $O_1=0$ and the reading of the video signal is completed, the interrupt handler 11 changes A from A=1 to A=2. More particularly, the step F16 increments A by 1, and substitutes 1 to A if A>n. A step F17 sets $C_A$ in the video signal selector 2. In this case, A=2, and $C_2$ is set in the video signal selector 2. As a result, the video signal selector 2 selects the video signal from the video signal source 1-2.

A step F18 sets an increment value $V_A$ of the picture composing memory 6, and a step F19 sets a horizontal direction reduction value $H_A$ in the horizontal direction reducer 4. A step F20 substitutes $XS_A$, $YS_A$ into a picture transfer destination address XO, YO. In this case, the increment value set in the DMAC 13 is $V_1$, the reduction value set in the horizontal direction reducer 4 is $H_1$, and $XS_1$, $YS_1$ is substituted into the transfer destination address XO, YO. When the above described process is completed, a step F21 substitutes 0 into the video signal read complete recognition variable FLAG2, and the process advances to the step F14. Hence, the step F14 substitutes 1 into the video signal read complete recognition variable FLAG, the step F15 sets an interrupt generation condition $VS_2$, and the process ends.

While the process is being carried out by the interrupt handler 11, the picture composing controller 9 monitors the value of the video signal read complete recognition variable FLAG2 and waits until the value becomes 0. When the value of the video signal read complete recognition variable FLAG becomes 0, the reading of the video signal amounting to 1 frame from the video signal source 1-1 is completed, and thus, the interrupt is masked, and the data transfer from the picture composing memory 6 to the encoding memory 7 is thereafter carried out by the DMAC 14. Upon completion of this DMA transfer, the interrupt mask is cleared, and the encoding process and/or the transmission process is carried out by the encoder 8.

While the encoding process and/or the transmission process are being carried out, the interrupt mask continues to remain in the cleared state. Hence, if an interrupt signal is received in this state, the interrupt handler 11 is called, and the video signal from the video signal source 1-2 next to the video signal source 1-1 is read into the picture composing memory 6. After this reading of the video signal is completed, the setting is next made to read the video signal from the video signal source 1-3. Furthermore, if an interrupt signal is received, the interrupt handler 11 is called, and this time, the video signal from the video signal source 1-3 is read into the picture composing memory 6. By repeating such a process, the reading, encoding and.or transmission of the video signal are made, and the composed video signal in which the pictures are composed and encoded is transmitted to the receiving end.

When the encoding process and/or the transmission process controlled by the picture composing controller 9 end, the value of the video signal read complete recognition variable FLAG2 is monitored. When the value of the video signal read complete recognition variable FLAG2 is 1, it is indicated that the DMA transfer of one of the video data to the picture composing memory 6 is presently being made. On the other hand, when the value of the video signal read complete recognition variable FLAG2 is 0, it is indicated that no DMA transfer of the video data is presently being made. When the DMA transfer from the picture composing memory 6 to the encoding memory 7 is made during the DMA transfer of the video data to the picture composing memory 6, the video signal presently being read into the encoding memory 7 becomes cut at an intermediate point. Hence, the interrupt mask is carried out until the value of the video signal read complete recognition variable FLAG2 becomes 0.

When the value of the video signal read complete recognition variable FLAG2 becomes 0, the DMA transfer is made from the picture composing memory 6 to the encoding memory 7. When this DMA transfer is completed, the interrupt mask is cleared, and the encoding process and/or the transmission process are carried out, so as to repeat the series of operations described above. In this embodiment, the reading of the video signal continues while the encoding process and/or the transmission process are being carried out. For this reason, it is possible to read an amount of video signal that can be read, without deteriorating the encoding efficiency. Hence, the picture composing process can be carried out efficiently.

FIGS. 17A and 17B respectively are diagrams for explaining reading frames. More particularly, FIG. 17A shows the reading frames in the prior art, and FIG. 17B shows the reading frames in this embodiment. In FIGS. 17A and 17B, the video signals from the 4 video signal sources 1-1 through 1-4 are respectively denoted by #1 through #4.

FIG. 17A shows a case where the synchronized video signals such as those shown in FIG. 1 are composed. In this case, 1 frame is divided into 4, the video signals from the 4 video signal sources 201 are denoted by #1 through #4 and composed, and the composed video signal is encoded and transmitted from the transmission unit 203. When transmitting the composed video signal via the network 204 which has a narrow transmission band, the compression and encoding are carried out. But when the compression and encoding are carried out, some frames are discarded due to the time required to carry out the encoding process, the amount of information generated and the like. Accordingly, the frames which are compressed and transmitted are actually thinned, and the frame rate is low.

On the other hand, FIG. 17B shows this embodiment wherein the asynchronous video signals #1 through #4 from the 4 video signal sources 1-1 through 1-4 are successively read, the video signals #1 through #4 are composed and subjected to the encoding process. When the composed video signal is transmitted via the network 214 which has a narrow transmission band, the thinning occurs and a high frame rate cannot be obtained, as described above. Hence, in this embodiment, after reading the video signal #1 amounting to 1 frame, for example, the next video signal #2 amounting to 1 frame is read, and the video signals #3, #4, #1, #2, . . . are successively read in units of 1 frame. In other words, the frames are essentially thinned before the pictures are composed, and the composed picture is subjected to the encoding process.

Figure 18A:
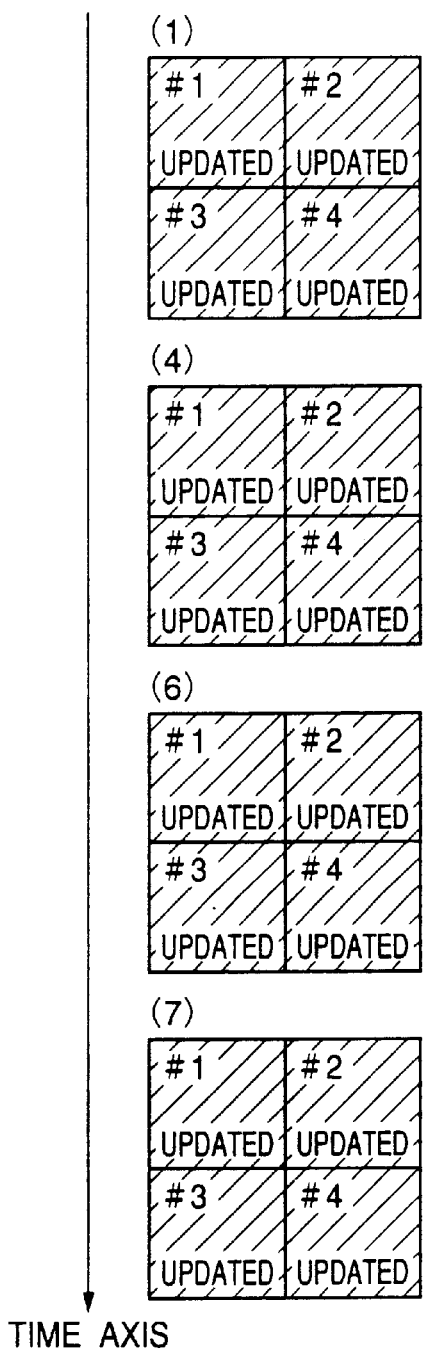
FIGS. 18A and 18B respectively are diagrams for explaining encoding frames.
Figure 18B:
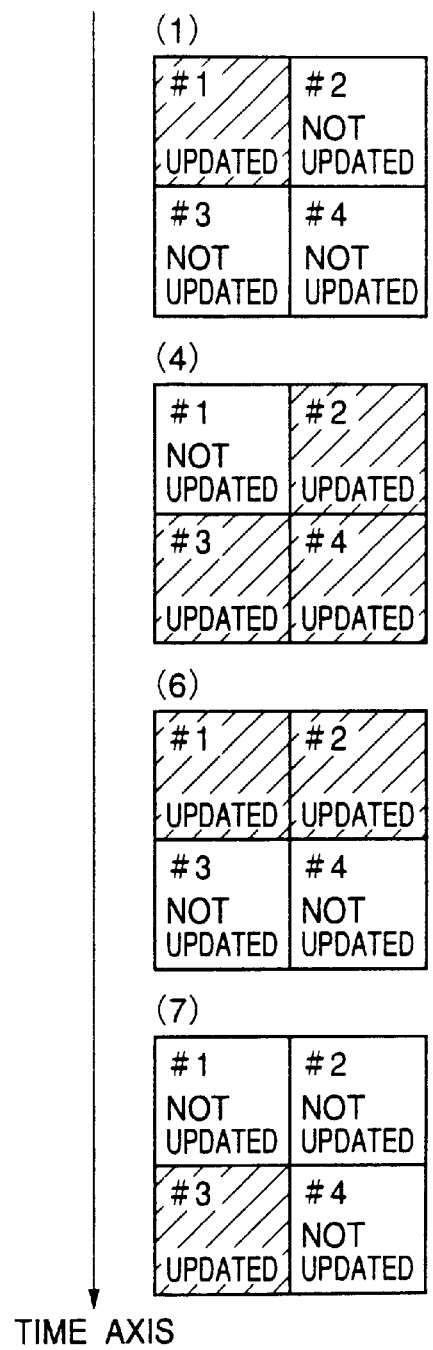

FIGS. 18A and 18B respectively are diagrams for explaining encoding frames.

FIG. 18A shows the encoding frames in the prior art corresponding to FIG. 17A, with respect to the frames (1), (4), (6) and (7) which are actually compressed and transmitted in the case shown in FIG. 17A. As shown in FIG. 18A, 1 frame is formed by composing the video signals #1 through #4 and the encoding process is carried out in the prior art. Hence, contents of each of the frames (1), (4), (6) and (7) are updated.

On the other hand, FIG. 18B shows the encoding frames in this embodiment corresponding to FIG. 17B. As shown in FIG. 18B, the video signal #1 is read, composed and encoded in the frame (1), and only the portion of the video signal #1 is updated. In the next frame (4), the video signals #2 through #4 are read, composed and encoded, and the portion of the video signal #1 is not updated while the portions of the video signals #2 through #4 are updated.

In the next frame (6), the video signals "1 and #2 are read, composed and encoded, and the portions of the video signals #1 and #2 are updated while the portions of the video signals #3 and #4 are not updated. In the next frame (7), the video signal #3 is read, composed and encoded, and only the portion of the video signal #3 is updated. Accordingly, the difference between the frames is zero for the portion which is not updated, and the difference between the frames is only generated for the portion which is updated. As a result, the encoding process is simple compared to the case where the entire 1 frame of the composed picture is subjected to the encoding process.

Figure 19A:
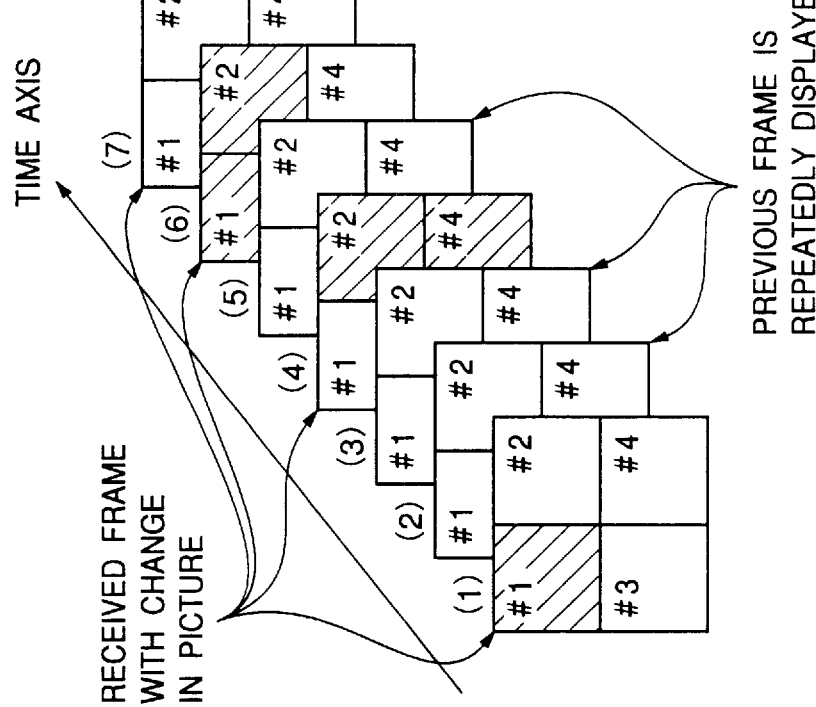
FIGS. 19A and 19B respectively are diagrams for explaining receiving and displaying frames.
Figure 19B:
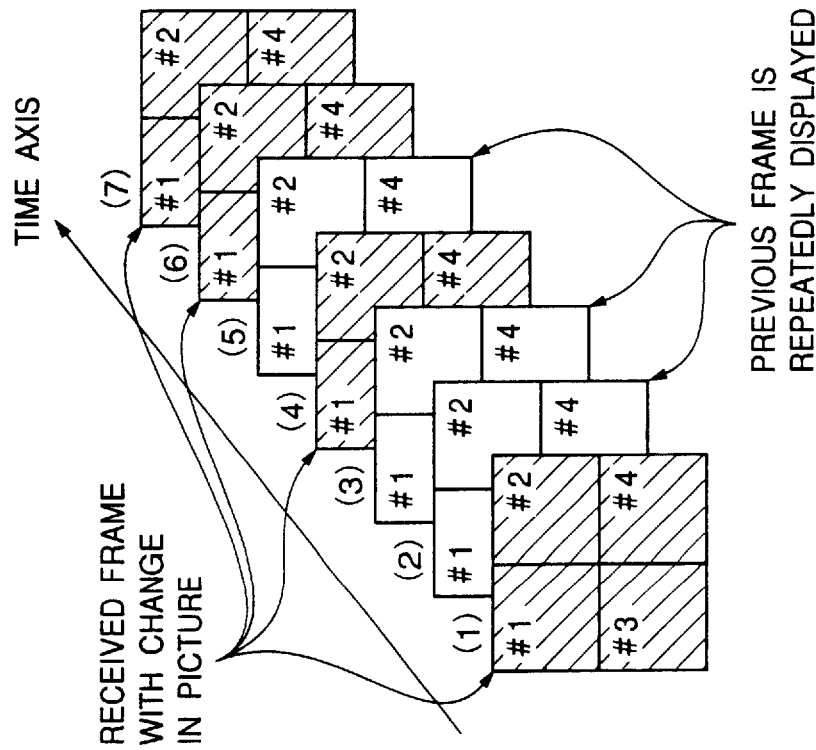

FIGS. 19A and 19B respectively are diagrams for explaining receiving and displaying frames.

FIG. 19A shows the receiving and displaying frames for the prior art corresponding to FIGS. 17A and 18A. In the case of the prior art shown in FIG. 19A, the frames (1), (4), (6) and (7) are received, and during the time corresponding to the frames (2) and (3) the contents obtained by a decoding process carried out with respect to the preceding frame (1) are repeatedly displayed. In addition, during the time corresponding to the frame (5), the contents obtained by the decoding process carried out with respect to the preceding frame (4) are displayed.

On the other hand, FIG. 19B shows the receiving and displaying frames in this embodiment corresponding to FIGS. 17B and 18B. For example, with respect to the video signal #1, the contents of the frame (1) are repeatedly displayed up to the frame (6) which is updated. In addition, with respect to the video signal #2, the contents of the frame (1) is repeatedly displayed up to the frame (4) which is updated.

For example, when carrying out the picture composing process by CCIR601 for an effective area of 704 pixels×480 lines, the amount of data per 1 pixel is 1 byte, and the line memory 5 shown in FIG. 5 must store 704 bytes of data per 1 line. Hence, in order to provide a sufficient margin for rewriting data, it is desirable that the line memory 5 has a memory capacity of approximately 2 kbytes. In addition, it is desirable tat the picture composing memory 6 shown in FIG. 5 has a memory capacity of approximately 704×480× 1.5 bytes, that is, approximately 512 kbytes, for example, by taking into consideration the color difference signal and the like. The memory capacity of the picture composing memory 6 is independent of the number of pictures to be composed.

Figure 20:
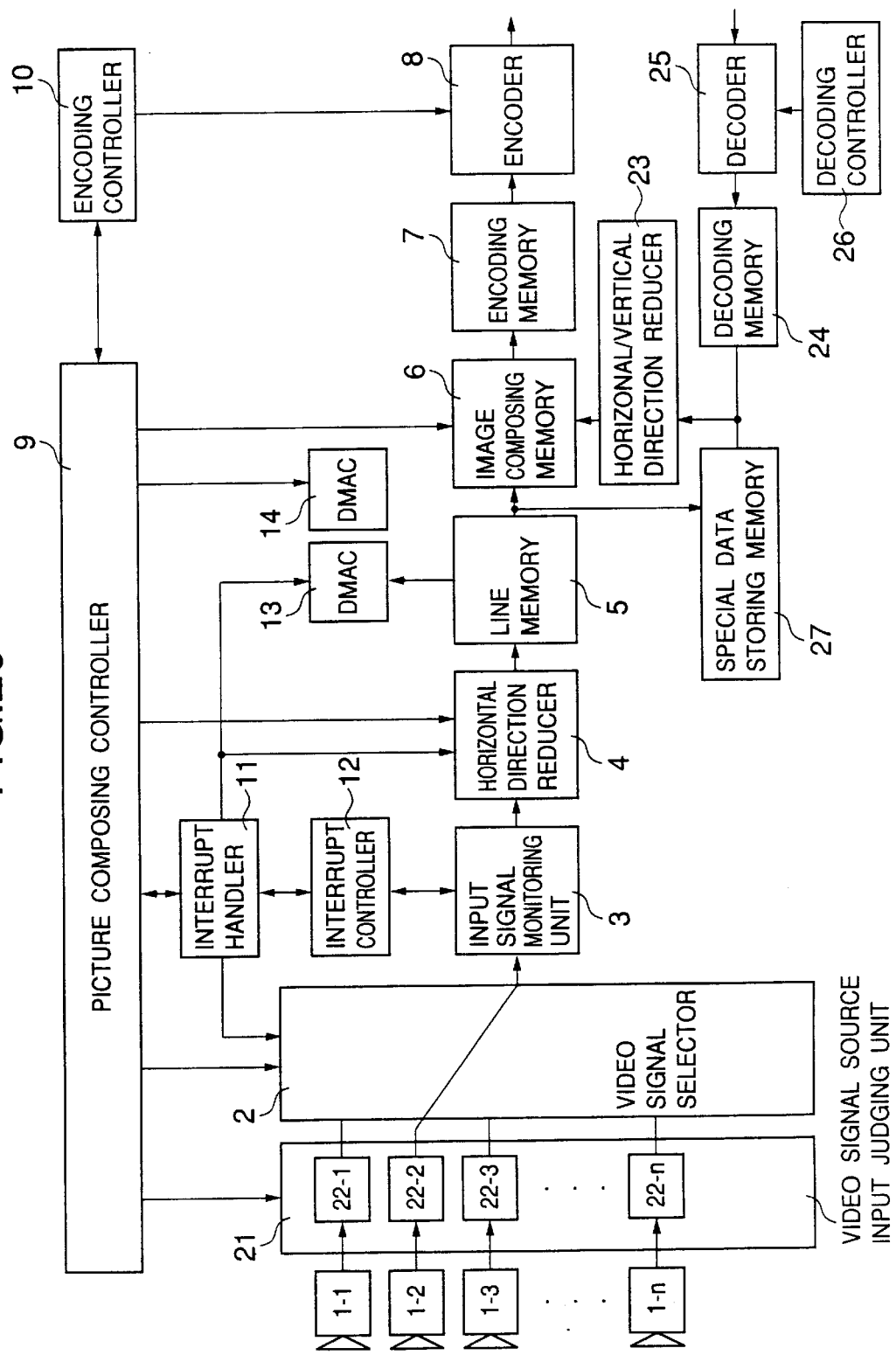
FIG. 20 is a system block diagram showing a fourth embodiment of the multiple picture composing apparatus according to the present invention.

FIG. 20 is a system block diagram showing a fourth embodiment of the multiple picture composing apparatus according to the present invention. In FIG. 20, those parts which are the same as those corresponding parts in FIG. 5 are designated by the same reference numerals, and a description thereof will be omitted.

The multiple picture composing apparatus shown in FIG. 20 includes, in addition to those parts shown in FIG. 5, a video signal source input judging unit 21 including video signal source processing parts 22-1 through 22-n, a horizontal/vertical direction reducer 23, a decoding memory 24, a decoder 25, a decoding controller 26, and a special data storing memory 27 which are coupled as shown.

In this embodiment, the video signal source input judging unit 21 judges whether or not the video signals output from the plurality of video signal sources (television cameras) 1-1 through 1-n are input thereto. If the video signal is not output from a certain video signal source due to a failure, no power, connection failure or the like of this certain video signal source, measures are taken so as not to compose the picture corresponding to this certain video signal source. As a result, it is possible to eliminate unstable conditions of the system that would otherwise occur if an unstable video signal were mixed, and the efficiency of the picture composing process is improved.

Each of the video signal source processing parts 22-1 through 22-n of the video signal source input judging unit 21 judges whether or not the video signal is output from a corresponding one of the video signal sources 1-1 through 1-n and input thereto by judging whether or not a vertical synchronizing signal and a horizontal synchronizing signal or a color burst signal and a chrominance signal are output from the corresponding video signal source during a predetermined time. Further, each of the video signal source processing parts 22-1 through 22-n can also judge whether or not the video signal is output from the corresponding video signal source and input thereto based on a level detection of the video signal.

The decoder 25 decodes the received encoded video signal under the control of the decoding controller 26, and stores a decoded video signal in the decoding memory 24. Special data from the picture composing controller 9 is written into the special data storing memory 27. The horizontal/vertical direction reducer 23 carries out a reducing process by thinning pixels or lines so as to obtain a specified picture size.

Figure 21:
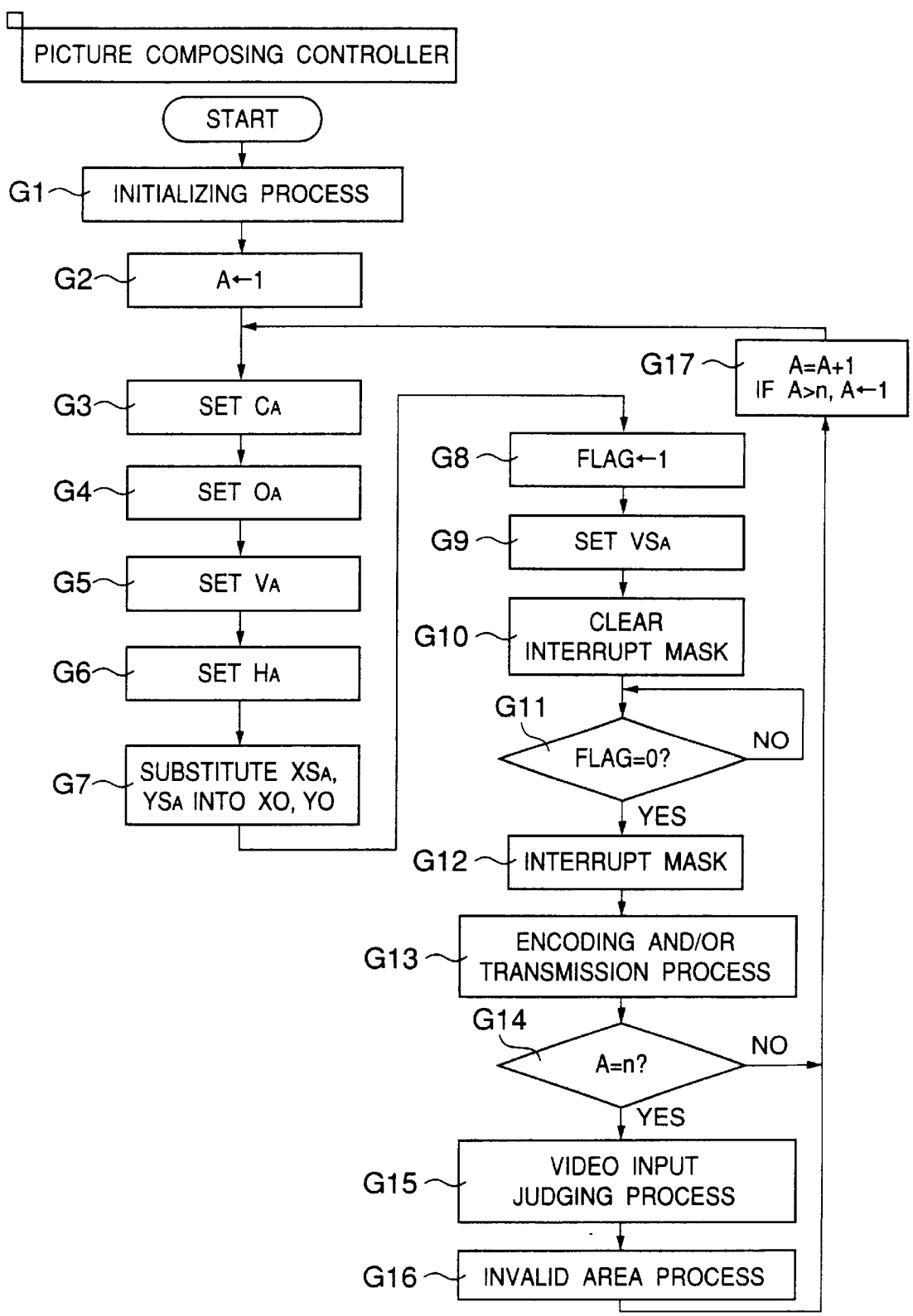
FIG. 21 is a flow chart for explaining a picture composing process of the fourth embodiment.

FIG. 21 is a flow chart for explaining a picture composing process of the fourth embodiment. This picture composing process which includes the video input judgement for judging whether or not the video signal input exists is also applicable to the picture composing process of each of the first through third embodiments described above.

In FIG. 21, a step G1 first carries out an initializing process, and a step G2 substitutes 1 into A. A step G3 sets $C_A$ in the video signal selector 2, and a step G4 sets the odd/even field read variable $O_A$. A step G5 sets the increment value $V_A$ of the picture composing memory 6, and a step G6 sets the horizontal direction reduction value $H_A$. A step G7 substitutes $XS_A$, $YS_A$ into the picture transfer destination address XO, YO, and a step G8 substitutes 1 into the video signal read complete recognition variable FLAG. A step G9 sets the interrupt generation condition $VS_A$, and a step G10 clears the interrupt mask.

A step G11 decides whether or not FLAG=0, and a step G12 masks the interrupt if the decision result in the step G11 is YES. A step G13 carries out an encoding process and/or a transmission process. A step G14 decides whether or not A=n, and the process advances to a step G17 if the decision result in the step G14 is NO. The step G17 increments A by 1, and substitutes 1 into A if A>n.

On the other hand, if the decision result in the step G14 is YES, a step G15 carries out the video input judging process to judge whether or not the video signal input exists. A step G16 carries out an invalid area process if there is no video signal input. After the step G16, the process advances to the step G17 to increment A by 1 or, to substitute 1 into A if A>n. After the step G17, the process returns to the step G3 so as to repeat the above described process.

Figure 22:
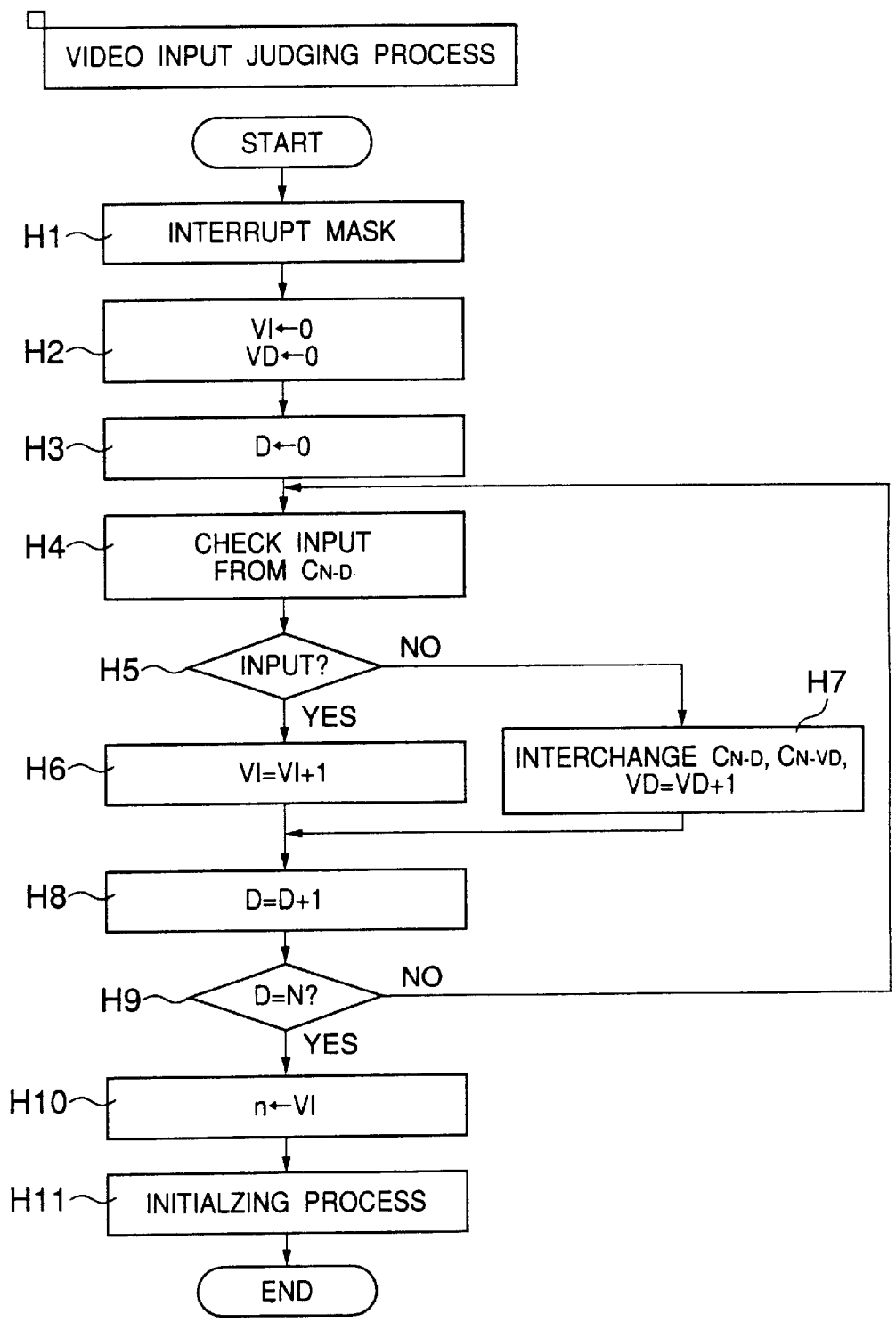
FIG. 22 is a flow chart for explaining a video input judging process of the fourth embodiment.

FIG. 22 is a flow chart for explaining the video input judging process of this embodiment. First, a step H1 masks the interrupt, and a step H2 substitutes 0 into each of a video input holding variable VI and a no-video input holding variable VD. A step H3 substitutes 0 into an input judging check variable D. A step H4 checks a video signal input from a video signal source $C_{N-D}$, and a step H5 decides whether or not the video signal input exists. If the decision result in the step H5 is YES, a step H6 increments VI by 1. On the other hand, a step H7 switches $C_{N-D}$ and $C_{N-VD}$ and increments VD by 1 if the decision result in the step H5 is NO.

After the step H6 or H7, a step H8 increments D by 1, and a step H9 decides whether or not D=N. The process returns to the step H4 if the decision result in the step H9 is NO. If the decision result in the step H9 is YES, a step H10 substitutes VI into n, and a step H11 carries out an initializing process. In other words, the picture composing process can be carried out by setting the value of the video input holding variable VI as the number n of video signal sources.

For example, if $C_1$=1-1, $C_2$=1-2, $C_3$=1-3, $C_4$=1-4, n=4, and N=4 before the video input judging process in the case where the video signal sources 1-1 through 1-4 exist, it becomes $C_1$=1-4, $C_2$=1-2, $C_3$=1-1, $C_4$=1-3, n=2, and N=4 when no video signals are input to the video signal source input judging unit 21 from the video signal sources 1-1 and 1-3. Hence, the picture composing process in this particular case composes 2 pictures using the video signals from the video signal sources 1-2 and 1-4.

Figure 23:
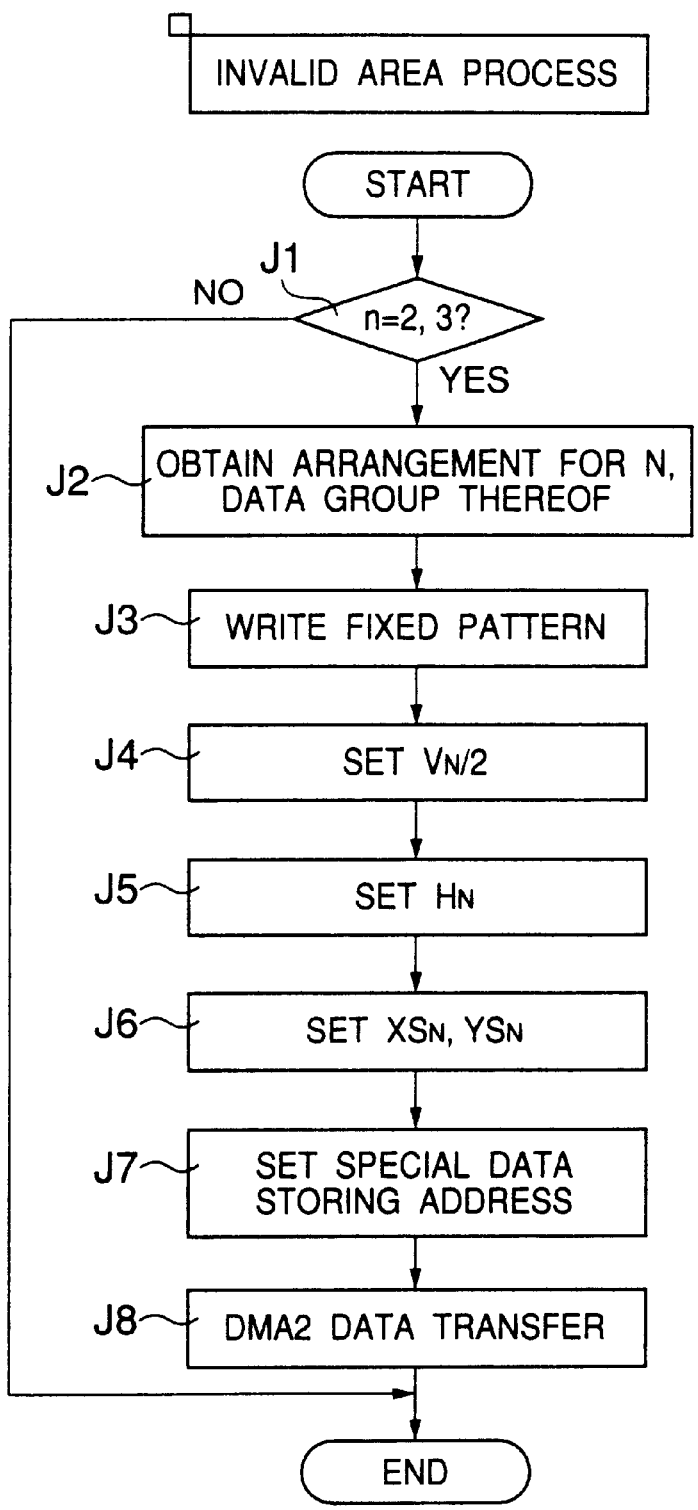
FIG. 23 is a flow chart for explaining an invalid area process of the fourth embodiment.

FIG. 23 is a flow chart for explaining the invalid area process of this embodiment. A block within the picture composing memory 6 corresponding to no video signal input as a result of the video input judging process described above becomes an invalid area of the composed picture. Accordingly, the invalid area process shown in FIG. 23 inserts special data within this invalid area.

In FIG. 23, a step J1 decides whether or not n=2 or 3 as a result of the video input judging process. The process ends if the decision result in the step J1 is NO. On the other hand, if the decision result in the step J1 is YES, a step J2 obtains an arrangement for N and data group thereof.

Next, a step J3 writes a fixed pattern in the special data storing memory 27 shown in FIG. 20. A step J4 sets a vertical direction reduction value $V_N/2$, and a step J5 sets a horizontal direction reduction value $H_N$. A step J6 sets a picture composing start address $XS_N$, $YS_N$. A step J7 sets a special data storing address, a step J8 carries out a data transfer by a DMA2 of the DMAC 14, and the process ends.

In a case where N=4 and the Nth, that is, the 4th data is obtained from the arrangement for n=4, the following substitutions are made.

$XS_N = XS+X/2$
$XE_N = XS+X$
$YS_N = YS+Y/2$
$YE_N = YS+Y$
$H_N = 1/2$
$O_N = 0$
$VS_N = V_{START}$
$VE_N = V_{END}$

A horizontal and vertical direction start address of the special data storing memory 27 is set to XD, YD, and a write process is carried out with respect to this address XD, YD to write some kind of fixed pattern. For example, fixed color data such as fixed black and fixed blue, fixed bit map data such as manufacturer's logo, message such as "composing picture" and "no input from video signal sources 1 & 4", and other user data or the like may be used as the fixed pattern.

After the special data is written into the special data storing memory 27 described above, the horizontal direction reduction value $H_N$ and the vertical direction reduction value $V_N/2$ in the horizontal/vertical direction reducer 23. In this case, $V_N$ corresponds to an increment value which becomes 2 when reading 1 frame without the thinning and becomes 1 when reading 1 field with the thinning. With respect to the DMAC 14, the start address $XS_N$, $YS_N$ of the picture composing memory 6 is specified as the transfer destination address, the start address XD, YD of the special data storing memory 27 is specified as the transfer source address, and the data transfer amounting to X×Y is carried out.

The data amounting to X×Y which is transferred under the control of the DMAC14 is thinned by ½ in both the horizontal and vertical directions by the horizontal/vertical direction reducer 23, and stored in the Nth block, that is, the 4th block of the picture composing memory 6. This invalid area process is called every time one round of the channel switching of the video signal sources is made, and for this reason, it is possible to actively modify the contents of the special data and transmit the special data to the receiving end.

Figure 24:
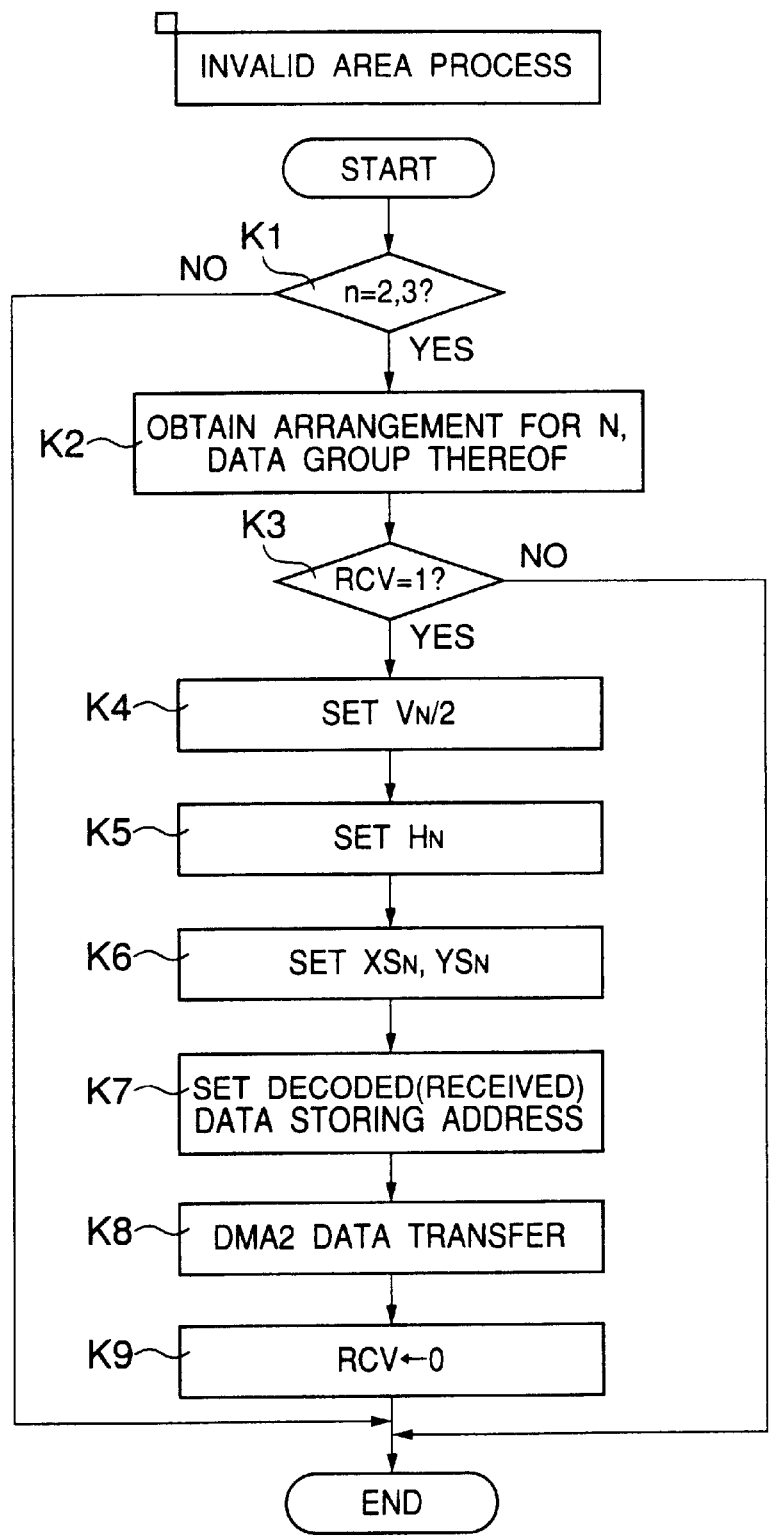
FIG. 24 is a flow chart for explaining another invalid area process.

FIG. 24 is a flow chart for explaining another invalid area process of this embodiment. The invalid area process shown in FIG. 24 is applicable to a case where the received and decoded data is inserted into the invalid area and returned. In FIG. 24, steps K1 and K2 respectively are identical to the steps J1 and J2 shown in FIG. 23. If the decision result in the step K1 is YES, the step K2 is carried out, and a step K3 checks the value of a decoding frame update management variable RCV. More particularly, the step K3 decides whether or not RCV=1. The decoding controller 26 changes the value of the decoding frame update management variable RCV to 1 every time 1 frame is decoded, and changes the value of the decoding frame update management variable RCV to 0 when a result of the decoding process is transferred to the picture composing memory 6. In other words, the decoding frame update management variable RCV manages whether or not the contents of the decoding memory 24 are changed after the invalid area process is started. Accordingly, if RCV=0 and the decision result in the step K3 is NO, the process ends because data identical to the previous data is stored in the decoding memory 24 and there is no need to overwrite the data.

If the decision result in the step K3 is YES, steps K4 through K6 similar to the steps J4 through K6 shown in FIG. 23 are carried out. Hence, the vertical direction reduction value $V_N/2$, the horizontal direction reduction value $H_N$, and the picture composing start address $XS_N$, $YS_N$ are set. A step K7 sets a decoded received data storing address in place of the special data storing address. A step K8 transfers the data under the control of the DMAC 14, and a step K9 substitutes 0 into the decoding frame update management variable RCV upon completion of this data transfer. In this case, the received and decoded data is reduced by the horizontal/vertical reducer 23, and written into the block of the picture composing memory 6 corresponding to the invalid area. In addition, this received and decoded data is composed with the video signals from the video signal sources and transmitted.

In this case, the invalid area process is called every time one round of the channel switching of the video signal sources is made, and for this reason, it is possible to constantly update and transmit the received and decoded data. Accordingly, the transmitted picture is returned to the transmitting end, thereby making it possible to confirm the transmitted picture at the transmitting end. In addition, in the case of a system which can carry out the decoding process with respect to encoded recorded data prestored in another memory, it is possible to easily compose the present or live picture and the recorded picture which is reproduced so to obtain a composed picture. In this case, it is possible to easily obtain a composed picture such as that shown in FIG. 2C described above, for example.

Figure 25:
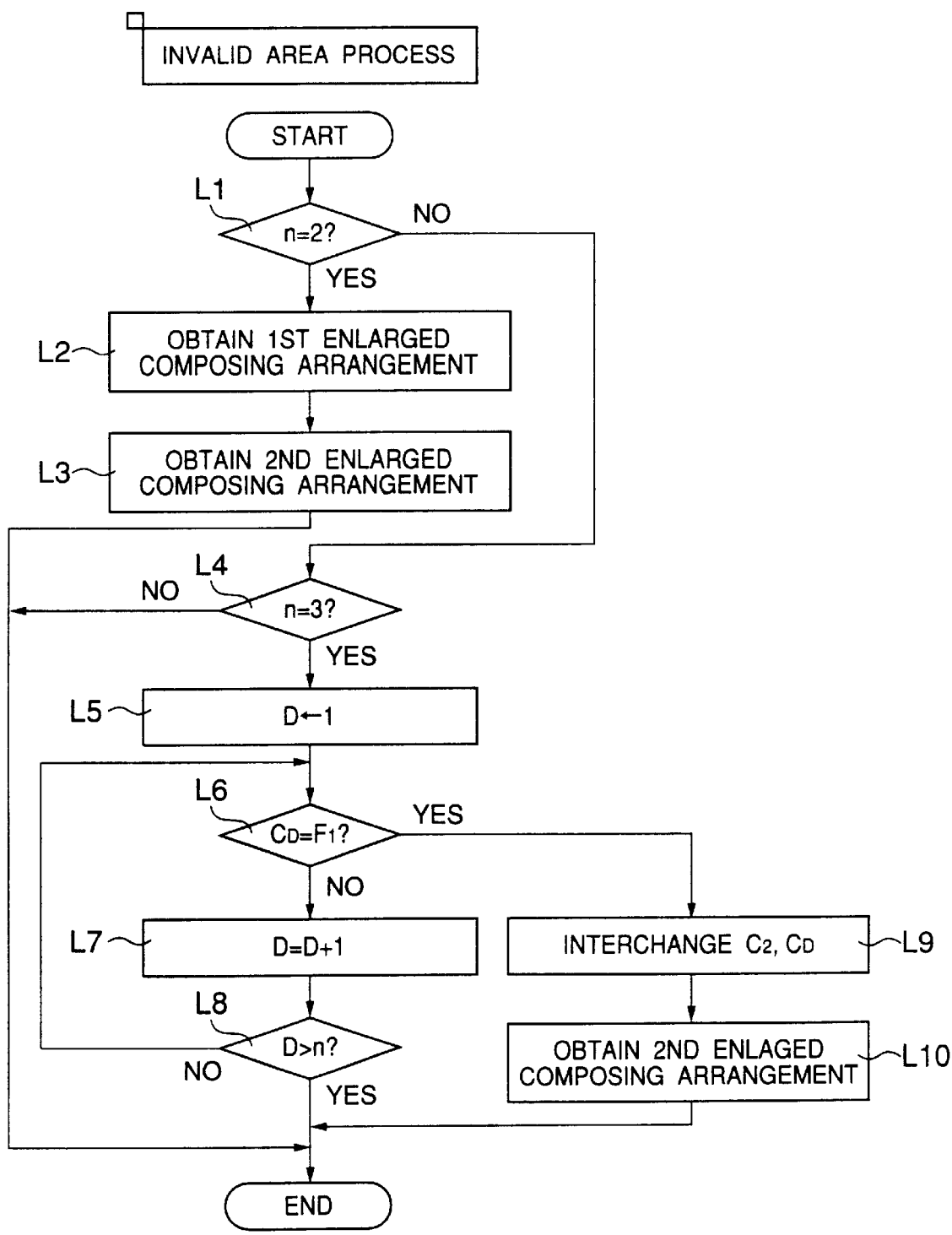
FIG. 25 is a flow chart for explaining still another invalid area process.

FIG. 25 is a flow chart for explaining still another invalid area process of this embodiment. In this still another invalid area process, the invalid area within the composed picture is utilized so as to enable the enlarged display of an important picture. In the following description, the channel number of the video signal source which picks up the important picture is weighted by $F_1$.

In FIG. 25, a step L1 first decides whether or not n=2. If the decision result in the step L1 is NO, a step L4 decides whether or not n=3. If the decision result in the step L4 is NO, n is not 2 or 3, and thus, the process ends.

Figure 26A:
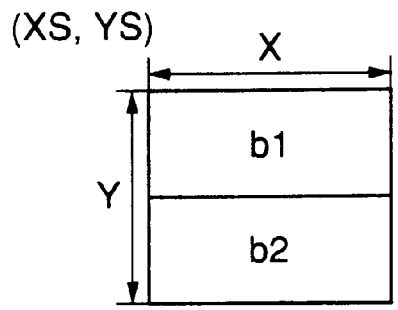
FIGS. 26A through 26D respectively are diagrams for explaining the arrangement of pictures in the composed picture.

When n=2, a picture composing process using blocks b1 and b2 of the picture composing memory 6 is carried out as shown in FIG. 26A, for example. In this case, the blocks b1 and b2 respectively have a size corresponding to a picture read region Y/2 excluding Y/4 on top and bottom in FIG. 26C. In addition, by making the size of the blocks b1 and b2 the same, it becomes unnecessary to take into consideration the weighted channel number.

Accordingly, if the decision result in the step L1 is YES, a step L2 obtains an enlarged composing arrangement from a first memory block of the picture composing memory 6, and a step L3 obtains an enlarged composing arrangement from a second memory block of the picture composing memory 6. These enlarged composing arrangements are set in advance depending on the video signal sources or the like. In this case, $XS_A$, $XE_A$, $YS_A$, $YE_A$, $H_A$, $V_A$, $O_A$, $VS_A$ and $VE_A$ are obtained from the arrangements which are obtained for A=1 and A=2, for example. More particularly, the following are obtained, for example.

$XS_1=XS_2=XS$
$XE_1=XE_2=XS+X$
$YS_1=YS$
$YS_2=YS+Y/2$
$YE_1=XS+Y/2$
$YE_2=YS+Y$
$H_1, H_2=1$
$V_1, V_2=2$
$O_1, O_2=1$
$VS_1, VS_2=V_{START}+1Y/4$
$VE_1, VE_2=V_{START}+3Y/4$

The odd field and the even field of the video signal are read and are alternately stored in the picture composing memory 6. Hence, the increment value $V_A$ of the picture composing memory 6 becomes 2, and the odd/even field read variable $O_A$ becomes 1.

Figure 26B:
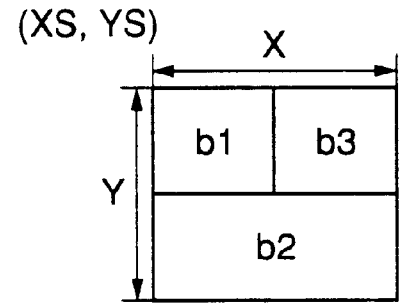
Figure 26C:
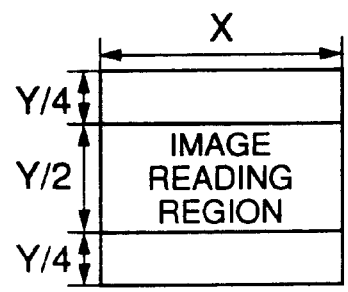

When n=3, the picture composing process is carried out as shown in FIG. 26B, for example. In this case, the channel of the video signal stored in the block b2 is weighted by $F_1$. In other words, a step L5 substitutes 1 into D, and a step L6 decides whether or not $C_D=F_1$. If the decision result in the step L6 is NO, a step L7 increments D by 1, and a step L8 decides whether or not D>n. The process returns to the step L6 if the decision result in the step L8 is NO. On the other hand, if the decision result in the step L8 is YES, no weighted video signal channel exists for D=1 to D=n, and thus, the process ends. Further, if the decision result in the step L6 is YES, a step L9 switches the video signal sources $C_2$ and $C_0$, and a step L10 obtains the enlarged composing arrangement from the second memory block of the picture composing memory 6.

In other words, $C_D$ and $F_1$ are compared for D=1 to D=n, and the video signal source $C_D$ and the video signal source $C_2$ corresponding to the block b2 are switched when $C_D=F_1$. Hence, the video signal is stored by allocating the channel $F_1$ to the block b2 shown in FIG. 26B. Similarly to the case where n=2, a step L10 obtains the enlarged composing arrangement from the second memory block of the picture composing memory 6. As a result, $XS_A$, $XE_A$, $YS_A$, $YE_A$, $H_A$, $V_A$, $O_A$, $VS_A$ and $VE_A$ are obtained from the arrangement obtained for A=2. The particular setting in this case may be similar to that for the case where n=2.

The reading of the video signal from the block b2 is made for both the odd and even fields, and the odd and even fields are alternately stored in the picture composing memory 6. Accordingly, the increment value $V_A$ of the picture composing memory 6 becomes 2, and the odd/even field read variable $O_A$ becomes 1. In addition, an interrupt signal is generated at lines (YS+Y/4) and (YS+3Y/4) of the video signal, and DMA transfer start and end processes are carried out. With respect to the blocks b1 and b2 shown in FIG. 26B, only the odd fields are read, for example, and the read odd fields are consecutively stored in the picture composing memory 6, similarly as in each of the embodiments described above wherein 4 pictures are composed to obtain the composed picture.

Figure 27:
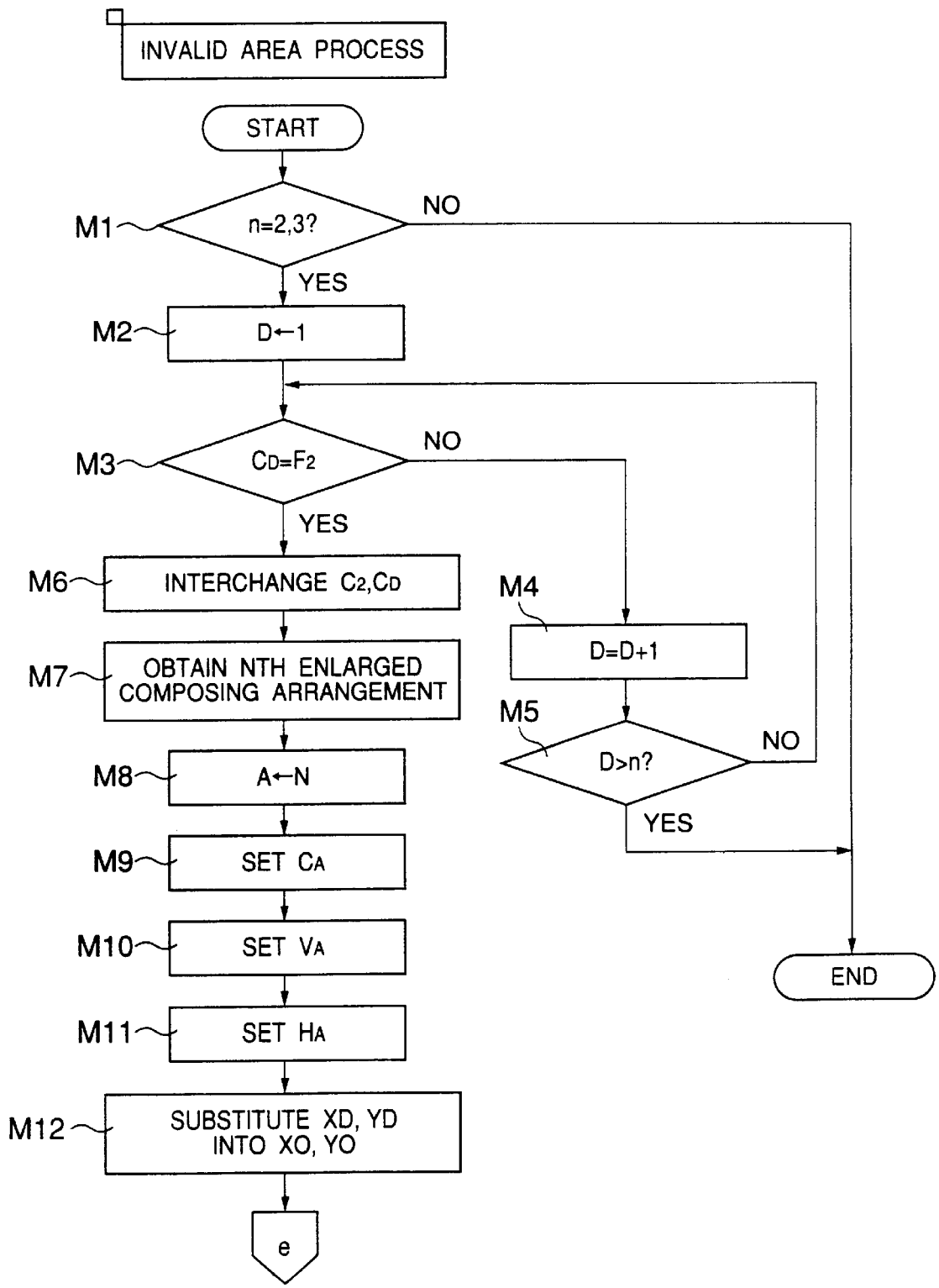
FIG. 27 is a flow chart for explaining an invalid area process including a zoom-up process.
Figure 28:
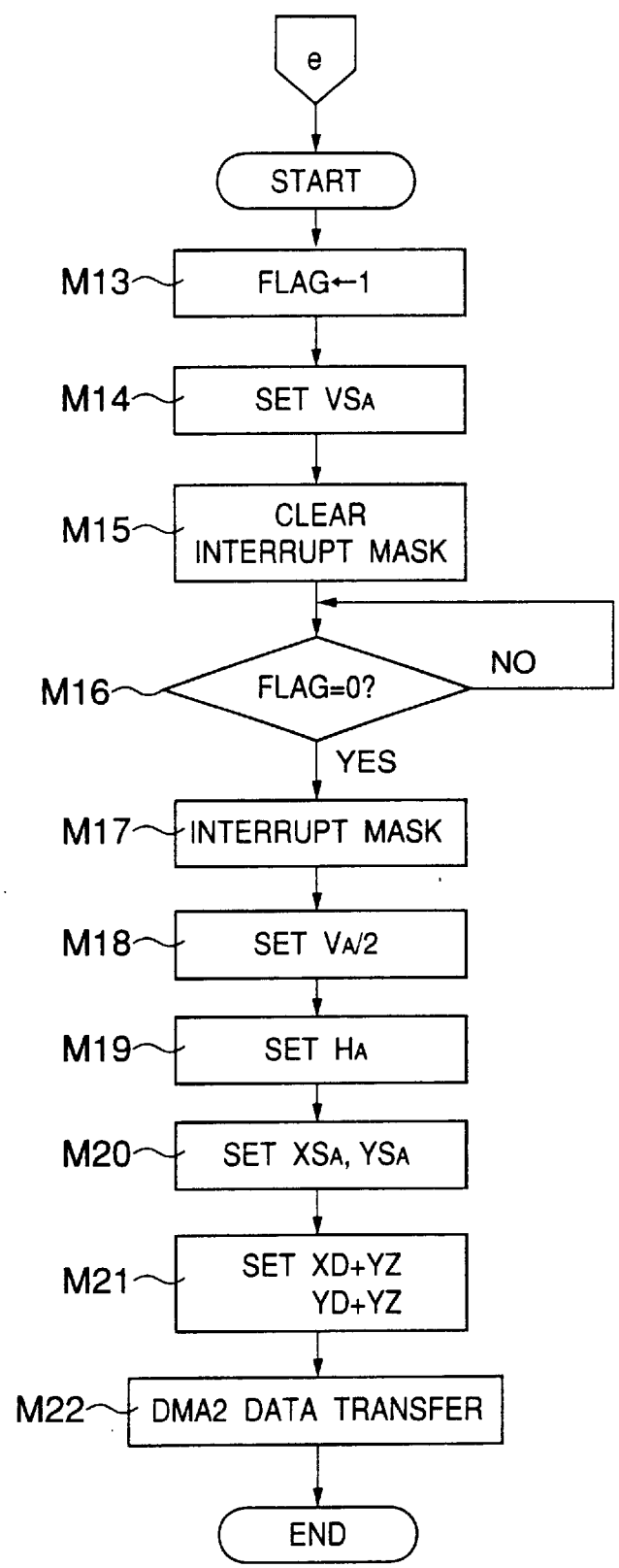
FIG. 28 is a flow chart for explaining the invalid area process including the zoom-up process.

FIGS. 27 and 28 are flow charts for explaining an invalid area process including a zoom-up process in this embodiment. A channel number which is weighted in order to make a zoom-up display in the invalid area within the composed picture is denoted by $F_2$. A step M1 shown in FIG. 27 decides whether or not n=2 or 3, similarly to the step J1 shown in FIG. 23 and the step K1 shown in FIG. 24. The process ends if the decision result in the step M1 is NO.

If the decision result in the step M1 is YES, a step M2 substitutes 1 into D, and a step M3 decides whether or not $C_D=F_2$. If the decision result in the step M3 is NO, a step M4 increments D by 1, and a step M5 decides whether or not D>n. The process returns to the step M3 if the decision result in the step M5 is NO. On the other hand, the process ends if the decision result in the step M5 is YES.

If the decision result in the step M3 is YES, a step M6 switches the video signal sources $C_2$ and $C_D$. A step M7 obtains an enlarged composing arrangement from a Nth memory block of the picture composing memory 6, and a step M8 substitutes N into A. A step M9 sets $C_A$ in the video signal selector 2 shown in FIG. 20, and a step M10 sets the increment value $V_A$ of the picture composing memory 6. A step M11 sets the horizontal direction reduction value $H_A$, and a step M12 substitutes XD, YD into the picture transfer destination address XO, YO. A step M13 shown in FIG. 28 substitutes 1 into the video signal read complete recognition variable FLAG, and a step M14 sets the interrupt generation condition $VS_A$. A step M15 clears the interrupt mask.

A step M16 decides whether or not FLAG=0. If the decision result in the step M16 is YES, a step M17 masks the interrupt, and a step M18 sets the vertical direction reduction value $V_A/2$, and a step M19 sets the horizontal direction reduction value $H_A$. A step M20 sets a picture composing start address $XS_A$, $YS_A$, and a step M21 sets a data transfer destination address XD+XZ, YD+YZ. A step M22 carries out a data transfer by a DMA2 of the DMAC 14.

Figure 26D:
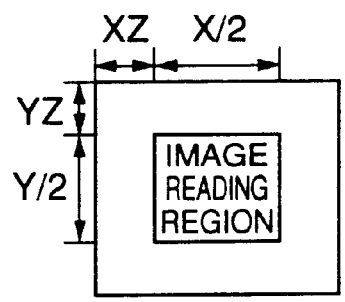

The weighted channel $F_2$ which indicates the zoom-up display regards a region from an address (XZ, YZ) to an address (XZ+X/2, YZ+Y/2) as the picture reading region as shown in FIG. 26D, for example, and carries out the DMA transfer so as to read the data into the picture composing memory 6 at a magnification 1. In other words, since the thinned video signals are composed for the other blocks, the video signal which is composed in the invalid area appears enlarged.

The switching of the video signal sources $C_D$ and $C_n$ is carried out in the step M6 for the following 2 reasons. First, when the invalid area process is called, the video signal channel of the video signal source is read into the block n within the picture composing memory 6, and the above described switching is made so as to reduce the time loss caused by the switching of the channels. Second, it is more convenient for the user from the point of view of observation if the zoom-up picture and the picture which is not zoomed up are displayed adjacent to each other.

The zoom-up reading arrangement and set value group may be set in advance depending on the system. In this case, $XS_A$, $XE_A$, $YS_A$, $YE_A$, $H_A$, $V_A$, $O_A$, $VS_A$ and $VE_A$ are obtained from the arrangement which is obtained for A=N. More particularly, the following are obtained, for example.

$XS_N=XS+X/2$
$XE_N=XS+X$
$YS_N=YS+Y/2$
$YE_N=YS+Y$
$H_N=1$
$V_N=2$
$O_N=1$
$VS_N=V_{START}$
$VE_N=V_{END}$

As described above, both the odd and even fields are read, and the odd and even fields are alternately stored in the picture composing memory 6. Accordingly, the increment value $V_N$ becomes 2, and the odd/even field read variable $O_N$ becomes 1.

After the above described process is completed, a video signal read process for reading the video signals from the video signal sources is started. First, A is set to A=N, and the special data storing memory 27 shown in FIG. 20 is sued. In addition, $C_A$ is set in the video signal selector 2. If the value of $C_A$ is $F_2$, the video signal selector 2 selects the video signal from the video signal source $F_2$. In addition, the picture composing increment value $V_N$ is set in the DMAC 13, and the horizontal direction reduction value $H_N$ is set in the horizontal direction reducer 4. At the same time, the read position XD, YD within the special data storing memory 27 is substituted into the picture transfer destination address XO, YO. That is, the video signal from the video signal source is temporarily stored in the special data storing memory 27, not the picture composing memory 6.

When the above described process is completed, 1 is substituted into the video signal read complete recognition variable FLAG, $VS_N$ is set as the interrupt generation condition, and the interrupt mask is cleared. As a result, by a process carried out within the interrupt handler 11, the data amounting to 1 frame not subjected to the thinning process is read into the special data storing memory 27 by a video signal read means similar to that for the case where n=1, and the video signal read complete recognition variable FLAG consequently becomes 0.

While the interrupt handler 11 is carrying out the process, the picture composing controller 9 monitors the value of the video signal read complete recognition variable FLAG, and waits until the value becomes 0. When the value of the video signal read complete recognition variable FLAG becomes 0, the reading of the video signal from the video signal source amounting to 1 frame is completed. Hence, the interrupt is masked, and with respect to the DMAC 14, the start address $XS_A$, $YS_A$ of the picture composing memory 6 is specified as the transfer destination address, and the start address XD+XZ, YD+YZ of the special data storing memory 27 is specified as the transfer source address, so as to carry out the data transfer amounting to X×Y. The data amounting to X×Y transferred by the DMAC 14 is stored in the Nth block within the picture composing memory 6, without being thinned in the horizontal and vertical directions, that is, with a magnification 1. By the above described process, the received and displayed picture becomes an enlarged picture as shown on the top right of FIG. 2D, for example.

Figure 29:
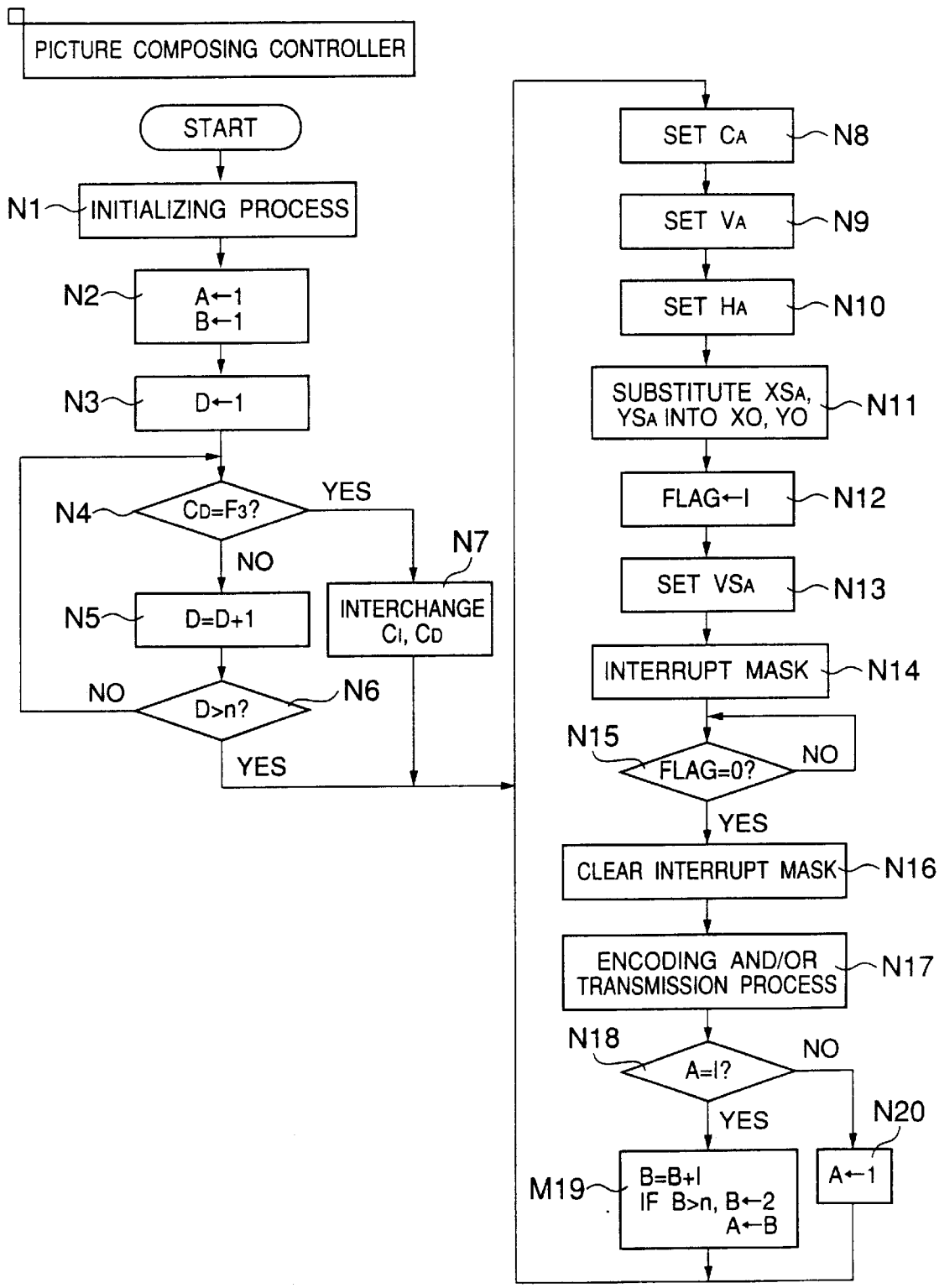
FIG. 29 is a flow chart for explaining a picture composing process of a fifth embodiment of the multiple picture composing apparatus according to the present invention.

FIG. 29 is a flow char for explaining a picture composing process of a fifth embodiment of the multiple picture composing apparatus according to the present invention. In this embodiment, a video signal of a weighted channel is read and process with priority over video signals of other channels. The picture composing process can be summarized by the following processes which include: (a) carrying out an encoding process and/or a transmission process after a read process is completed with respect to all video signals, (b) carrying out a read process to read a video signal that can be read during the encoding process, and (c) carrying out an encoding process and/or a transmission process every time the reading of the video signal from 1 video signal source is completed. Accordingly, the picture which is received and displayed becomes a composed picture which is updated in units of blocks.

For example, in a system which encodes and transmits 30 frames per second, the frame rate per block becomes approximately 3 to 7.5 when 4 pictures are composed. In such a system, it may be desirable to make the movements in a picture from a certain video signal source more clearly and easily visible to the user. Hence, this embodiment carries out a weighting with respect to such certain video signal source, and the video signal from this certain video signal source is read with priority over others, so that the frame rate is increased and the movements in the received and displayed picture of the video signal from this certain video signal source are more clearly and easily visible.

A description will be given of a case where the weighting described above is carried out with respect to a channel number $F_3$. In FIG. 29, a step N1 carries out an initializing process, and a step N2 substitutes 1 into variables A and B. A step N3 substitutes 1 into D, and a step N4 decides whether or not $C_D=F_3$. If the decision result in the step N4 is NO, a step N5 increments D by 1, and a step N6 decides whether or not D>n. The process returns to the step N4 if the decision result in the step N6 is NO. On the other hand, the process advances to a step N8 if the decision result in the step N6 is YES.

If the decision result in the step N4 is YES, a step N7 switches the video signal sources $C_1$ and $C_D$. In other words, $C_D$ and $F_3$ are compared for D=1 to D=n, and $C_D$ and $C_1$ are switched if $C_D$ and $F_3$ are the same. By this switching of $C_D$ and $C_1$, a video signal of the same channel as $F_3$ is stored in a block 1 of the composed picture corresponding to a channel number 1, and a video signal of the channel number 1 is stored in a block of the composed picture corresponding to the channel number $F_3$.

Next, similarly as in the case of a set process in each of the embodiments described above, a step N8 sets $C_A$, a step N9 sets $V_A$, and a step N10 sets $H_A$. A step N11 substitutes $XS_A$, $YS_A$ into the picture transfer destination address XO, YO, and a step N12 substitutes 1 into the video signal read complete recognition variable FLAG. A step N13 sets $VS_A$, and a step N14 clears the interrupt mask. A step N15 decides whether or not FLAG=0. If the decision result in the step N15 is YES, a step N16 masks the interrupt, and a step N17 carries out an encoding process and/or a transmission process.

A step N18 decides whether or not A=1. If the decision result in the step N18 is NO, a step N19 substitutes 1 into A, and the process returns to the step N8. On the other hand, if the decision result in the step N18 is YES, a step N19 increments B by 1, substitutes 2 into B if B>n, and substitutes the value of B into A. For example, in a case where the video signal of the channel $C_1$ (=$F_3$) is read and the step N18 decides whether or not A=1, the process advances to the step N19 because A and B are initially A=1 and B=1. In this case, B is incremented by 1 and this B is substituted into A in the step N19 so that A and B become A=B=2. Then, the variables are set again, the video signal of the channel $C_2$ is read, and the step N18 again decides whether or not A=1. This time, the decision result in the step N18 becomes NO, and the step N20 substitutes 1 into A. Further, after setting the variables corresponding to A=1 the video signal of the channel $C_1$ (=$F_3$) is read.

Accordingly, in the case where 4 pictures are composed, the video signal of the channel $C_1$ (=$F_3$) which is weighted is read once every two times, that is, read in a manner $C_1 \to C_2 \to C_1 \to C_3 \to C_1 \to C_4 \to C_1$ . . . and composed. Hence, it is possible to increase the frame rate of this channel $C_1$. For example, the frame rate can be set to 7 to 15 frames per second in a case corresponding to the particular case described above.

As described above, the picture composing process and the encoding process are directly related. For example, it is possible to set quantization steps for every block of the composed picture, and improve the resolution of an important block. In addition, it is possible to set a search range for searching a motion vector for every block, and improve the picture quality of the displayed picture.

Figure 30:
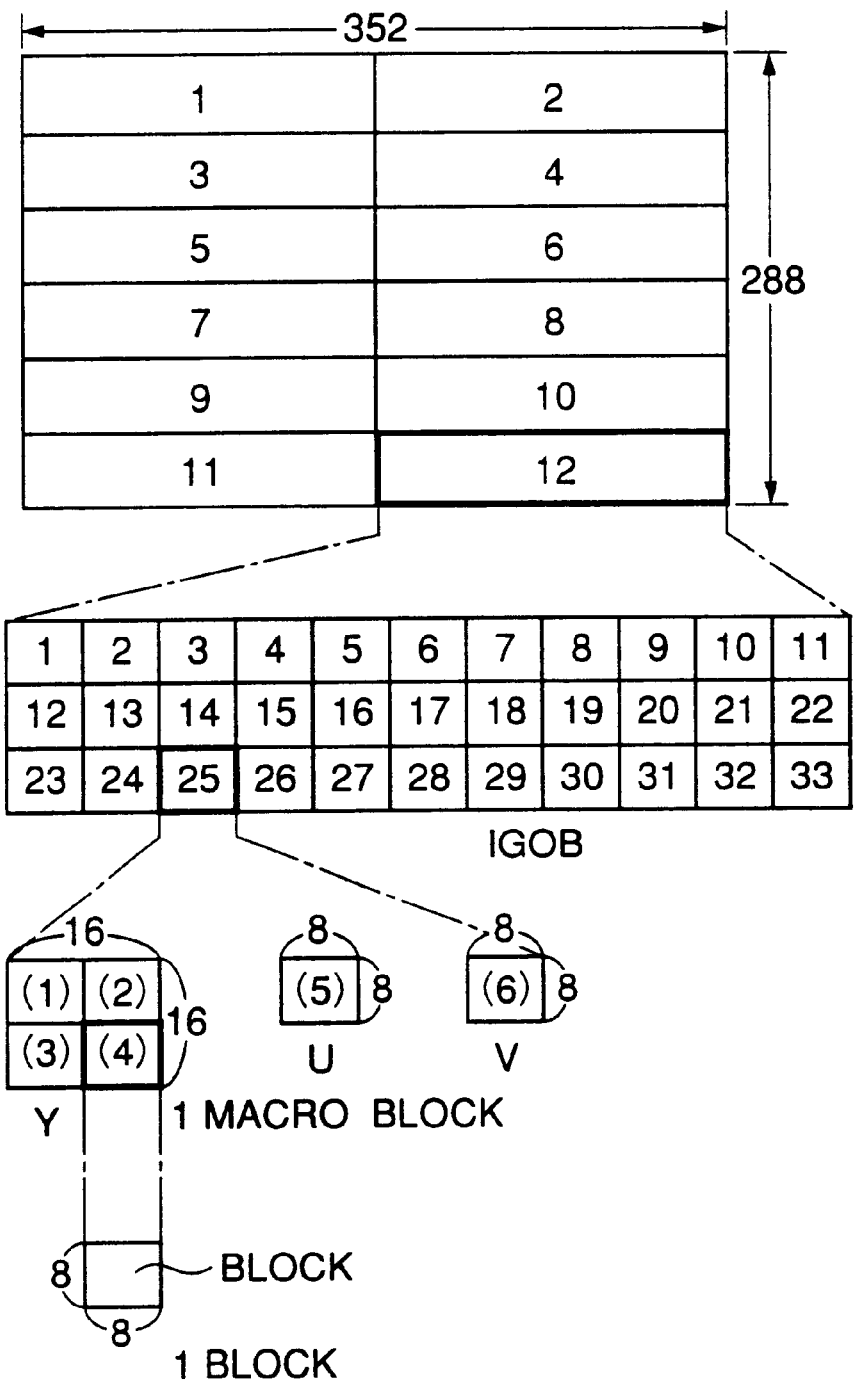
FIG. 30 is a diagram for explaining CIF.

FIG. 30 is a diagram for explaining CIF (Common Intermediate Format). In a H.261 encoding process, the picture data is treated as having a size according to the CIF or the QCIF (Quarter Common Intermediate Format). In the case of the CIF, 1 frame includes 352×288 pixels as shown in FIG. 30. This CIF frame is made up of 12 blocks GOB, and each block GOB is made up of 33 macro blocks as shown on an enlarged scale in the lower portion of FIG. 30. In addition, each macro block is made up of 4 luminance blocks Y, and 2 color difference blocks U and V. The luminance block Y is made up of 4 blocks. The encoding of the CIF frame is basically made in units of macro blocks.

Figure 31:
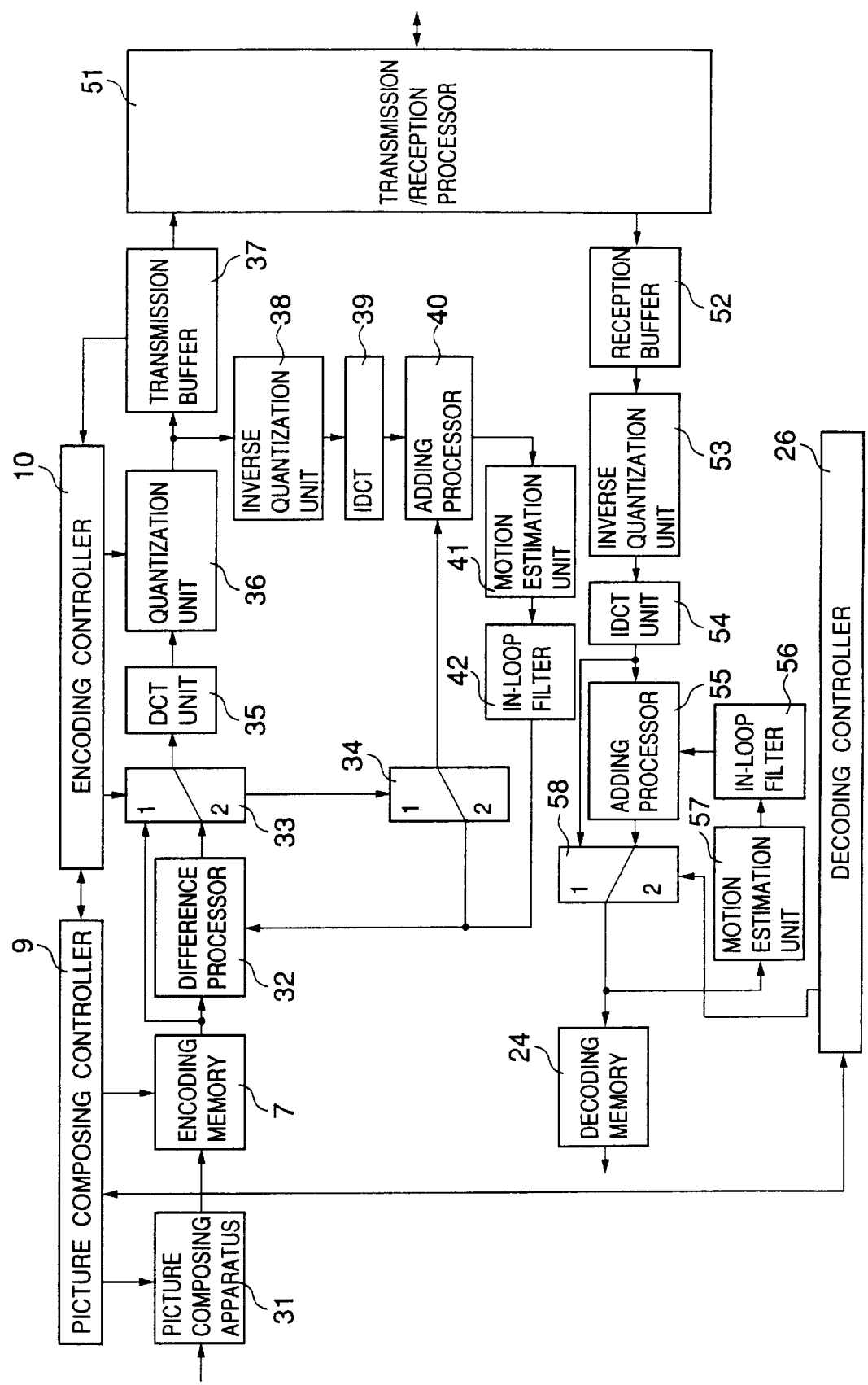
FIG. 31 is a system block diagram for explaining an encoder part of the fifth embodiment.

FIG. 31 is a system block diagram for explaining an encoder part of the fifth embodiment. FIG. 31 shoes a case where the encoder 8 shown in FIGS. 5 and 20 has a hybrid encoding structure. In FIG. 31, those parts which are the same as those corresponding parts in FIGS. 5 and 20 are designated by the same reference numerals, and a description thereof will be omitted.

In addition to the elements described above in conjunction with FIGS. 5 and 20, the encoder 8 includes a picture composing apparatus 31, a difference processor 32, selectors 33 and 34, a discrete cosine transform (DCT) unit 35, a quantization unit 36, a transmission buffer 37, an inverse quantization unit 38, an inverse DCT (IDCT) unit 39, an adding processor 40, a motion estimation unit 41, an in-loop filter 42, a transmission/reception processor 51, a reception buffer 52, an inverse quantization unit 53, an IDCT unit 54, an adding processor 55, an in-loop filter 56, a motion estimation unit 57, and a selector 58 which are coupled as shown in FIG. 31.

The picture composing apparatus 31 includes the picture composing memory 6 shown in FIG. 5 or 20, and has a function of composing the video signals from the plurality of video signal sources 1-1 through 1-n.

The picture composing apparatus 31 transfers the video signal related to the composed picture to the encoding memory 7, and carries out an encoding process in units of blocks made up of 8×8 pixels, for example, with respect to the video signal amounting to 1 composed picture and stored in the encoding memory 7.

When carrying out this encoding process, an inter-frame prediction coding is made by controlling the selectors 33 and 34 to the connection states shown in FIG. 31, and a block in this case is referred to as an inter-block. In addition, when the selectors 33 and 34 are switched from the connection states shown in FIG. 31, an intra-frame encoding is made, and a block in this case is referred to as an intra-block.

The 8×8 pixel block input to the DCT unit via the selector 33 is subjected to a DCT process, and DCT coefficients are input to the quantization unit 36. In this case, due to the characteristic of the video signal, a low-frequency component including a D.C. component forms a large part of the DCT coefficients, and it is thus possible to eliminate a high-frequency component from the DCT coefficients. Hence, the amount of information can be compressed also by this DCT process. Furthermore, the DCT coefficients are quantized in the quantization unit 36 and transferred to the transfer buffer 37. In this case, when a quantization value, that is, a quantization step, of the quantization unit 36 is set small, the amount of information generated becomes large but the picture quality of the received and displayed picture becomes satisfactory. On the other hand, when the quantization value is set large, the amount of information generated becomes small, but the picture quality of the received and displayed picture deteriorates.

The transmission/reception processor 51 carries out a transmission process to transmit the data stored in the transmission buffer 37 at a constant rate according to a transmission band of a network 214 or the like. The encoding controller 10 monitors the amount of data stored in the transmission buffer 37, and controls the quantization value, that is, the quantization step, of the quantization unit 36 so that no overflow or underflow occurs.

Using the structure including the inverse quantization unit 38, the IDCT unit 39, the adding processor 40, the motion estimation unit 41, the in-loop filter 42 and the like, the encoded frame is reproduced and an inter-frame difference between the frames is obtained in the difference processor 32. The motion estimation unit 41 obtains a position where a difference between a previous frame and a present frame becomes a minimum with respect to a block having a certain size, describes a moving destination by a motion vector, and carries out a process so that the inter-frame difference becomes small. The in-loop filter 42 reduces the deterioration of the inter-frame prediction efficiency caused by the accumulation of the distortions generated by the quantization. In other words, the in-loop filter 42 is a spatial lowpass filter which carries out a filtering process in units of blocks.

The data received via the transmission/reception processor 51 is input to the IDCT unit 53 via the reception buffer 52. The IDCT unit 53 subjects the received data to an IDCT process. Using the structure including the adding processor 55, the in-loop filter 56, the motion estimation unit 57 and the selector 58, an intra-frame decoding or an inter-frame decoding is carried out, and a resulting decoded data is stored in the decoding memory 24.

In the quantization unit 36 described above, 1 quantization value can be allocated per 1 macro block in the case of the H.261 encoding. This quantization value can take a value from 1 to 31. As described above, the amount of information generated becomes large when this quantization value is small, and the amount of information generated becomes small when this quantization value is large. In other words, if the quantization value is generally small, it is possible to transmit a picture having a satisfactory picture quality and in which movements are smooth. On the other hand, if the quantization value is large, the picture quality is poor and the movements are not smooth and appear intermittent.

The data subjected to the series of encoding processes is stored in the transmission buffer 37 at a rate depending on the amount of information generated by the encoding process. The data stored in the transmission buffer 37 are transmitted by the transmission/reception processor 51 at a constant rate corresponding to the transmission band of the network 214. In order to prevent the overflow of the transmission buffer 37, the quantization value is increased when the stored amount of data in the transmission buffer 37 increases and exceeds a predetermined value. On the other hand, in order to prevent the underflow of the transmission buffer 37, the quantization value is decreased when the stored amount of data in the transmission buffer 37 decreases and becomes the predetermined value or less. The quantization value is controlled in this manner by controlling the quantization unit 36 by the encoding controller 10.

It is assumed for the sake of convenience that among the usable quantization values, the smallest quantization value is denoted by Qmin, the largest quantization value is denoted by Qmax, and the quantization value which is actually selected is denoted by Q. For example, Qmin and Qmax are set to Qmin=3 and Qmax=12, and if the memory capacity of the transmission buffer 27 is 1 kbytes, the relationship of the occupied amount of the transmission buffer 27 and the quantization value can be controlled as follows.

Q=12 if (occupying amount)≧900bytes.
Q=11 if 800 bytes≦(occupying amount)<900 bytes.
Q=10 if 700 bytes≦(occupying amount)<800 bytes.
Q=9 if 600 bytes≦(occupying amount)<700 bytes.
Q=8 if 500 bytes≦(occupying amount)<600 bytes.
Q=7 if 400 bytes≦(occupying amount)<500 bytes.
Q=6 if 300 bytes≦(occupying amount)<400 bytes.
Q=5 if 200 bytes≦(occupying amount)<300 bytes.
Q=4 if 100 bytes≦(occupying amount)<200 bytes.
Q=3 if (occupying amount)<100 bytes.

The quantization value in the quantization unit 36 is controlled with respect to the weighted channel differently from other channels, so that the picture quality of the received and displayed picture is satisfactory for the weighted channel.

Figure 32:
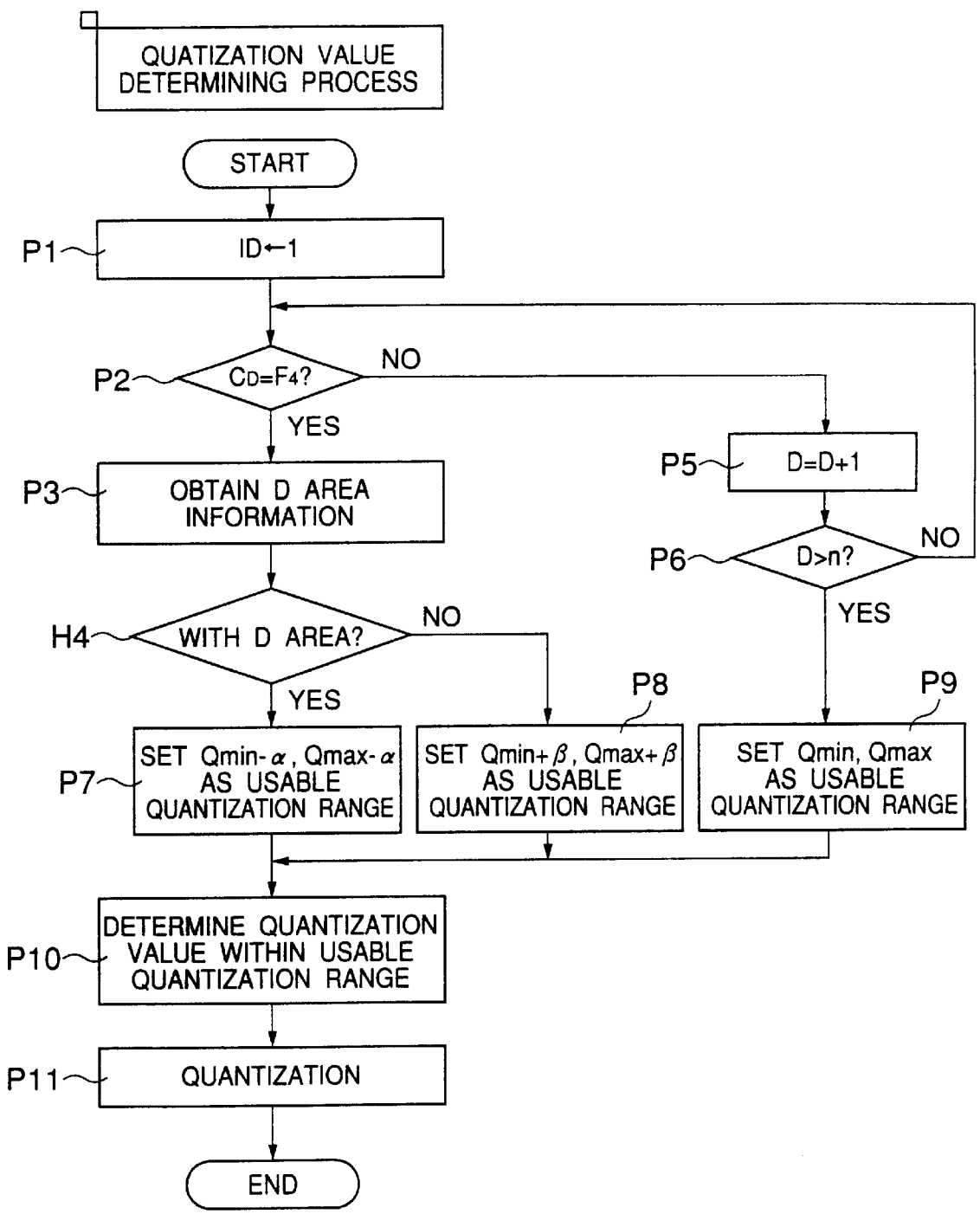
FIG. 32 is a flow chart for explaining a quantization value determining process of the fifth embodiment.

FIG. 32 is a flow chart for explaining a quantization value determining process of the fifth embodiment. In this case, a weighted channel is denoted by $F_4$. First, a step P1 shown in FIG. 32 substitutes 1 into D, and a step P2 decides whether or not $C_D=F_4$. If the decision result in the step P2 is NO, a step P5 increments D by 1, and a step P6 decides whether or not D>n. The process returns to the step P2 if the decision result in the step P6 is NO. On the other hand, if the decision result in the step P6 is YES, a step P9 sets the minimum quantization value Qmin and the maximum quantization value Qmax as the usable quantization range.

If the decision result in the step P2 is YES, a step P3 obtains D area information within the picture composing memory 5, and a step P4 decides whether or not an encoding processing is being made with respect to the inside of the D area. If the decision result in the step P4 is YES, a step P7 sets a minimum quantization value Qmin−α and a maximum quantization value Qmax−α as the usable quantization range. On the other hand, if the decision result in the step P4 is NO, a step P8 sets a minimum quantization value Qmin+β and a maximum quantization value Qmax+β as the usable quantization range. Both α and β take values of approximately 1 to 5. After the step P7, P8 or P9, a step P10 determines the quantization value within the usable quantization range depending on the occupied amount of the transmission buffer 37. In addition, a step p11 carries out the quantization, and the process ends.

For example, if the minimum quantization value Qmin is 3, the maximum quantization value Qmax is 12, and both $\alpha$ and $\beta$ are 2, the minimum quantization value Qmin and the maximum quantization value Qmax with respect to the video signal of the weighted channel respectively become 1 and 10, while the minimum quantization value Qmin and the maximum quantization value Qmax with respect to the video signals of the other channels respectively become 5 and 15, and the amount of information generated for the composed picture as a whole becomes approximately the same as the amount of information generated when no quantization value control with priority is carried out.

When composing 4 pictures, if the CIF blocks 1 to 12 shown in FIG. 30 are respectively denoted by GOB1 to GOB12, GOB1, GOB3 and GOB5 are set as the areas in which the quantization value is decreased in the usable quantization range in the step P7 when D=1. Similarly, when D=2, GOB7, GOB9 and GOB11 are set as the areas in which the quantization value is decreased in the usable quantization range in the step P7. In addition, GOB2, GOB4 and GOB6 are set as the areas in which the quantization value is decreased in the usable quantization range in the step P7 when D=3, and GOB8, GOB10 and GOB12 are set as the areas in which the quantization value is decreased in the usable quantization range in the step P7 when D=4. Accordingly, by setting the amount of information generated as a whole to a constant value and decreasing the quantization value of only the video signal of the weighted channel, it is possible to transmit a picture having a satisfactory picture quality.

In the embodiment described above, the quantization value control with priority is carried out with respect to the weighted channel. However, it is possible to similarly control whether or not to carry out an inter-frame prediction coding. In other words, the distortion caused by the encoding is small in the case of the intra-frame encoding, but the amount of information generated is large. On the other hand, in the case of the inter-frame prediction coding, the distortion caused by the encoding is large and the amount of information generated is small because the encoding is made using the difference between the areas within the previous and present frames.

Accordingly, the encoding process may be switched so that the intra-frame encoding process is carried out with respect to the video signal of the channel which is weighted similarly as in the case of the weighted channel number $F_4$ for the quantization value control with priority described above, and the inter-frame prediction coding process is carried out with respect to the video signal of the other channels. In other words, similarly to the case of the quantization value control with priority described above, the D area information within the picture composing memory 6 is obtained, and the encoding process is switched so that the intra-frame encoding process is carried out with respect to the D area, that is, the block corresponding to the weighted channel, and the inter-frame prediction coding process is carried out with respect to the other blocks. By carry out such a process, it is possible to carry out the prevision coding control with priority to maintain the satisfactory resolution of the important picture.

On the other hand, when carrying out the motion estimation process in a search range, it is possible to control the search range to become larger with respect to the video signal of the weighted channel. For example, the H.261 motion estimation process is carried out with respect to only the luminance signal in units of macro blocks, and in a case where the search range is large, the distortion caused by the encoding process is small but the search time is long because the possibility of finding a block with a value close to the present block is high, and the time required for the encoding process as a whole is long. On the other hand, in a case where the search range is small, the distortion caused by the encoding process is large but the search time is short because the possibility of finding a block with a value close to the present block is low, and the time required for the encoding process as a whole does not become long.

Hence, if the D area information within the picture composing memory 6 is obtained and the encoding process is made with respect to the inside of the D area, that is, the block corresponding to the weighted channel, the motion estimation search range control with priority is carried out by setting the search range is set to $\pm\alpha$ with respect to this block corresponding to the weighted channel, and the search range is set to $\pm\beta$ with respect to the other blocks. For example, $\alpha$ is 15, and $\beta$ is 7 or 0 to indicate that no search is made. As a result, the picture can be transmitted so that the distortion caused by the encoding process is small with respect to the video signal of the weighted channel.

The in-loop filter 42 shown in FIG. 31 is a lowpass filter which eliminates the distortion generated by the quantization, that is, reduces the quantization error accumulated in a motion estimating memory within the motion estimation unit 41. Accordingly, a sharp picture becomes softened or blurred by the in-loop filter 42. Hence, it is possible to carry out an in-loop filter control with priority and control the connection of the in-loop filter 42, so that the in-loop filter 42 is disconnected or disabled when the quantization value is small and the quantization error is small, and the in-loop filter 42 is connected or enabled when the quantization value is large and the quantization error is large. In other words, the switching of the quantization value control with priority described above and the switching of the in-loop filter control with priority may be controlled in a linked manner.

In the case of the prediction coding control with priority described above, when the D area information within the picture composing memory 6 is obtained and the encoding process is carried out with respect to the D area, that is, the block corresponding to the weighted channel, the intra-frame encoding process is carried out and the distortion caused by the encoding process is small. Hence, the connection of the in-loop filter 42 may be controlled so as to disconnect the in-loop filter 42 in this case, and to connect the in-loop filter 42 with respect to the blocks other than the block in the D area since the inter-frame prediction coding process is carried out and the distortion caused by the encoding process is large with respect to these other blocks.

Figure 33:
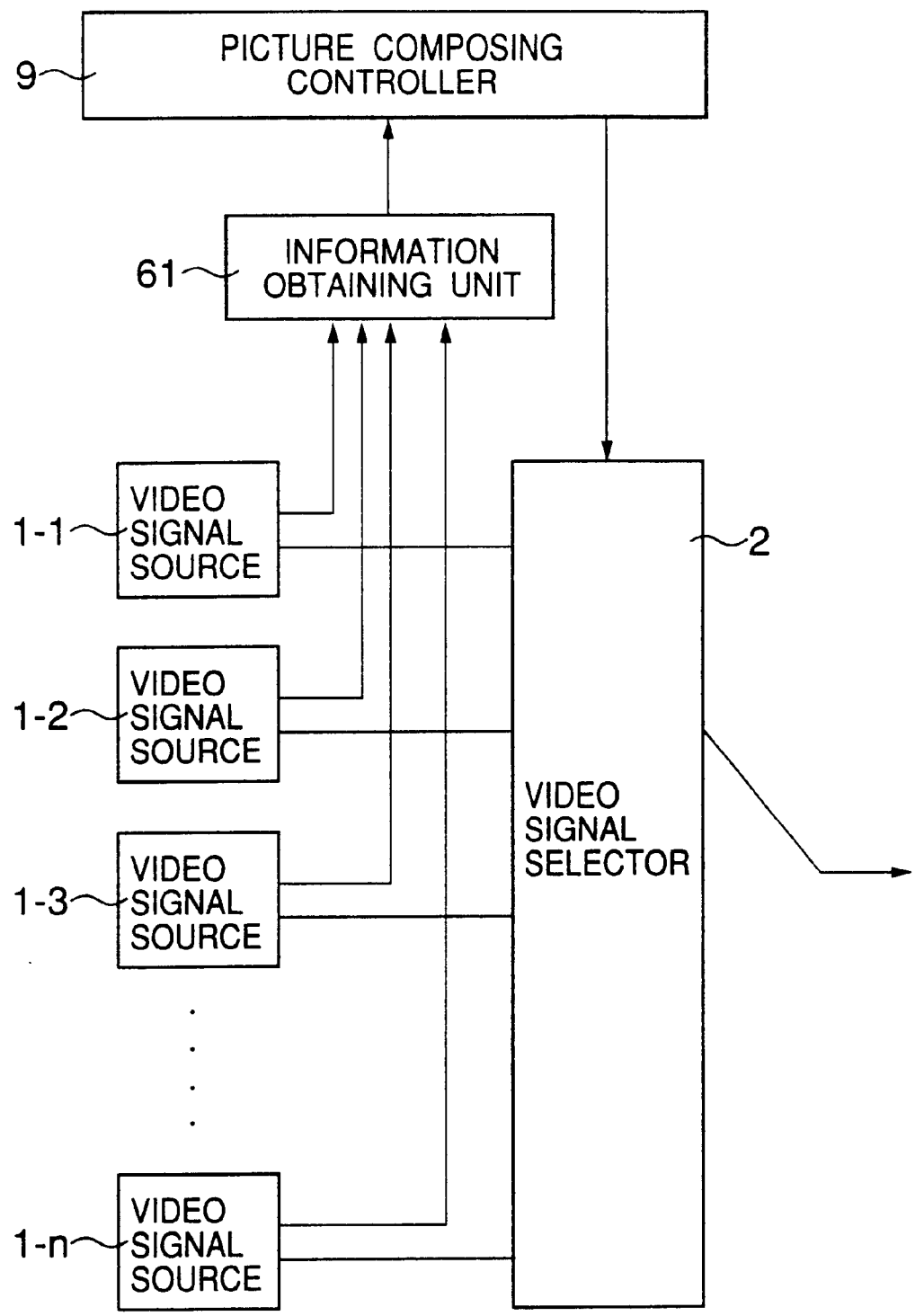
FIG. 33 is a diagram for explaining a video signal source information obtaining unit.

FIG. 33 is a diagram for explaining a video signal source information obtaining unit. In FIG. 33, the video signals from the video signal sources 1-1 through 1-n are input to the input signal monitoring unit 3 shown in FIG. 5 or 20 via the video signal selector 2. In addition, extended data from the video signal sources 1-1 through 1-n are collected by an information obtaining unit 61 and transferred to the picture composing controller 9.

The extended data include resolution information, frame rate information and the like. The video signal sources 1-1 through 1-n respectively have a structure having a function of transmitting the extended data, such as a digital camera and a decoder of the MPEG 1, H.261, JPEG or the like. The resolution information includes an effective area region in the case of the digital camera, a resolution of an encoding frame such as 704×480 pixels in the case of the MPEG decoder, a resolution of a CIF frame of 352×288 pixels or a QCIF frame of 176×144 pixels in the case of the H.261 decoder, and the resolution in the case of the JPEG decoder. On the other hand, the frame rate information includes a frame rate of 29.97 Hz in the case of the digital camera, and a decoding frame rate in the case of the MPEG1, H.261 and JPEG decoders.

The information obtaining unit 61 or the picture composing controller 9 determines the channel to be weighted based on the extended data from the video signal sources 1-1 through 1-n, so that the picture composing process can be carried out in accordance with each of the embodiments described above. For example, based on the frame rate information received from the video signal sources when composing the pictures, the channel having the largest frame rate may be weighted so that the video signal of the weighted channel is read with priority over the video signals of the other channels. In addition, based on the resolution information, the channel having the highest resolution may be weighted so that the picture composing process zooms up the video signal of the weighted channel.

The weighting may be carried out using the information in the encoder 8. For example, in the case of a system including a hybrid encoder, it is possible to utilize the motion estimation process. In other words, if the motion vector generated by the motion estimation process, that is, an address difference between an encoding block and a reference block, is large, it means that the difference between the area being processed and the previous frame is large, and that the video signal from the video signal source including a large motion is read. In the case of the video signal including the large motion, it may be assumed that some kind of an event is generated. Hence, such a video signal source is weighted so that the video signal from this video signal source is read with priority over video signals from other video signal sources or, is subjected to the zoom-up process with priority over video signals from other video signal sources.

When sampling a moving quantity amounting to s frames from an encoding frame t at a certain time, a sum total $U_A$ of the motion vectors in a block A within the picture composing memory 6 can be described by the following formula, where a scalar quantity of the motion vector in the horizontal direction x and the vertical direction y in the encoding frame t is denoted by $u_{t,x,y}$.

$$U_A = \sum_{T=t}^{t+s} \sum_{x=xj}^{xh} \sum_{y=yj}^{yh} u_{T,x,y}$$

In this case, when 4 pictures are composed, the values of xj, yj, xh and yh for the blocks 1 through 4 are as follows.

Block 1: xj=0, yj=0, xh=176, yh=144
Block 2: xj=0, yj=144, xh=176, yh=288
Block 3: xj=176, yj=0, xh=352, yh=144
Block 4: xj=176, yj=144, xh=352, yh=288

The sum total $U_A$ of the motion vectors of the block A within the picture composing memory 6 is obtained in the above described manner and a comparison is made for A=1 to A=n. The channel $C_A$ of the video signal source 1-A having the largest sum total $U_A$ as a result of this comparison is regarded as the channel which is to be weighted. The picture part which is to be enlarged or zoomed up and extracted is specified so that a block having the largest motion vector is arranged at the center. The operation of obtaining the block having the largest motion vector is carried out for every s frames, and channel of the video signal having the largest amount of motion is constantly monitored so that the weighted channel can be switched every time the channel of the video signal having the largest amount of motion changes.

In addition, various control operations can be carried out immediately after the video signal is read in the above described manner. For example, the data is transmitted at a constant rate with respect to the network 214, and thus, it is effective to optimize the encoding process. In order to transmit 10 frame per 1 second with respect to a 64 kbps line, the amount of data per 1 frame becomes 800 bytes, and the amount of data per 1 macro block becomes 2 bytes. In other words, it is desirable to set the quantization value so that the amount of data becomes 2 bytes as a result of the encoding process.

However, when 4 pictures are composed and the encoding process is carried out a whole every time 1 block of video signal is read, the normal difference data is generated with respect to the block of the newly read video signal, but the difference data is not generated with respect to the other blocks since the video signals are not updated with respect to the other blocks. In other words, when no difference data is generated, the amount of data per 1 macro block becomes 0 bytes. Hence, it is possible to allocate 8 bytes per 1 macro block with respect to the block of the updated video signal.

By utilizing the above described characteristics, it is possible to control the quantization value immediately after the video signal is read. For example, the variable A in the picture composing process shown in FIG. 11 indicates that only the block A within the picture composing memory 6 newly reads the video signal when carrying out the quantization, and the difference exists only for this block A and the difference is zero for the other blocks. Accordingly, when carrying out the encoding process with respect to the block A, a quantization value which can tolerate up to 4 times the normal amount of data after the quantization process is used. By controlling the quantization value in this manner, it is possible to carry out the picture composing process and the encoding process while maintaining the amount of information generated as a whole to a constant value.

In a case where the inter-frame correlation is low due to a change in scene or the like, the intra-frame encoding process is selected. On the other hand, in a case where the inter-frame correlation is high such as in a still picture, the inter-frame prediction coding process is selected. As described above, the correlation of the present frame with respect to the previous frame is low when the video signal is newly read, but the correlation of the present frame with respect to the previous frame is high for the other video signals.

Therefore, similarly to the case described above where the quantization value is controlled, it is possible to carry out the intra-frame encoding process with respect to the block A since only the block A within the picture composing memory 6 newly reads the video signal, and to carry out the inter-frame prediction coding process with respect to the other blocks. As a result, the prediction coding control with priority can be carried out immediately after the video signal is read so as to subject only the newly read frame to the intra-frame coding process and to transmit the video signal having a satisfactory picture quality.

As described above, the motion estimation process searches for a value which is within the previous frame and is closest to the block which is presently being encoded. With respect to the newly read video signal during the picture composing process, the possibility that a block which is moved from the previous frame exists is high, but the other blocks are the same as the previous frame and includes no motion. Hence, it is possible to shorten the time required for the encoding process by carrying out a motion estimation search range control with priority immediately after the video signal is read, so that the motion estimation process is carried out only with respect to the block A of the picture composing memory 6 and the motion estimation process is omitted with respect to the other blocks.

In addition, it is possible to carry out a in-loop filter switching control with priority immediately after the video signal is read. For example, with respect to the newly read video signal, the inter-frame difference is large and the possibility of the quantization error being large is high. But with respect to the other video signals, the inter-frame difference is small, and the quantization error is also small. Accordingly, it is possible to carry out the in-loop filter switching control so that the in-loop filter 42 shown in FIG. 31 is connected when encoding the block A of the picture composing memory 6, and the in-loop filter 42 is disconnected when encoding the other blocks.

Figure 34A:
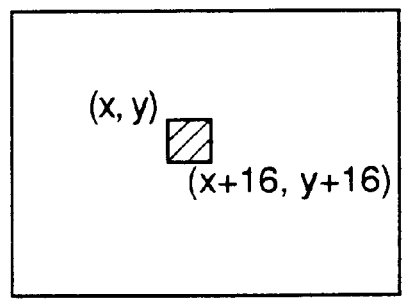
FIGS. 34A through 34D respectively are diagrams for explaining motion estimation and arrangement of pictures of the composed picture.
Figure 34B:
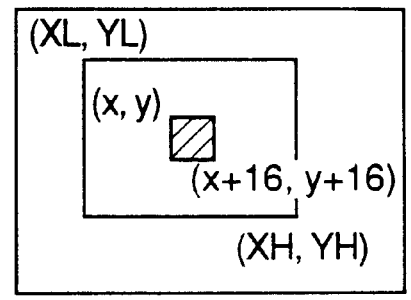

FIGS. 34A through 34D respectively are diagrams for explaining motion estimation and arrangement of pictures of the composed picture. As described above, the H.261 motion estimation process is carried out with respect to the luminance signal in units of macro blocks. When carrying out the motion estimation process with respect to a certain frame t, a previously encoded frame (t−1) is used. FIG. 34A shows a macro block with a start address (x, y) and an end address (x+16, y+16) of the frame t, and FIG. 34B shows a search range with addresses (XL, YL), (XH, YH).

When the address of the macro block of the frame t is denoted by (x, y) as described above, a luminance of a pixel is denoted by $k_{t,x,y}$, and an address of a reference macro block of the frame (t−1) is denoted by x', y'), a sum $K_{x',y'}$ of absolute differences of luminance values between the address (x, y) of the frame t and the address (x', y') of the frame (t−1) for i=0 to 15 and j=0 to 15 can be described by the following. Since the motion estimation process is carried out with respect to an area of 16×16 pixels, that is, 4 luminance data of the macro block, (i, j) is set to 0 to 15.

$$K_{x',y'} = \Sigma |k_{t,x+i,y+j} - k_{t-1,x'+i,y'+j}|$$

The address (x', y') of the reference macro block can be selected depending on the system, and may be set within the entire range or within a range of ±Z with respect to the address (x, y). In this case, the address (x', y') satisfies the following relationship, and Z may take a value of 7 or 15, for example.

$$(XL, YL) < (x', y') < (XH, YH)$$

where XL=0, YL=0, XH=352−16 and YH=288−16 when searching the entire range, and $$XL=x-Z, YL=y-Z, XH=x+Z \text{ and } YH=y+Z$$

when making a partial search.

The address (x', y') which makes the sum $K_{x',y'}$ of the absolute differences of the luminance values at the addresses (x, y) and (x', y') a minimum value is regarded as the address of the data of the previous frame to which the reference is to be made. Accordingly, the motion vector in this case becomes x'−x, y'−y).

In addition, when composing the video signals input from independent video signal sources, the video signals are mutually independent. Hence, when carrying out the motion estimation process, it may be predicted that the sum $K_{x',y'}$, which takes the minimum value is selected within the same block of the picture composing memory 6. Thus, it is meaningless to carry out the motion estimation process spanning other blocks. Therefore, by limiting the address (x', y') of the reference macro block described above to within the same block, it is possible to efficiently carry out the encoding process.

For example, when a start address and an end address of each block are respectively denoted by (xl, yl) and (xh, yh) when composing 4 pictures, the following relationship stands in FIG. 34B.

$$(XL, YL) < (x', y') < (XH, YH)$$

where XL=xl, YL=yl, XH=xh−16 and YH=yh−16 when searching the entire range, and $$XL=\max(x-Z, xl), YL=\max(y-Z, yl), XH=\min(x+Z, xh) \text{ and } YH=\min(y+Z, yh)$$

when making a partial search.

The motion estimation process is carried out only with respect to the following areas, and the encoding efficiency can be improved by limiting the search range of the motion estimation process when composing the pictures.

Block 1: xl=0, yl=0, xh=176, yh=144
Block 2: xl=0, yl=144, xh=176, yh=288
Block 3: xl=176, yl=0, xh=352, yh=144
Block 4: xl=176, yl=144, xh=352, yh=288

Figure 34C:
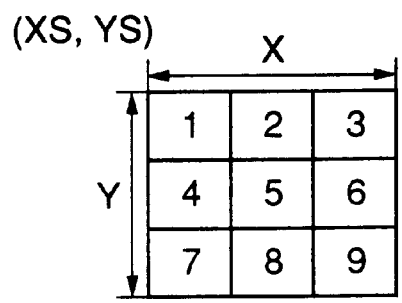
Figure 34D:
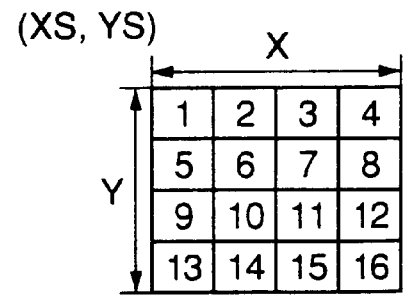

In each of the embodiments described above, the description is mainly made with respect to a case where 4 pictures are composed, but the number of pictures to be composed may of course be greater than 4. For example, FIG. 34C shows a case where 9 pictures are composed, and FIG. 34D shows a case where 16 pictures are composed. Generally, the display screen is equally divided into a predetermined number of parts, and the area of each part is allocated to a corresponding one of a plurality of video signal sources.

When the number of pictures to be composed is denoted by N, the number of equally divided parts of the display screen is denoted by n, and the picture composing memory 6 has n blocks, it is possible to equally divide the display screen as described above and compose the video signals amounting to N channels if N=n. If N>n, the video signals amounting to n channels are read in one operation, and the channel numbers to be read are switched for every predetermined time.

For example, in a case where N=6, n=4 and the predetermined time is 10 seconds when composing the pictures, these values are set as initial values and the channel numbers $C_1$ to $C_6$ of the video signal sources are obtained. These measures may be specified in advance depending on the system. In this case, since the number n of equally divided parts of the display screen is n=4, the video signals of the channel numbers $C_1$ through $C_4$ are read consecutively, and the picture composing process is carried out depending on each of the embodiments described above. Thereafter, when the predetermined time of 10 seconds elapses, the value of $C_A$ is substituted into $C_{A+1}$, and the value of $C_1$ is substituted into $C_N$. In other words, ($C_1=1, C_2=2, C_3=3, C_4=4, C_5=5, C_6=6$) is updated to ($C_1=2, C_2=3, C_3=4, C_4=5, C_5=6, C_6=1$).

In addition, after the next predetermined time of 10 seconds elapses, ($C_1=2, C_2=3, C_3=4, C_4=5, C_5=6, C_6=1$) is updated to ($C_1=3, C_2=4, C_3=5, C_4=6, C_5=1, C_6=2$). Accordingly, in the top left block of the picture composing memory 6, for example, the video signal of the channel $C_1$ is first composed, the video signal of the channel $C_2$ is next composed, the video signal of the channel $C_3$ is next composed, and the position of the blocks when composing the 4 pictures are successively switched according to a predetermined rotation. In other words, even in a case where the number of video signal sources is large and the display screen is divided into a small number of parts, it is possible to successively compose and transmit the video signals from all of the video signal sources. Therefore, by receiving and displaying the composed picture, it is possible to observe the pictures of the video signals from all of the video signal sources.

In each of the embodiments described above, a remote control can easily be made because the picture composing apparatus and the encoder are closely coupled. For example, low speed data (LSD), multi layer protocol (MLP), high speed data (HSD), no-standard BAS message and the like are prescribed for the user data with respect to the H.320 data path, and the remote control can be made using such user data.

Figure 35:
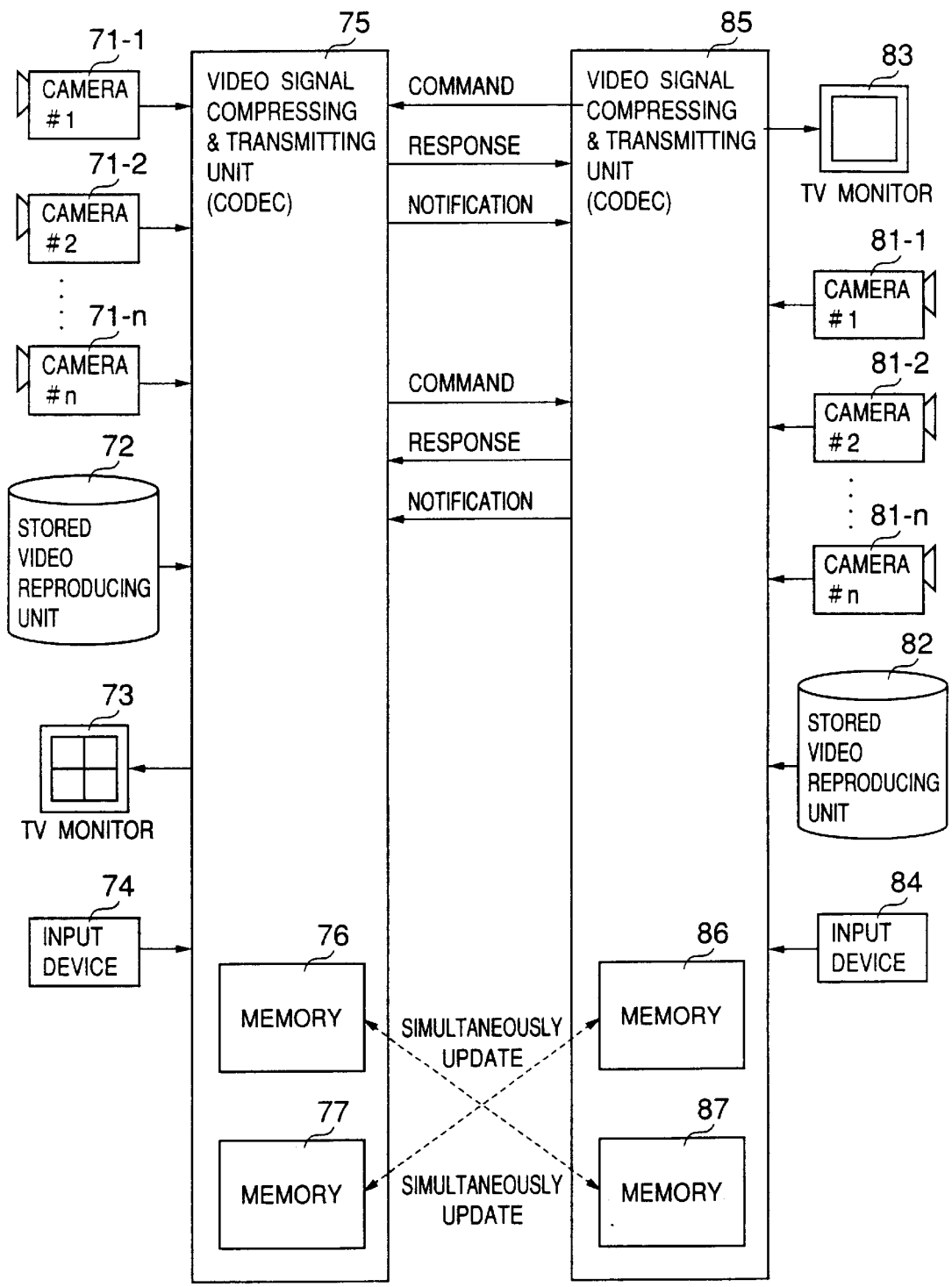
FIG. 35 is a diagram for generally explaining the remote control in a sixth embodiment of the multiple picture composing apparatus according to the present invention.

FIG. 35 is a diagram for generally explaining the remote control in a sixth embodiment of the multiple picture composing apparatus according to the present invention. In FIG. 35, television cameras 71-1 through 71-n, television cameras 81-1 through 81-n, stored video reproducing units 72 and 82, television monitors 73 and 83, input devices 74 and 84 such as keyboard, infrared key pad, mouse and ten-key, video signal compressing and transmitting units (CODECs) 75 and 85, far-site picture composing information storing memories 76 and 86, and near-site picture composing information storing memories 77 and 87 which are coupled as shown.

The video signal compressing and transmitting units 75 and 85 have the functions of exchanging commands, responses and indications or notifying messages, and composing and encoding the video signals from the television cameras 71-1 through 71-n and 81-1 through 81-n according to the embodiments described above. The picture composing information is managed by the far-site picture composing information storing memories 76 and 86 and the near-site picture composing information storing memories 77 and 87. Modified contents in the far-site picture composing information storing memory 76 are notified to the near-site picture composing information storing memory 87 and vice versa, and modified contents of the near-site picture composing information storing memory 77 is are notified to the far-site picture composing information storing memory 86 and vice versa.

Various guidances may be prepared in order to carry out a remote control of the picture composing process. For example, a description will be given of guidances (a), (b) and (c) from a monitored end which is monitored when a remote menu set/cancel command is transmitted to the monitored end in accordance with a guidance display instruction from the input device 74 or 84.

Guidance (a)

According to this guidance, all of the pictures are composed for N video signal sources which are effective in all cases. Character data of volcano, river, factory, power line and the like which are registered in advance as the monitoring pictures and serial numbers assigned to the monitoring pictures are displayed in an overlapping manner. One or a plurality of displayed serial numbers are specified by the input device, and the picture composing process is carried out by remote control.

Guidance (b)

According to this guidance, a remote control menu is created, and only the menu screen is encoded and transmitted. The input device is used to make an input similarly to the case of the guidance (a) described above according to the displayed menu.

Guidance (c)

According to this guidance, all of the pictures are composed for N video signal sources which are effective in all cases. A remote control menu is created, and this remote control menu is encoded and transmitted after an overlay. The input device is used to make an input similarly to the case of the guidance (a) described above according to the displayed menu.

Next, a description will be given of a guidance (d) which is added on the monitoring end according to a guidance display instruction from the input device.

Guidance (d)

According to this guidance, a remote control menu is created, and only the menu screen is encoded and transmitted. The input device is used to specify a serial number added to the displayed menu.

FIGS. 36A, 36B and 36C respectively are diagrams for explaining a remote control guidance. FIG. 36A shows display contents corresponding to the guidance (b) described above. FIG. 36B shows display contents corresponding to the guidance (a) described above. In addition, FIG. 36C shows display contents corresponding to the guidance (c) described above. The display contents shown in FIG. 36C are obtained by composing the display contents shown in FIGS. 36A and 36B. The display contents shown in FIG. 36A, 36B or 36C can be displayed on the television monitors 73 and 83. Of course, it is also possible to display only the contents of the guidance on a liquid crystal display or the like which is independent of the television monitors 73 and 83.

Figure 37:
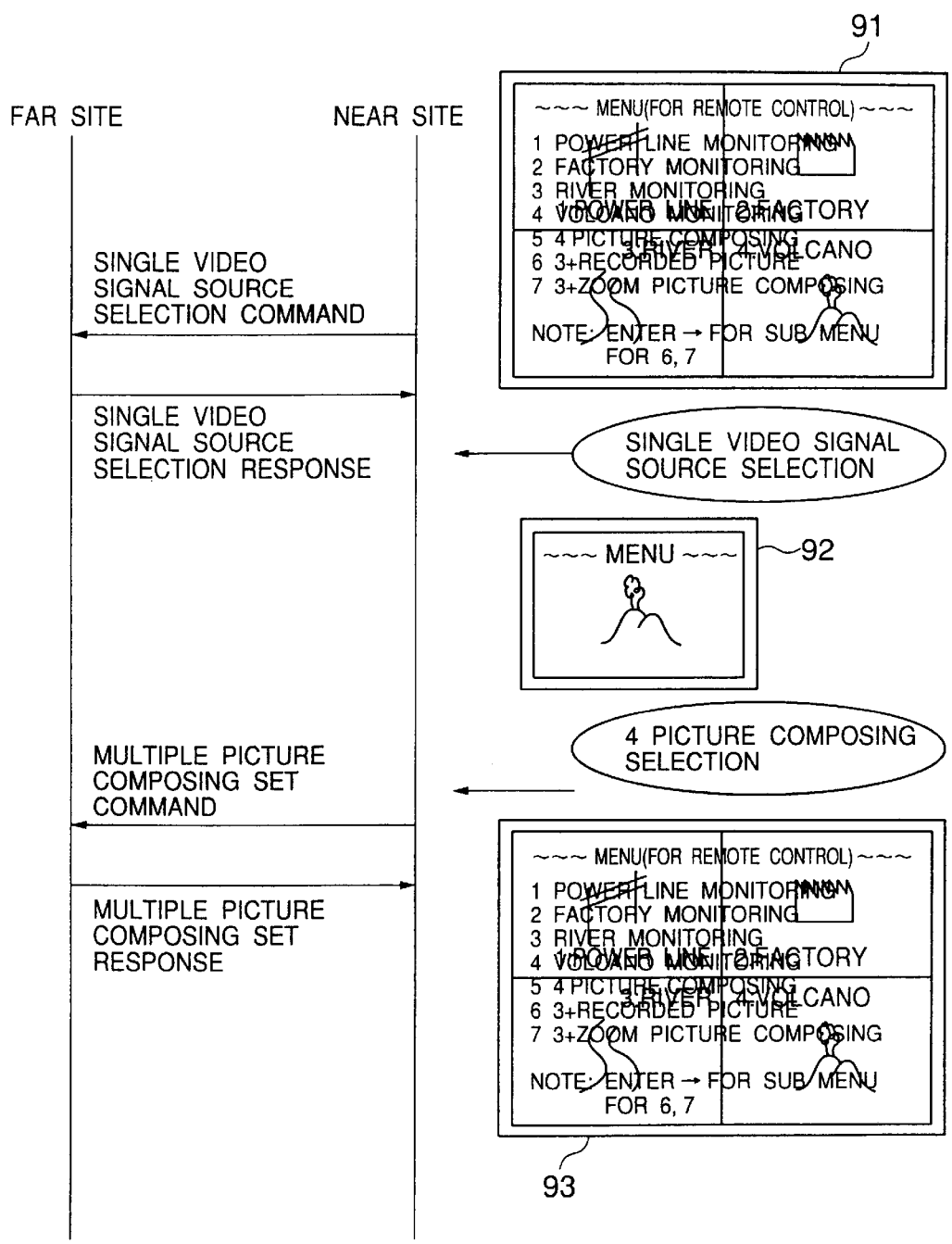
FIG. 37 is a diagram for explaining a picture switching by the remote control.

FIG. 37 is a diagram for explaining a picture switching by the remote control. When a serial number "4" is specified from the near-site and a single video signal source selection is input on a display screen 91 corresponding to the guidance (c), a corresponding command is transmitted to the far-site, and a response with respect to this command is transmitted from the far-site to the near-site. Accordingly, a display screen 92 for monitoring the volcano is displayed. The menu is also displayed in this case, but the illustration thereof is omitted in FIG. 37 for the sake of convenience.

Next, when a serial number "5" is specified on the menu and a 4-picture composing process is selected, a multiple picture composing set command is transmitted to the far-site, and a response with respect to this multiple picture composing set command is received from the far-site. As a result, a display screen 93 becomes a composed picture of 4 pictures, similarly to the initial display screen 91.

Figure 38:
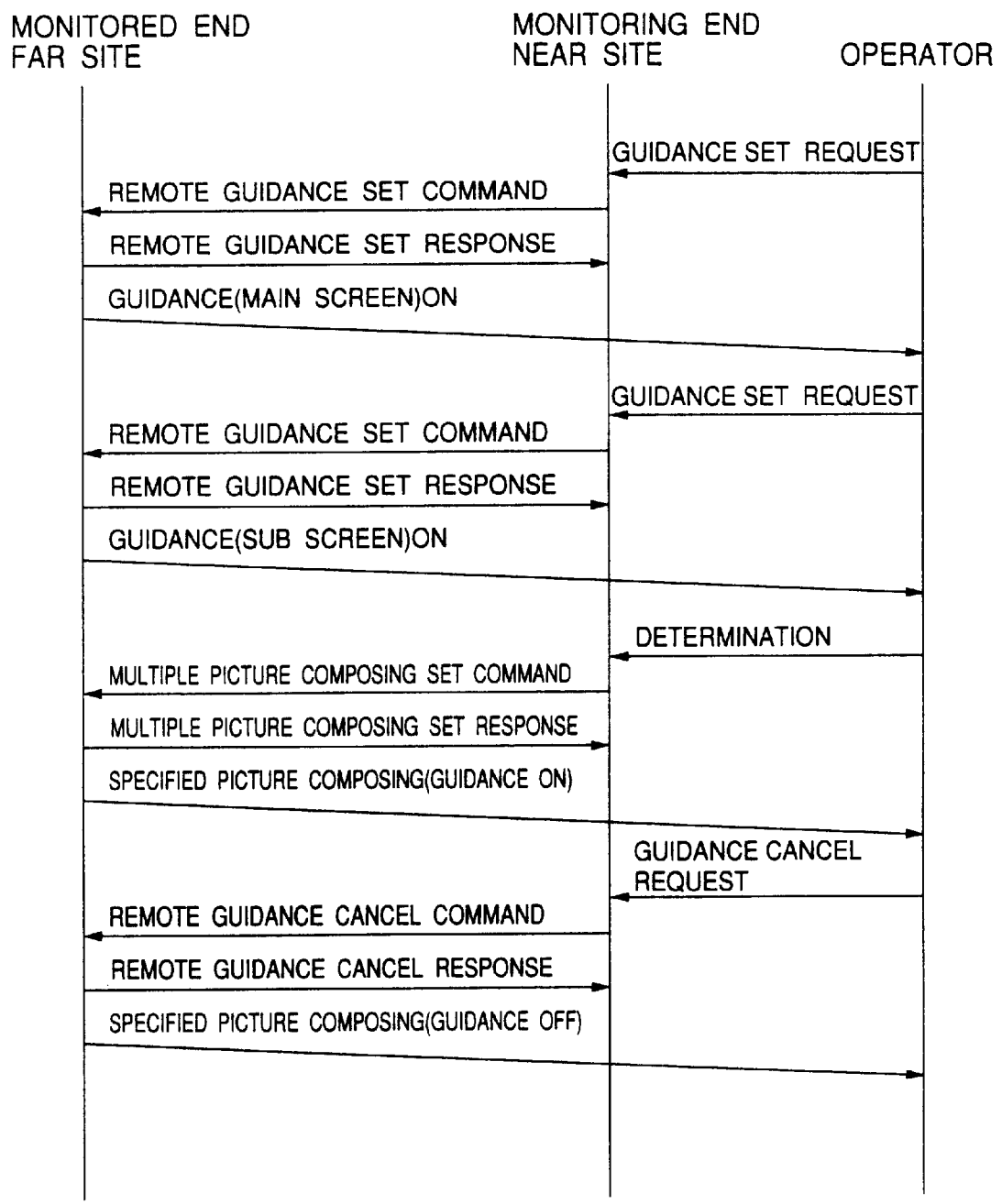
FIG. 38 is a time chart for explaining a picture composing mode determination sequence.

FIG. 38 is a time chart for explaining a picture composing mode determination sequence. FIG. 38 shows a case where a picture composing mode of a monitored end (far-site) is set by an input from an operator of a monitoring end (near-site). When the operator uses the input device to input a guidance set request, a remote guidance set command is transmitted from the monitoring end (near-site) to the monitored end (far-site). A response with respect to this remote guidance set command is transmitted from the monitored end (far-site) to the monitoring end (near-site), and a guidance (main screen) is turned ON.

When the operator inputs a guidance set request based on the guidance (main screen), a remote guidance set command is transmitted from the monitoring end to the monitored end. A response with respect to this remote guidance set command and a next guidance (sub screen) are transmitted from the monitored end. When the operator makes an input related to a determination which is made based on the guidance (sub screen), a multiple picture composing set command is transmitted from the monitoring end to the monitored end. A response with respect to this multiple picture composing set command and specified contents of pictures to be composed are transmitted from the monitored end to the monitoring end. Furthermore, when the operator inputs a guidance cancel request, a remote guidance cancel command is transmitted from the monitoring end to the monitored end. A response with respect to this remote guidance cancel command and contents of the pictures to be composed with the guidance turned OFF are transmitted from the monitored end to the monitoring end.

FIG. 39 is a diagram for explaining a remote control protocol. A remote control protocol 100 related to the picture composing process is generally categorized into commands, responses and indications or notifying messages, and indicates the existence of a response rsp, the type or details, and the contents with respect to each of the commands, responses and indications or notifying messages. An identifier of the type or details is indicated by a hexadecimal value (hex). Identifiers of commands, parameters and the like which will be described later and shown with the (hex) symbol omitted are also indicated by a hexadecimal value (hex).

The commands include a single video signal source selection command having an identifier 01, a multiple picture composing set command having an identifier 02, a multiple picture composing inquiry command having an identifier 03, a video input source state request command having an identifier 04, and a remote menu set/cancel command having an identifier 05, and each of these commands have a corresponding response rsp.

The responses are responsive to the commands, and include a single video signal source selection response having an identifier 81 with respect to the single video signal source selection command, a multiple picture composing set response having an identifier 82 with respect to the multiple picture composing set command, a multiple picture composing inquiry response having an identifier 83 with respect to the multiple picture composing inquiry command, a video input source state request response having an identifier 84 with respect to the video input source state request command, and a remote menu set/cancel response having an identifier 85 with respect to the remote menu set/cancel command. Each of these responses have no corresponding response rsp.

In addition, the indications include a video signal abnormality indication having an identifier f1, and a multiple picture composing modification indication having an identifier f2. Each of these indications have no corresponding response rsp.

FIGS. 40A and 40B respectively are diagrams for explaining the single video signal source selection command and the single video signal source selection response.

A single video signal source selection command 101 shown in FIG. 40A includes a 1-byte identifier 01, a 1-byte parameter length, and parameters. The parameters include 1 byte for indicating a total number of channels of the video signal sources, and 1 byte for indicating a specified channel number of the video signal source.

A single video signal source selection response 102 shown in FIG. 40B includes a 1-byte identifier 81, a 1-byte parameter length, and parameters including 1 byte for indicating the selected channel number.

FIGS. 41A and 41B respectively are diagrams for explaining the multiple picture composing set command.

As shown in FIGS. 41 and 41B, a multiple picture composing set command 103 includes a 1-byte identifier 02, a 1-byte parameter length, 1-byte or 2-byte parameters. The parameters include the number N of pictures to be composed, the number n of parts into which the display screen is divided, an interval time, the picture composing mode, and a specified priority channel for the picture composing mode shown in FIG. 41A. The parameters further include an encoding mode, a specified priority channel for the encoding mode, coordinate information related to coordinates 1 to 9, zoom-up coordinate X, zoom-up coordinate Y, and zoom-up ratio shown in FIG. 41B.

FIGS. 42A, 42B, 42C, 42D and 42E respectively are diagrams for explaining the multiple picture composing response, the multiple picture composing inquiry command, the multiple picture composing inquiry response, the video signal source state request command and the video input source state request response.

As shown in FIG. 42A, a multiple picture composing response 104 includes a 1-byte identifier 82, a 1-byte parameter length, and 1-byte parameters. This multiple picture composing response 104 is the response with respect to the multiple picture composing set command 103 shown in FIGS. 41A and 41B.

As shown in FIG. 42B, a multiple picture composing inquiry command 105 includes a 1-byte identifier 03, and a 1-byte parameter length.

As shown in FIG. 42C, a multiple picture composing inquiry response 106 includes a 1-byte identifier 83, a 1-byte parameter length, and 21 bytes of 1-byte or 2-byte parameters. This multiple picture composing inquiry response 106 is the response with respect to the multiple picture composing inquiry command 105 shown in FIG. 42B.

As shown in FIG. 42D, a video input source state request command 107 includes a 1-byte identifier 04, and a 1-byte parameter length. This video input source state request command 107 inquires the state of the video signal source such as the television camera.

As shown in FIG. 42E, a video input source state request response 108 includes a 1-byte identifier 84, a 1-byte parameter length, and 1-byte parameters related to video signal sources 1 to 9. This video input source state request response 108 is the response with respect to the video input source state request command 107 shown in FIG. 42D, and each 1-byte parameter indicates whether the corresponding video signal source is normal (00) or abnormal (ff).

FIGS. 43A, 43B, 43C and 43D respectively are diagrams for explaining the remote guidance set/cancel command, the remote guidance set/cancel response, the video signal abnormality indication and the multiple picture composing modification indication.

A remote guidance set/cancel command 109 shown in FIG. 43A includes a 1-byte identifier 05, a 1-byte parameter length, and 1-byte parameters. This remote guidance set/cancel command 109 corresponds to the remote guidance set command shown in FIG. 38.

A remote guidance set/cancel response 110 shown in FIG. 43B includes a 1-byte identifier 85, a 1-byte parameter length, and a 1-byte parameter. This remote guidance set/cancel response 110 is the response with respect to the remote guidance set/cancel command 109 shown in FIG. 43A, and corresponds to the remote guidance set response shown in FIG. 38.

A video signal abnormality indication 111 shown in FIG. 43C includes a 1-byte identifier f1, a 1-byte parameter length, and a 1-byte parameter. This video signal abnormality indication 111 shows the details of the indication shown in FIG. 39.

A multiple picture composing modification indication 112 shown in FIG. 43D includes a 1-byte identifier f2, a 1-byte parameter length, and 21 bytes of 1-byte or 2-byte parameters. This multiple picture composing modification indication 112 shows the details of the indication shown in FIG. 39.

By use of the commands, responses and indications described above, it is possible to carry out the remote control of the multiple picture composing process in the system shown in FIG. 3 or 35. Accordingly, in a remote monitoring system or the like, it becomes possible to carry out various kinds of control with respect to the picture composing process, such as the selection and zoom-up of the picture of the monitoring object which is to be monitored.

Of course, it is possible to appropriately combine the above described embodiments to suit the needs. In addition, the video signal source is not limited to the television camera, and other apparatuses such as a recording and reproducing apparatus and a digital camera which output a video signal corresponding to a video signal of a still camera. Moreover, the application of the present invention is not limited to the remote monitoring system, and the present invention is similarly applicable to various systems which require a multiple picture composing process such as a video conference system.

Further, the present invention is not limited to these embodiments, but various variations and modifications may be made without departing from the scope of the present invention.

What is claimed is:

1. A multiple picture composing method for composing video signals from a plurality of video signal sources which operate asynchronously to each other, comprising the steps of:
    (a) successively selecting the video signals from the video signal sources;
    (b) reading the selected video signals in units of frames while maintaining horizontal and vertical synchronization of the selected video signals;
    (c) reducing the video signals in the units of frames in correspondence with areas allocated for each of pictures to be composed in a composed picture;
    (d) writing the reduced video signal in blocks of a picture composing memory corresponding to the areas allocated for each of the pictures to be composed; and
    (e) composing the video signals stored in the picture composing memory to obtain a composed video signal related to a composed picture and subjecting the composed video signal to at least one of an encoding process and a transmission process.

2. The multiple picture composing method as claimed in claim 1, wherein said step (e) carries out at least one of the encoding process and the transmission process every time a video signal in the units of frames and to be composed is read from one of the plurality of video signal sources.

3. The multiple picture composing method as claimed in claim 1, wherein said step (b) successively reads the video signals in the units of frames from the plurality of video signal source and said step (d) writes the reduced video signal in the picture composing memory during an encoding process and/or a transmission process, and said step (e) carries out at least one of the encoding process and the transmission process with respect to the video signal stored in the picture composing memory upon completion of the encoding process and/or the transmission process.

4. The multiple picture composing method as claimed in claim 1, which further comprises the steps of:
    (f) reading a video signal of a weighted channel a number of times greater than video signals of other channels and obtaining the composed video signal by writing the video signals of the weighted channel and the other channels in the picture composing memory by said step (e).

5. The multiple picture composing method as claimed in claim 1, wherein said step (a) judges existences of the video signals from the plurality of video signal sources and selects only a video signal source from which a video signal exists, and said step (d) writes only the reduced video signal from the video signal source selected by said step (a).

6. The multiple picture composing method as claimed in claim 1, which further comprises the steps of:
    (f) writing a fixed pattern in a block of the picture composing memory corresponding to an invalid area on the composed picture,
    said step (e) composing the video signals and the fixed pattern stored in the picture composing memory.

7. The multiple picture composing method as claimed in claim 1, which further comprises the steps of:
    (f) writing a received and decoded data in a block of the picture composing memory corresponding to an invalid area on the composed picture,
    said step (e) composing the video signals and the received and decoded data stored in the picture composing memory.

8. The multiple picture composing method as claimed in claim 1, which further comprises the steps of:
    (f) writing an enlarged video signal of a weighted channel in a block of the picture composing memory corresponding to an invalid area on the composed picture,
    said step (e) composing the video signals and the enlarged video signal stored in the picture composing memory.

9. The multiple picture composing method as claimed in claim 1, which further comprises the steps of:
    (f) writing a video signal of a weighted channel in a block of the picture composing memory corresponding to an invalid area on the composed picture so as to make a zoom-up display of the video signal of the weighted channel.

10. The multiple picture composing method as claimed in claim 1, wherein said step (e) carries out the encoding process by setting a quantization value with respect to a video signal of a weighted channel to a small value with priority.

11. The multiple picture composing method as claimed in claim 1, wherein said step (e) carries out an intra-frame encoding process with respect to a video signal of a weighted channel, and carries out an inter-frame prediction coding process with respect to video signals of other channels.

12. The multiple picture composing method as claimed in claim 1, which further comprises the steps of:
    (f) disabling an in-loop filter when carrying out an encoding process with respect to a video signal of a weighted channel, and enabling the in-loop filter when carrying out an encoding process with respect to video signals of other channels.

13. The multiple. picture composing method as claimed in claim 1, which further comprises the steps of:
    (f) setting a motion estimation search range with respect to a video signal of a weighted channel to a first range, and discontinuing the motion estimation search range or setting the motion estimation search range with respect to video signals of other channels to a second range smaller than the first range.

14. The multiple picture composing method as claimed in claim 10, which further comprises the steps of:
- (g) selecting a channel which is to be weighted based on resolution information of the plurality of video signal sources and frame rate information.

15. The multiple picture composing method as claimed in claim 10, which further comprises the steps of:
- (g) obtaining moving quantity information corresponding to the video signals from the plurality of video signal sources, and weighting a channel having a moving quantity greater than a predetermined value based on the moving quantity information.

16. The multiple picture composing method as claimed in claim 1, wherein said step (d) writes reduced video signals from the plurality of video signal sources in the units of frames, further comprising the steps of:
- (f) enabling an in-loop filter when said step (e) carries out the encoding process with respect to the video signals immediately after said step (d) writes the video signals, and disabling the in-loop filter when said step (e) carries out the encoding process with respect to the video signal of a previous frame.

17. The multiple picture composing method as claimed in claim 1, wherein said step (a) selects a number of channels of video signal sources depending on a number of pictures to be composed when the number of pictures to be composed is greater than a number of video signal sources, and said step (b) switches a channel of the video signal which is read for every predetermined time.

18. The multiple picture composing method as claimed in claim 1, which further comprises the steps of:
- (f) transmitting, together with a layout of pictures to be composed, a guidance which includes specifying a picture composing process,
- said step (e) carrying out the picture composing process specified according to the guidance.

19. A multiple picture composing apparatus for composing video signals from a plurality of video signal sources which operate asynchronously to each other, comprising:
- a video signal selector selecting the video signals from the video signal sources;
- an input signal monitoring unit reading the video signals selected by said video signal selector while maintaining horizontal and vertical synchronization of the selected video signals;
- a horizontal direction reducer reducing the video signals synchronized by said input signal monitoring unit in units of frames in correspondence with areas allocated for each of pictures to be composed in a composed picture;
- a picture composing memory storing the video signals reduced by said horizontal direction reducer in units of lines;
- a picture composing controller controlling reading of the video signals by said input signal monitoring unit via said video signal selector and a picture composing process with respect to the video signals stored in said picture composing memory; and
- an encoder carrying out the picture composing process with respect to the video signals stored in said picture composing memory.

20. The multiple picture composing apparatus as claimed in claim 19, which further comprises:
- an encoding controller controlling said encoder to carry out the encoding process every time said input signal monitoring unit reads the video signals from the video signal sources in the units of frames.

21. The multiple picture composing apparatus as claimed in claim 19, wherein said picture composing controller controls said video signal selector so that a video signal of a weighted channel is read by said input signal monitoring unit a number of times greater than a number of times video signals of other channels are read.

22. The multiple picture composing apparatus as claimed in claim 19, which further comprises:
- video input judgement means for judging whether or not the video signals from the plurality of video signal sources exist,
- said picture composing controller controls said video signal selector to read only a video signal from a video signal source from which said input judging means judges an existence of the video signal and controls positions of blocks of the video signals to be composed in said picture composing memory.

23. The multiple picture composing apparatus as claimed in claim 19, wherein said encoding controller controls at least one of a quantization value with respect to a video signal corresponding to a weighted channel in said encoder, switching of an intra-frame encoding process and an inter-frame prediction coding process in said encoder, and enabled and disabled states of an in-loop filter in the encoder.

24. The multiple picture composing apparatus as claimed in claim 19, which further comprises:
- special data storing memory storing a fixed pattern which is to be stored in a block of said picture composing memory corresponding to an invalid area on the composed picture.

25. The multiple picture composing apparatus as claimed in claim 19, which further comprises:
- a decoder decoding received data; and
- a decoding memory storing received data decoded by said decoder and to be stored in a block of said picture composing memory corresponding to an invalid area on the composed picture.

26. The multiple picture composing apparatus as claimed in claim 24, wherein said picture composing controller carries out a control to temporarily store a video signal of a weighted channel in said special data storing memory, and to store the video signal stored in said special data storing memory into said picture composing memory so as to make a zoom-up display of the video signal stored in said special data storing memory.

27. The multiple picture composing method as claimed in claim 11, which further comprises the steps of:
- (g) selecting a channel which is to be weighted based on resolution information of the plurality of video signal sources and frame rate information.

28. The multiple picture composing method as claimed in claim 12, which further comprises the steps of:
- (g) selecting a channel which is to be weighted based on resolution information of the plurality of video signal sources and frame rate information.

29. The multiple picture composing method as claimed in claim 13, which further comprises the steps of:
- (g) selecting a channel which is to be weighted based on resolution information of the plurality of video signal sources and frame rate information.

30. The multiple picture composing method as claimed in claim 11, which further comprises the steps of:
- (g) obtaining moving quantity information corresponding to the video signals from the plurality of video signal sources, and weighting a channel having a moving quantity greater than a predetermined value based on the moving quantity information.

31. The multiple picture composing method as claimed in claim 12, which further comprises the steps of:
   (g) obtaining moving quantity information corresponding to the video signals from the plurality of video signal sources, and weighting a channel having a moving quantity greater than a predetermined value based on the moving quantity information.

32. The multiple picture composing method as claimed in claim 13, which further comprises the steps of:
   (g) obtaining moving quantity information corresponding to the video signals from the plurality of video signal sources, and weighting a channel having a moving quantity greater than a predetermined value based on the moving quantity information.

* * * * *